United States Patent [19]
Kiyomiya et al.

[11] Patent Number: 5,385,432
[45] Date of Patent: Jan. 31, 1995

[54] WATER AREA STRUCTURE USING PLACING MEMBER FOR UNDERWATER GROUND

[75] Inventors: Osamu Kiyomiya, Yokohama; Kenichiro Minami, Kaizuka; Kunio Takahashi; Koichi Sato, both of Yokohama, all of Japan

[73] Assignee: Nippon Steel Corporation, Tokyo, Japan

[21] Appl. No.: 960,372
[22] PCT Filed: May 10, 1991
[86] PCT No.: PCT/JP91/00625
  § 371 Date: Jan. 4, 1993
  § 102(e) Date: Jan. 4, 1993
[87] PCT Pub. No.: WO92/20869
  PCT Pub. Date: Nov. 26, 1992
[51] Int. Cl.$^6$ .......................... E02B 3/06; E02D 17/00
[52] U.S. Cl. .................................. 405/204; 405/195.1
[58] Field of Search ................ 405/15, 21, 204, 203, 405/205, 274, 281, 282, 195.1

[56] References Cited

U.S. PATENT DOCUMENTS

| | | | |
|---|---|---|---|
| 1,632,545 | 6/1927 | Gillen | 405/21 |
| 2,514,119 | 7/1950 | Boccia | 405/21 |
| 4,687,380 | 8/1987 | Meek et al. | 405/204 |

FOREIGN PATENT DOCUMENTS

| | | |
|---|---|---|
| 25028 | 3/1975 | Japan . |
| 44803 | 10/1983 | Japan . |
| 216915 | 9/1986 | Japan . |

Primary Examiner—Dennis L. Taylor
Attorney, Agent, or Firm—Joseph C. Mason, Jr.; Ronald E. Smith

[57] ABSTRACT

The present invention relates to a water area structure using a placing member for underwater ground, which is used as, e.g., a water area structure for discharge such as a shore-bridge and a jetty, a bulkhead structure, a breakwater structure, a dike structure, and the like. The water area structure using the placing member for underwater ground comprises a number of placing members for underwater ground (1) arranged at suitable intervals with each other, and driven into underwater ground (2), a number of proof compressive diagonal members (3) diagonally downwardly extending from an upper portion of the placing members for underwater ground (1) toward the underwater ground (2), the proof compressive diagonal members (3) being laterally arranged at suitable intervals with each other, a forward pile (5) passing through a lower cylindrical body for through pile (4) which is coupled with a lower end of the proof compressive diagonal member (3), the forward pile (5) driven into said underwater ground (2), the lower cylindrical body (4) coupled with an intermediate portion of the forward pile (5), and an upper end of the forward pile (5), that of the placing member for underwater ground (1), and that of the proof compressive diagonal member (3) coupled through a coupling member (6).

9 Claims, 74 Drawing Sheets

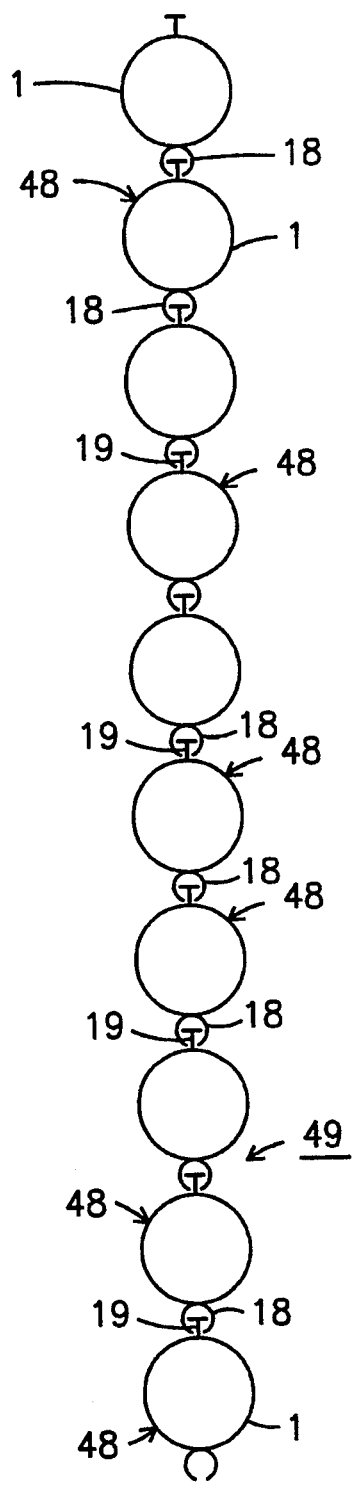
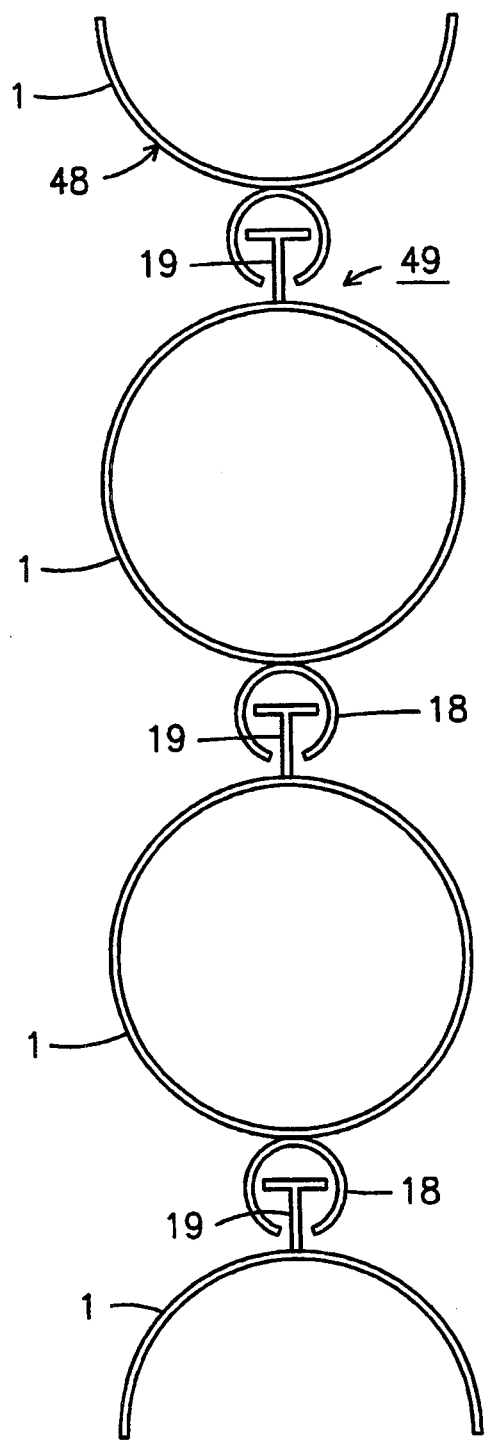
Fig. 11
Fig. 12

WATER AREA STRUCTURE USING PLACING MEMBER FOR UNDERWATER GROUND

TECHNICAL FIELD

The present invention relates to a water area structure using a placing member for underwater ground, which is used for, e.g., a water area structure for discharge such as a shore-bridge and a jetty, a bulkhead structure, a breakwater structure, a dike structure, and the like.

BACKGROUND ART

A water area structure using a placing member for underwater ground is well known in the art, and is constructed as shown in FIGS. 82 and 83. In the conventional water area structure, a number of steel sheet piles 48 engaged with each other are driven into underwater ground 2 to form a sheet pile wall 49. A number of piles 5 are disposed at a position spaced from the sheet pile wall 49 at regular intervals in the longitudinal direction of the sheet pile wall, and are driven into the underwater ground 2. A number of diagonal piles 50 diagonally downwardly extend from an upper portion of the sheet pile wall 49 toward the underwater ground 2 in a vertical plane substantially perpendicular to the sheet pile wall 49. The diagonal piles 50 are disposed at intervals in the longitudinal direction of the sheet pile wall, and are driven into the underwater ground 2. The upper end of the sheet pile wall 49, that of the diagonal pile 50, and that of the pile 5 are coupled through a coupling member 6 comprising a concrete slab. Backfill earth 51 and earth filling 52 are filled at the back of the sheet pile wall 49.

In the water area structure using the conventional placing member for underwater ground, axial supporting force of the ground, i.e., the distal supporting force of the pile and circumferential frictional force of the pile give resistance to forcing pressure generated in the diagonal pile 50. The forcing pressure, however, is excessively high. Therefore, generally, it is necessary to considerably extend a length of the diagonal pile 50 which is driven into hard bearing stratum 53 to obtain the sufficient supporting force of the pile end.

On the other hand, axial supporting force of the ground (circumferential frictional force) gives resistance to drawing force generated in the sheet pile wall 49. The drawing force, however, is also excessively high. Thus, generally, it is necessary to considerably extend a length of the sheet pile wall 49 which is driven into the hard bearing stratum 53 to obtain the sufficient circumferential frictional force.

As set forth above, in the water area structure using the conventional placing member for underwater ground, it is essential to drive the diagonal pile 50 and the sheet pile wall 49 into the hard bearing stratum 53 by each considerable length to support each excessively high axial force generated in the diagonal pile 50 and the sheet pile wall 49. As a result, there were some drawbacks such as long time required for execution, or buckling of the diagonal pile 50 and the steel sheet pile 48 as well as very costly materials.

In execution of driving the diagonal pile 50, a canted angle of the diagonal pile 50 with respect to a vertical line ((typically, in the range of 10 to 20 degrees) can not be further increased. Therefore, it was too difficult to reduce the forcing pressure generated in the diagonal pile 50. Additionally, if the diagonal pile 50 is excessively long, it is too hard to drive it straightforwardly at a predetermined canted angle. The diagonal pile 50 may be deviated from the predetermined angle during driving. As a result, there was another drawback of occurrence of secondary stress due to bending, in addition to loss of a desired supporting force.

Pile 5 substantially gives no resistance to horizontal external force such as earth pressure, hydraulic pressure in the ground, or seismic force. Pile 5 supports only vertically downward load such as deadweight or live load of the upper concrete. In addition, banking may be provided in front of the sheet pile wall 49 to enhance stability of the water area structure. In this case, the diagonal pile 50 has excessively high bending moment generated by weight of the banking. As a result, considerably large sectional strength is required for the diagonal pile 50. Thus, there is another drawback of costly material and costly execution for the diagonal pile 50.

As described hereinbefore, in the water area structure using the conventional placing member for underwater ground, the diagonal pile 50 and the sheet pile wall 49 are arranged to have axial supporting force for giving main resistance to the horizontal external force such as the earth pressure, the hydraulic pressure in the ground, or seismic force. Therefore, the conventional structure can not take full advantage of transverse supporting force, which is one of several supporting force functions in the ground.

Thus, it is a first object of the present invention to provide a water area structure using a placing member for underwater ground, which enables to efficiently take advantage of supporting force functions in a ground, i.e., axial supporting force and transverse supporting force.

In the invention, compressive force applied to diagonal member is converted into forcing pressure, bending moment, and shearing force applied to a pile in a connecting portion between diagonal member and the pile. Accordingly, the forcing pressure generated in the pile can be considerably decreased to reduce a depth by which the pile is driven into the hard bearing stratum. Thereby, it is a second object of the invention to improve efficiency in execution of driving the pile, and to avoid local buckling of the pile.

Further, in the invention, the drawing force generated in the sheet pile wall can be also reduced as well as the forcing pressure generated in the forward pile. Consequently, it is possible to reduce a depth by which the sheet pile wall is driven into the hard bearing stratum. Thus, it is a third object of the invention to improve efficiency in execution of the sheet pile wall, and to avoid local buckling of the steel sheet pile.

It is a fourth object of the invention to provide a large canted angle of diagonal member with respect to a vertical line, and to further reduce the axial force generated in the forward pile or the sheet pile wall.

In the invention, the pile and the sheet pile wall driven into the underwater ground give resistance to external force such as earth pressure, hydraulic pressure in the ground, or seismic force. In this case, both the axial supporting force and the transverse supporting force generated in the underwater ground can be efficiently used. The canted angle of the diagonal member can be optionally determined with respect to a vertical line. Thus, it is a fifth object of the invention to adjust axial force generated in the pile or the sheet pile wall according to ground condition, condition of the external force, or the like, and to enhance degree of freedom in designation tremendously.

Further, it is a sixth object of the invention to reduce cost required for construction to a great extent by reducing amount of material used for a water area structure, and improving execution efficiency.

Moreover, it is a seventh object of the invention to arrange the piles and the diagonal members closely in front of the sheet pile wall, and to provide a fish school effect in that a flock of fish are easy to gather.

DISCLOSURE OF THE INVENTION

In a water area structure of the present invention, a number of placing members 1 are arranged at suitable intervals with each other, and are driven into underwater ground 2. A number of diagonal members 3 diagonally downwardly extend from upper portions of the placing members 1 toward the underwater ground 2. The proof compressive diagonal members 3 are laterally arranged at suitable intervals with each other. A pile 5 passes through a lower cylindrical body 4 which is coupled with a lower end of the diagonal member 3. Pile 5 is driven into the underwater ground 2, and the lower cylindrical body 4 is connected to an intermediate portion of pile 5. An upper end of pile 5, that of the placing member 1, and that of the diagonal member 3 are coupled through a coupling member 6. Therefore, the water area structure using the placing member according to the invention, can take full advantage of supporting force functions in the ground, i.e., axial supporting force and transverse supporting force.

In order to reinforce the water area structure using the placing member, in the invention, the upper end of the diagonal member 3 is connected to an upper beam 7 which extends in the direction crossing the placing member for underwater ground 1. The upper beam 7 is connected to the upper portion of the placing member 1 and that of pile 5.

BRIEF DESCRIPTION OF THE DRAWINGS

FIG. 1 is a vertical side view showing overall construction. FIG. 2 is partial vertical side view showing an enlarged coupling portion between a forward pile and a proof compressive diagonal member of FIG. 1. FIG. 3 is a sectional view taken along line A—A of FIG. 1.

FIG. 6 is a vertical side view showing overall construction. FIG. 7 is a partial vertical side view showing an enlarged coupling portion for coupling and upper portion of a sheet pile wall and that of a diagonal member with a coupling member of FIG. 6.

FIG. 11 is a plan view of a sheet pile wall. FIG. 12 is an enlarged plan view thereof.

FIG. 17 is a partial vertical side view showing a first example of the coupling structure. FIG. 18 is a vertical side view partially enlarged of FIG. 17. FIG. 19 is a plan view of the first example of the coupling structure.

FIG. 20 is a partial vertical side view showing second example of the coupling structure. FIG. 21 is a plan view showing the second example of the coupling structure. FIG. 22 is a partial vertical side view showing a third example of the coupling structure. FIG. 23 is a plan view showing the third example of the coupling structure. FIG. 24 is a partial vertical side view showing a fourth example of the coupling structure. FIG. 25 is a plan view showing the fourth example of the coupling structure. FIG. 26 is a vertical front view showing the fourth example of the coupling structure. FIG. 27 is a vertical front view showing an example wherein shearing forcing transfer members are inserted into and fixed in slits. FIG. 28 is a partial vertical side view showing a fifth example of the coupling structure. FIG. 29 is a plan view showing the fifth example of the coupling structure.

FIG. 30 is a vertical side view showing overall construction. FIG. 31 is a plan view. FIG. 32 is a partial vertical side view showing an enlarged coupling portion between a pile and a diagonal member of FIG. 30. FIG. 33 is a vertical side view showing a coupling portion for coupling an upper beam with the pile and a sheet pile body. FIG. 34 is a vertical front view thereof.

FIG. 36 is a partial vertical side view showing a first example of the coupling structure. FIG. 37 is a partial vertical side view showing a second example of the coupling structure. FIG. 38 is a partial vertical side view showing a third example of the coupling structure. FIG. 39 is a partial vertical side view showing a fourth example of the coupling structure. FIG. 40 is a partial vertical side view showing a fifth example of the coupling structure.

FIGS. 41 is a vertical side view showing a water area structure using a placing member for underwater ground. FIG. 42 is a plan view. FIG. 43 is side view of a supporting frame. FIG. 44 is a side view partially enlarged of FIG. 43. FIG. 45 is a plan view showing a coupling portion between an upper beam and a diagonal member. FIG. 46 is a front view thereof.

FIG. 47 is a side view of a first example of the coupling portion. FIG. 48 is a partial vertical front view of FIG. 47. FIG. 49 is a side view of a second example of the coupling portion. FIG. 50 is a front view thereof. FIG. 51 is a side view of a third example of the coupling portion. FIG. 52 is a front view thereof.

FIG. 53 is a vertical side view of a first example of the coupling structure. FIG. 54 is a vertical front view thereof. FIG. 55 is a vertical side view of a second example of the coupling structure. FIG. 56 is a vertical front view thereof. FIG. 57 is a vertical side view of a third example of the coupling structure. FIG. 58 is a cross-sectional plan view thereof. FIG. 59 is a vertical side view of a fourth example of the coupling structure. FIG. 60 is a vertical front view thereof. FIG. 61 is a partial vertical side view of a fifth example of the coupling structure. FIG. 62 is a vertical front view thereof. FIG. 63 is a cross-sectional plan view thereof. FIG. 64 is a side view of a sixth example of the coupling structure. FIG. 65 is a vertical front view thereof. FIG. 66 is a partial vertical side view of a seventh example of the coupling structure. FIG. 67 is a sectional view taken along line B—B of FIG. 66.

FIG. 76 is a vertical side view, is a partial cross-sectional plan view thereof.

BEST MODE FOR EMBODYING THE INVENTION

The present invention will be described in more detail in the following with reference to the accompanying drawings.

Figure 4:
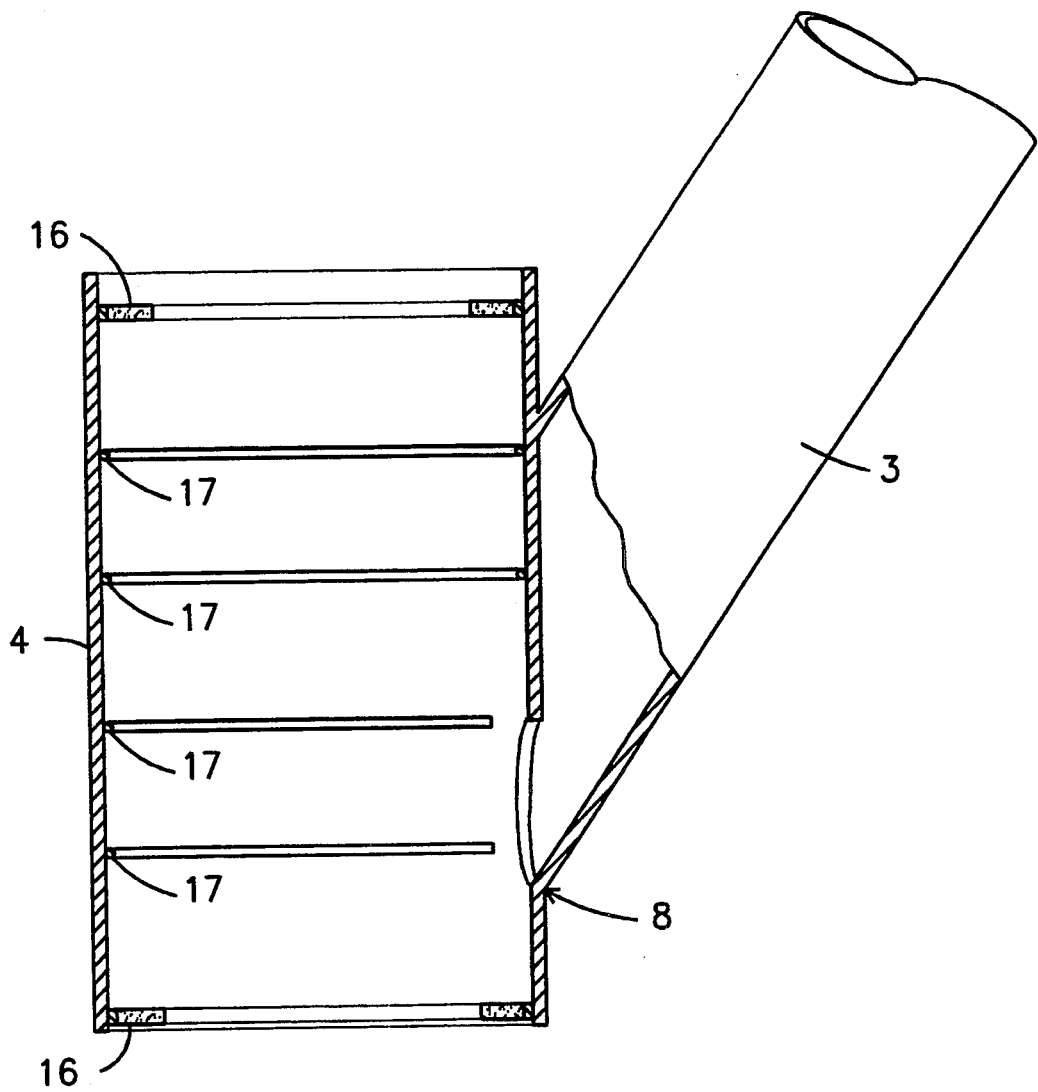
FIG. 4 is a partial vertical side view showing an enlarged lower portion of a diagonal member with a cylindrical body used in the first embodiment of the invention.

FIG. 4 shows a supporting member 8 used for embodiments of the present invention. A lower cylindrical body 4 comprising a steel sleeve is secured by welding to a lower end of a diagonal member 3 comprising a steel pipe. The lower cylindrical body 4 is provided with an opening for communicating the inside thereof with the inside of the diagonal member 3. More specifically, each cylindrical body 4 has a first cylindrical part that ensleeves its associated pile 5 and has a second part that diverges from said first part to provide a mounting surface for the lower end of its associated diagonal member 3. Rubber seal rings 16 are secured to an upper end and a lower end inside the lower cylindrical body 4 by a fastening means such as an adhesive or a bolt. Steel bars or the like are secured by welding within the lower cylindrical body 4 to form connectors 17.

Figure 5:
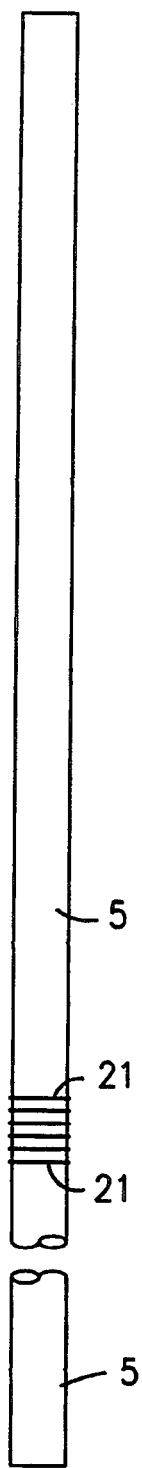
FIG. 5 is a side view partially cut away of a pile with connectors used in the first embodiment of the invention.
Figure 6:
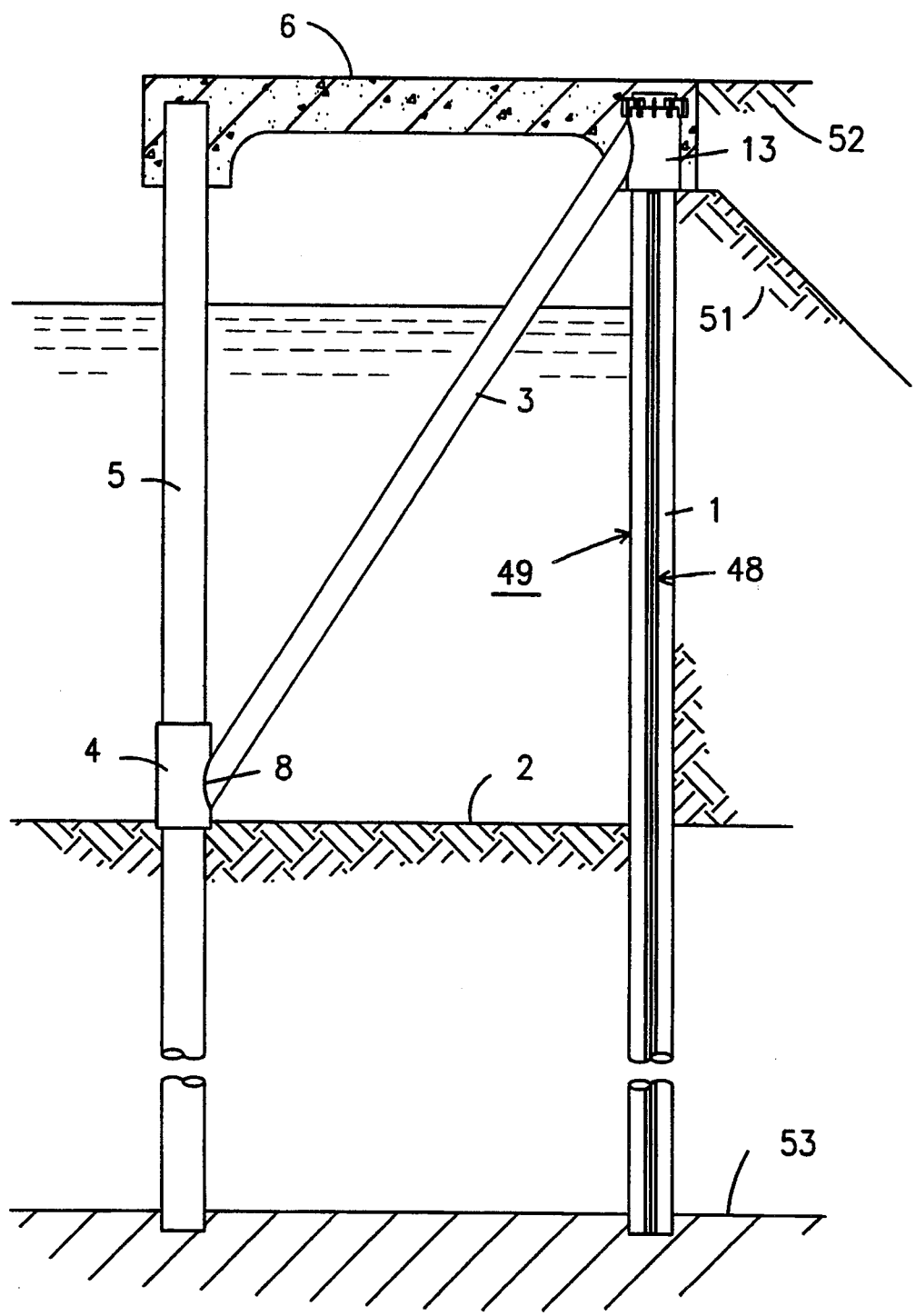
FIGS. 6 and 7 show a second embodiment of a water area structure using a placing member for underwater ground of the present invention.
Figure 7:
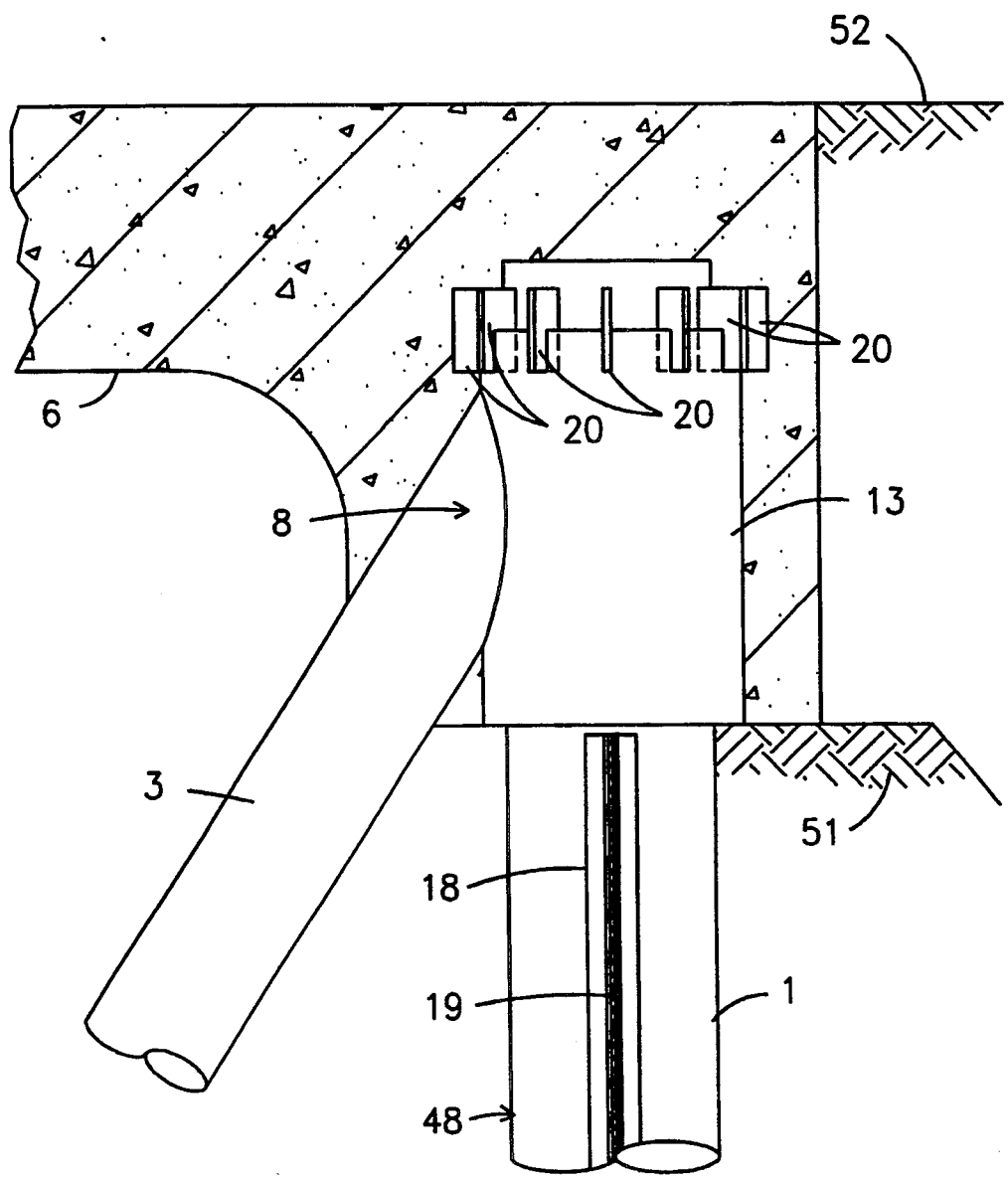
Figure 8:
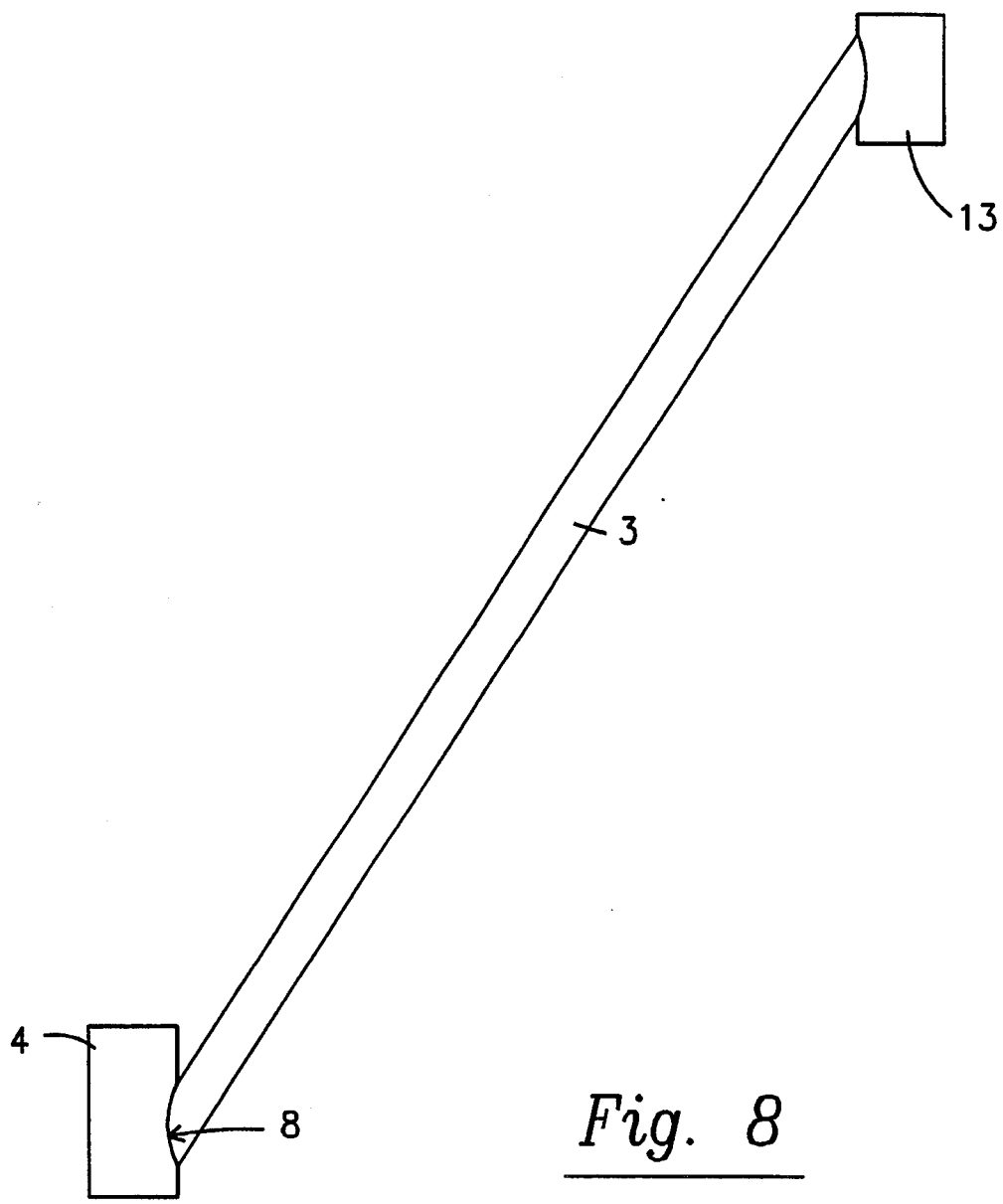
FIG. 8 is a side view of a diagonal member with a cylindrical body used in the second embodiment of the invention.
Figure 9:
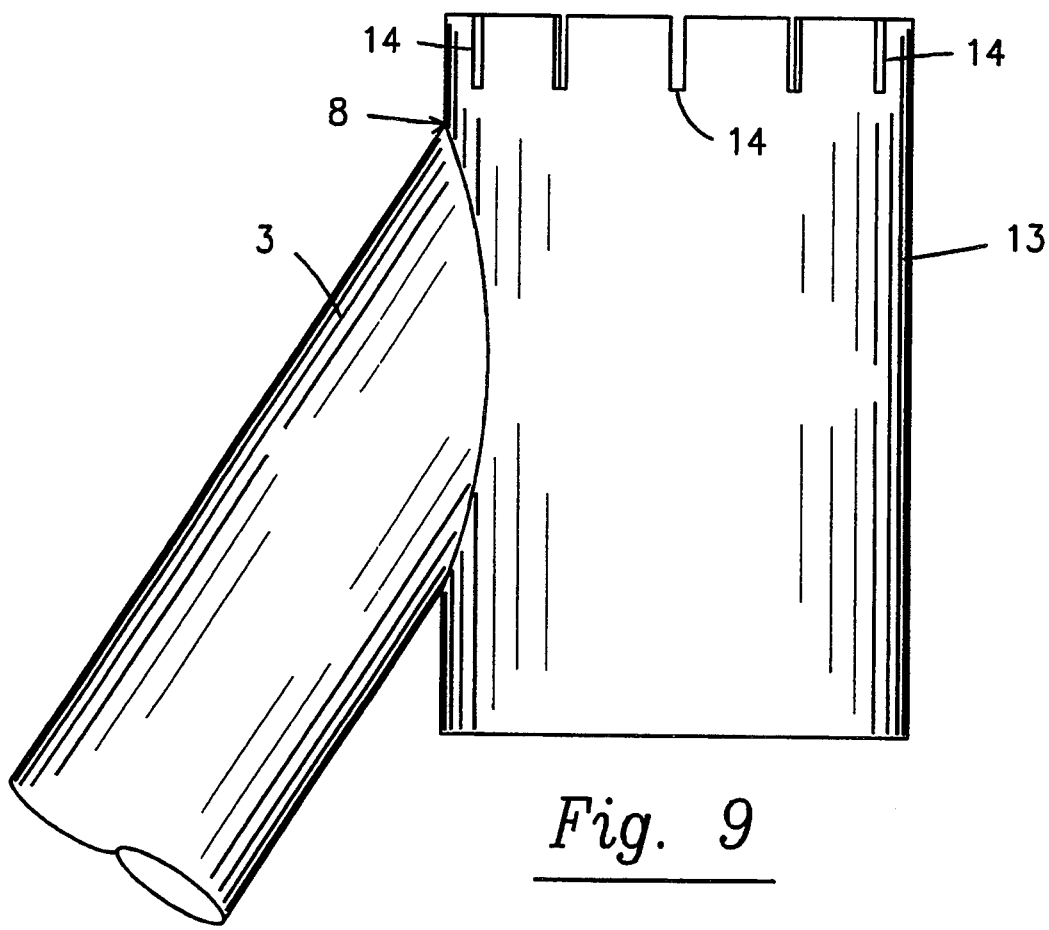
FIG. 9 is a side view showing an enlarged upper portion of the diagonal member with the cylindrical body.
Figure 10:
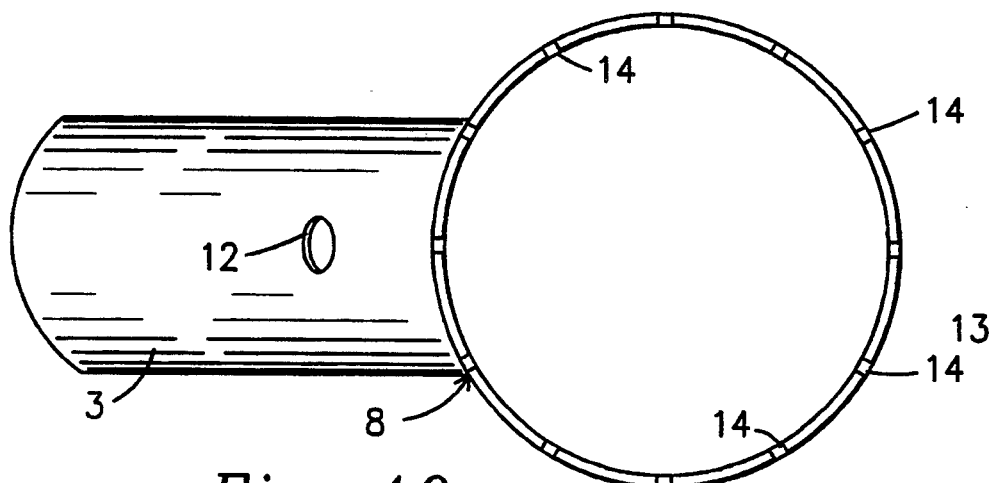
FIG. 10 is a plan view thereof.

FIG. 5 shows a pile with connectors used for the embodiments of the present invention. The pile 5 comprising a steel pipe pile is provided with a plurality of steel bars for connector 21. The steel bars for connector 21 are secured by welding to the outer periphery of pile 5. Inside the welded portion, pile 5 is inserted into the lower cylindrical body 4.

Figure 1:
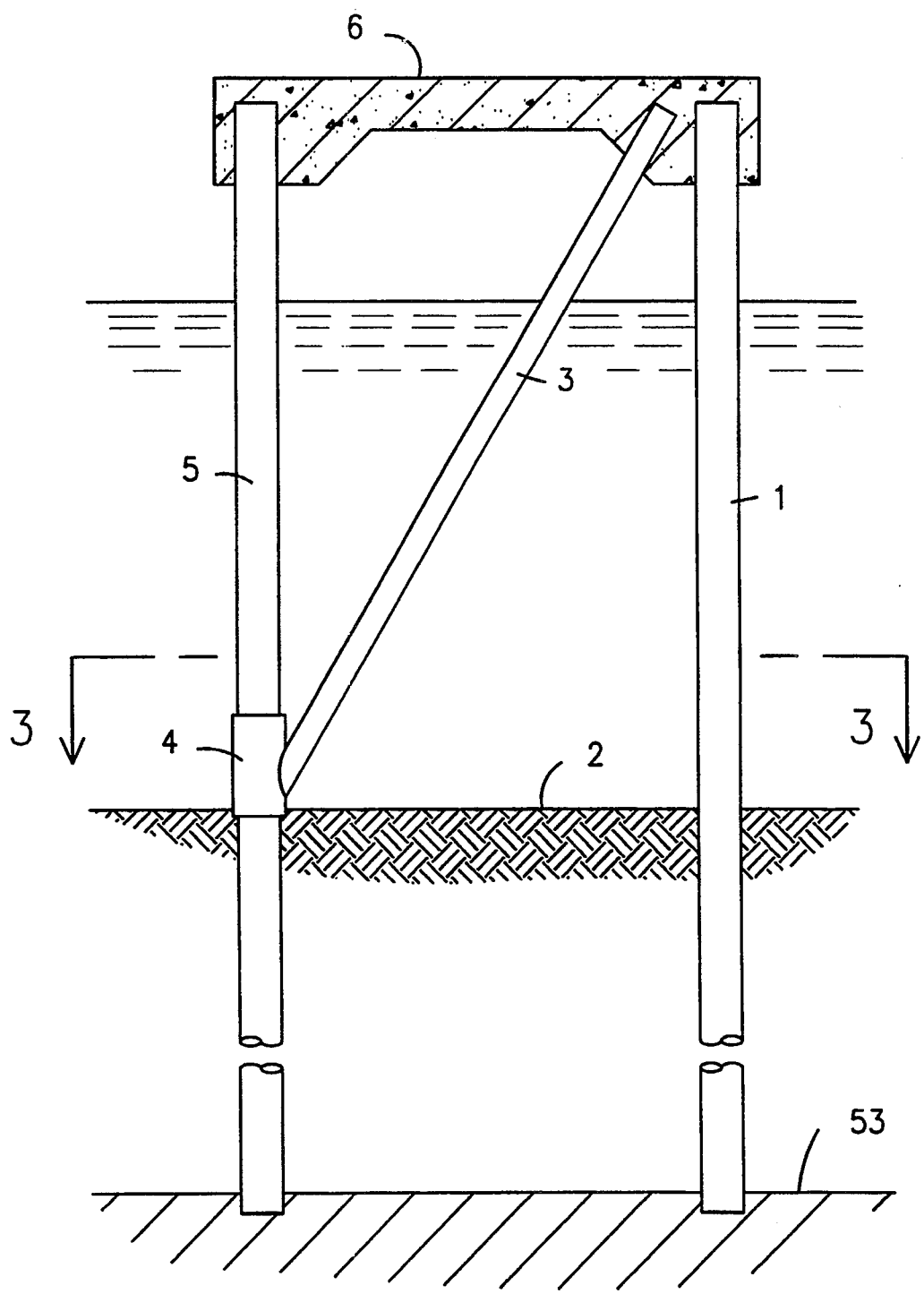
FIGS. 1 through 3 show a first embodiment of a water area structure using a placing member for underwater ground of the present invention.
Figure 2:
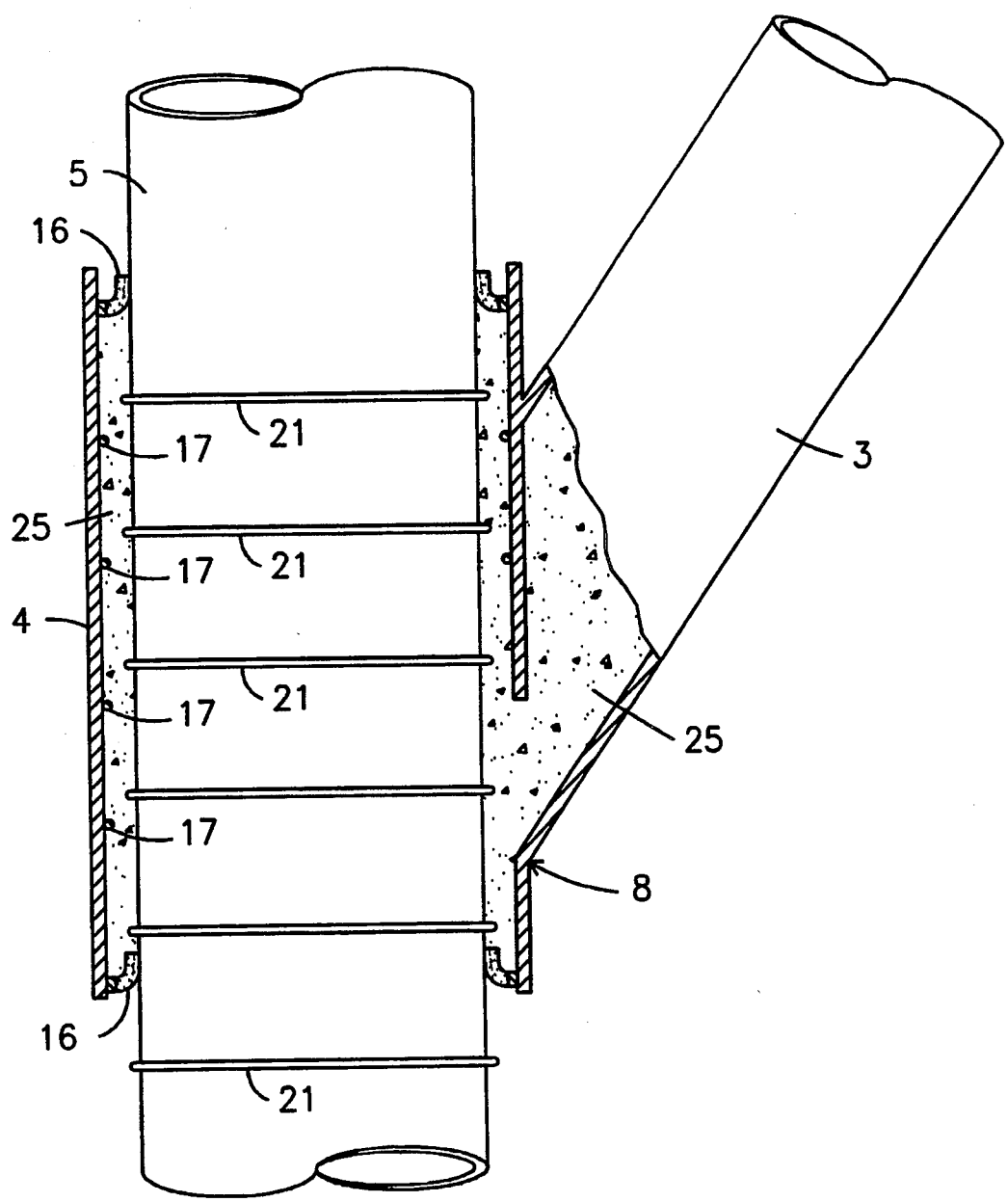
Figure 3:
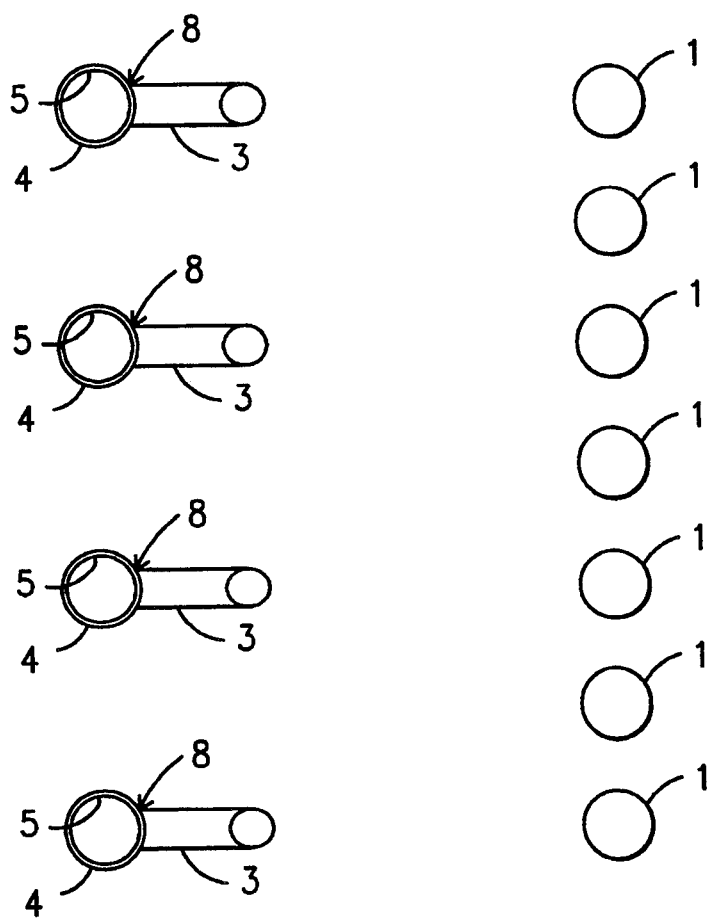

Referring now to FIGS. 1 through 3, a description will be given of a water area structure using a first embodiment of a placing member for underwater ground of the present invention.

First, placing members 1 comprising a plurality of steel pipe piles are driven at lateral intervals into underwater ground 2 in the sea. Each pile 5 is driven into the underwater ground 2 at a position on the shore or off the shore, space apart from each placing member 1. The lower cylindrical body 4 which forms a part of supporting member 8 is fitted onto each pile 5. Inside the fitted outer portion, an annular steel bar connector 21 is secured to each forward pile 5. An upper end of diagonal member 3 is arranged in the vicinity of that of the placing member 1. Time elapsing curing material 25 such as concrete is injected from the upper end of diagonal member 3, and fills the space between the lower cylindrical body 4 and the pile 5. The upper end of the placing member 1, that of the diagonal member 3, and that of the pile 5 are embedded and secured into a coupling member 6. The coupling member 6 comprises a beam, a top plate, or the like which is made of a time elapsing curing material such as concrete.

FIGS. 6 through 16 show a second embodiment of the present invention. A lower cylindrical body 4 having a construction as shown in FIG. 4 is secured by welding to a lower end of a diagonal member 3 comprising a steel pipe. An upper cylindrical body 13 comprising a vertical steel cylindrical body is secured by welding to an upper end of diagonal member 3. A number of slits 14 (FIG. 9) are provided at intervals about the circumference of an upper portion of the upper cylindrical body 13. An injection hole 12 (FIG. 10) is provided in an upper surface on the side of the upper end of diagonal member 3. A supporting member 8 comprises diagonal member 3, the lower cylindrical body 4 and the upper cylindrical body 13 which are secured to the respective ends of diagonal member 3.

A description will be given of an example of execution for a water area structure using the second embodiment of a placing member for underwater ground of the invention. The placing member for underwater ground comprises supporting member 8, pile 5 with connectors as shown in FIG. 5, and a steel sheet pile 48.

As shown in FIGS. 11 and 12, the placing member 1 comprises a steel pipe sheet pile body. A steel pipe sheet pile comprises a slit pipe joint 18 and a T-shaped steel joint 19 which are respectively secured to one side portion and the other portion of the placing member 1. The placing member 1 and the steel pipe sheet pile are used as the steel sheet pile 48. A number of steel sheet piles 48 are engaged with each other, and are driven into underwater ground 2 to form a sheet pile wall 49.

Figure 13:
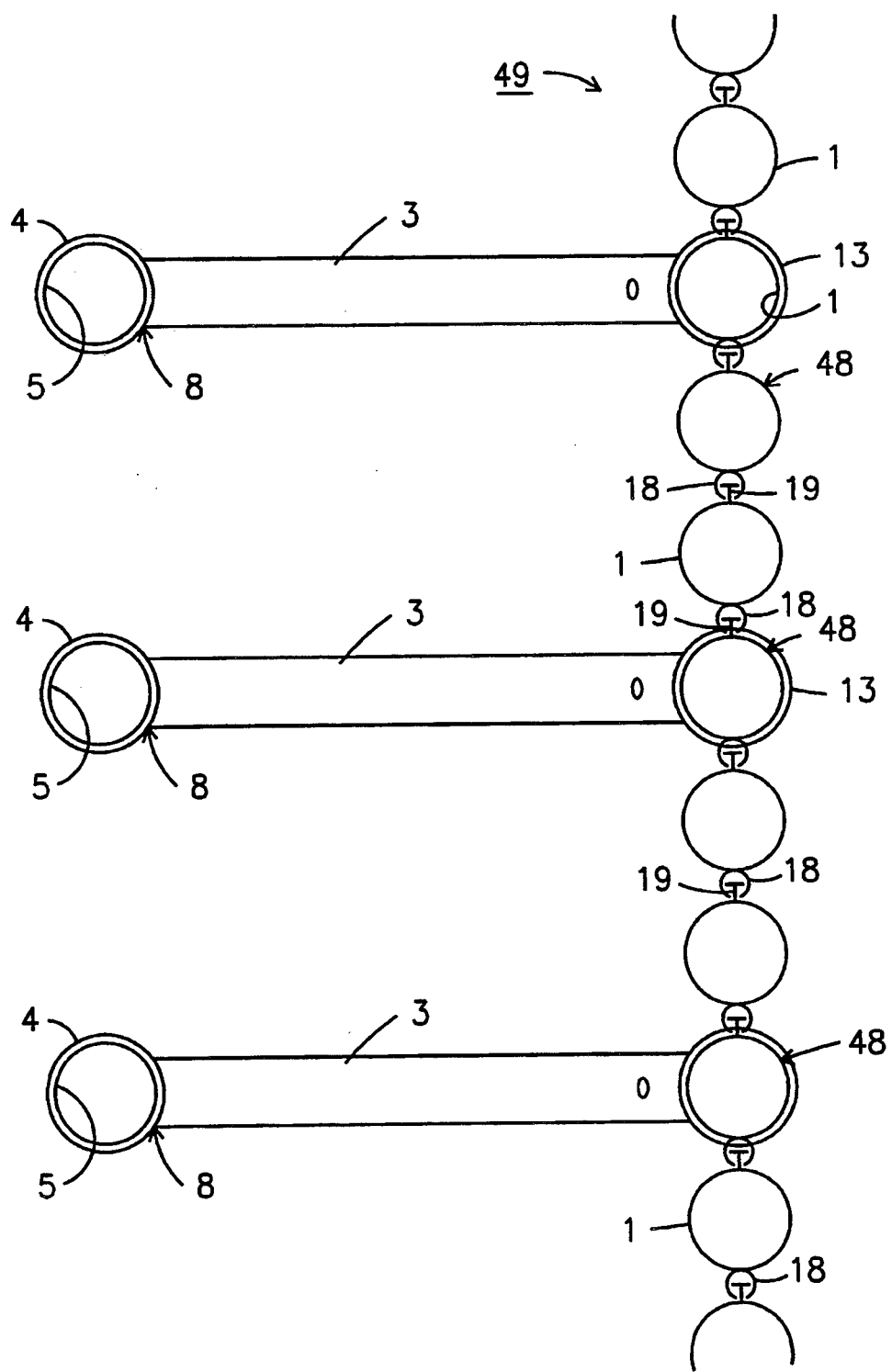
FIG. 13 is a plan view showing the diagonal member with the cylindrical body interposed between a sheet pile body of the sheet pile wall and a forward pile.
Figure 14:
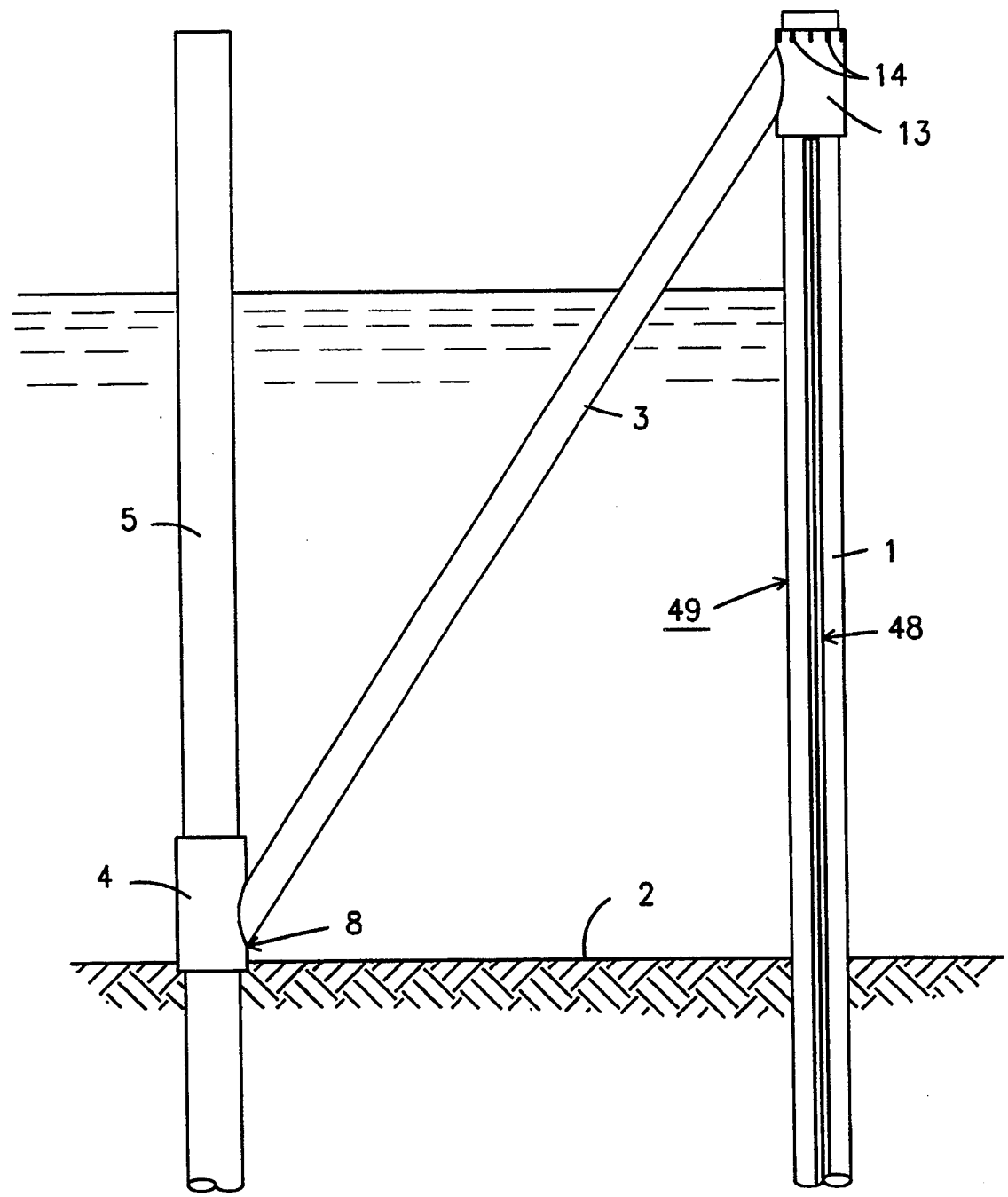
FIG. 14 is a partial vertical side view thereof.

Referring now to FIGS. 13 and 14, a number of piles 5 with connectors are arranged at intervals in the longitudinal direction of the sheet pile wall. Thereafter, piles 5 are driven into the underwater ground 2 at a position off the shore, where is apart from the sheet pile wall 49. The lower cylindrical body 4 in supporting member 8 is fitted onto pile 5, and is mounted on the underwater ground 2 or is arranged in the vicinity of the underwater ground. Further, diagonal member 3 in supporting member 8 is arranged to be positioned on a vertical plane perpendicular to the sheet pile wall 49. The upper cylindrical body 13 in supporting member 8 is fitted to surround an upper end of the placing member 1 comprising the sheet pile body.

Figure 15:
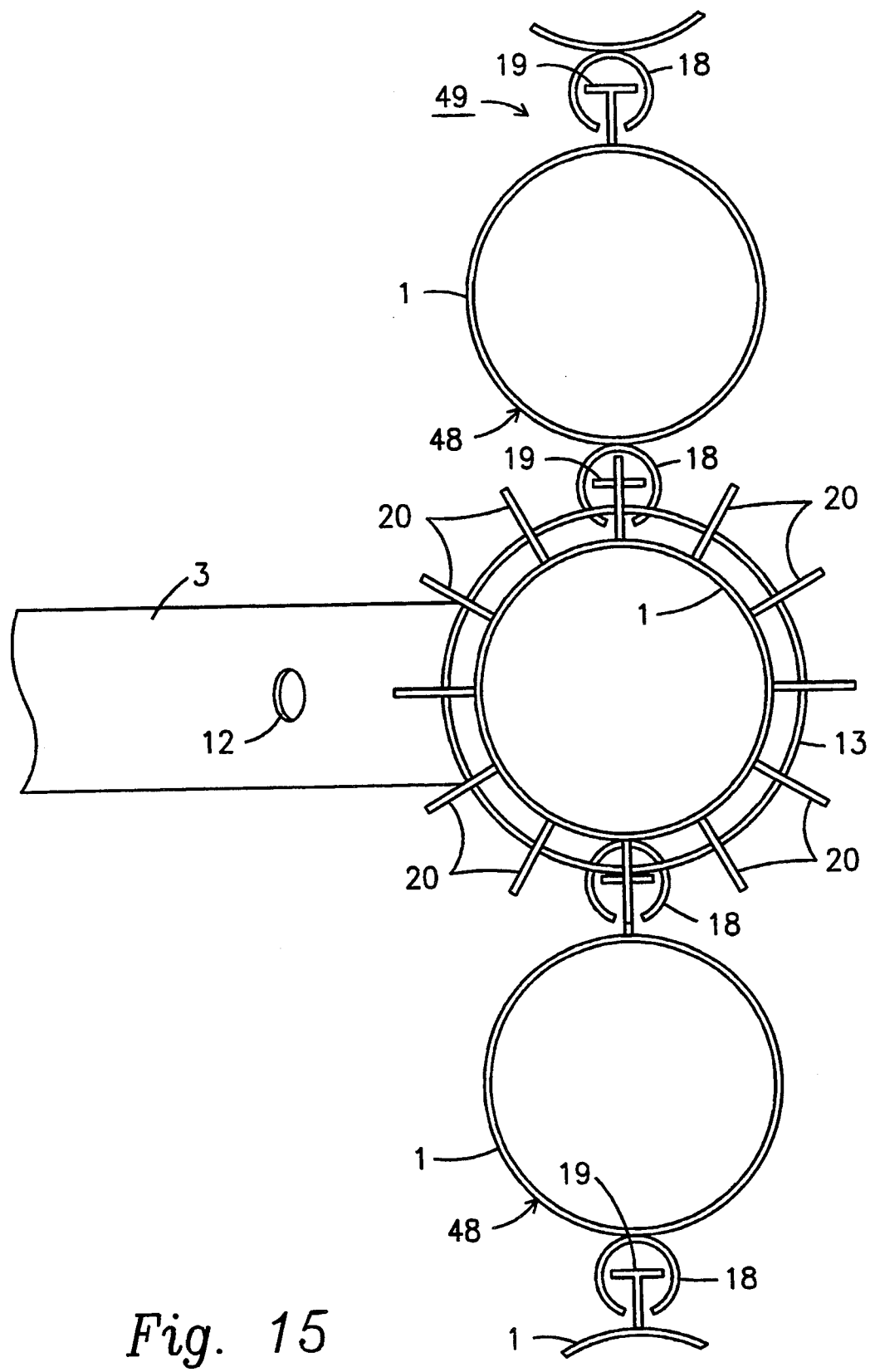
FIG. 15 is a plan view showing the sheet pile body of the sheet pile wall coupled with an upper cylindrical body for fitting sheet pile body.
Figure 16:
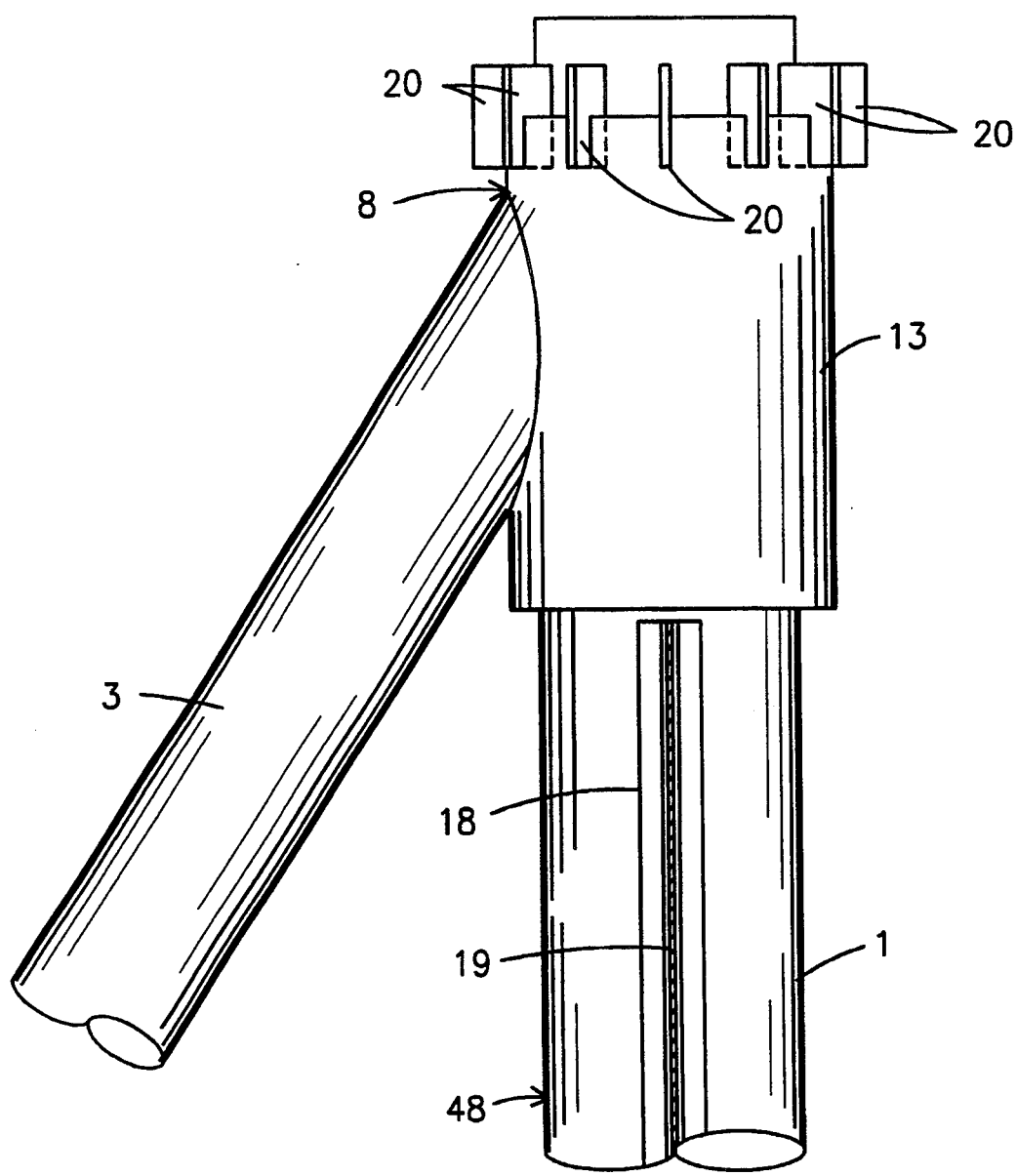
FIG. 16 is a partial vertical side view thereof.

As shown in FIGS. 15 and 16, a steel coupling plate 20 is fitted into each slit 14 in the circumferences of the upper cylindrical body 13. While the coupling plate 20 is contacted with the outer surface of the placing member 1, the coupling plate 20 is secured by welding to the upper cylindrical body 13 and the placing member 1.

Subsequently, the time elapsing curing material such as concrete or mortar is injected through the injection hole 12 which is provided in the upper end of diagonal member 3. Accordingly, the time elapsing curing material 25 fills the space between the lower cylindrical body 4 and 5 as shown in FIG. 2. A coupling member 6 is made of the time elapsing curing material such as concrete, and is provided in the form of a beam or a top plate. The upper cylindrical body 13, the upper end of the placing member 1, that of diagonal member 3, and that of the pile 5 are embedded into the coupling member 6. Back-fill earth 51 (FIG. 6) and earth filling 52 are filled at the back of the sheet pile wall 49.

Figure 17:
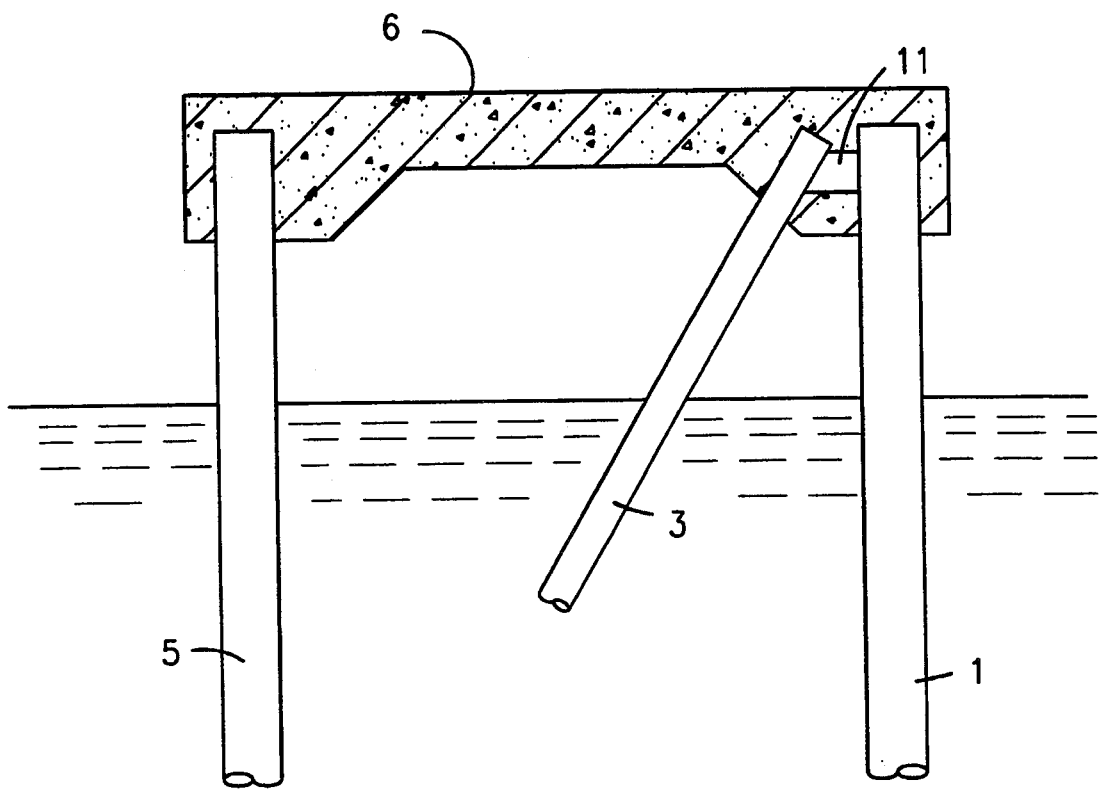
FIGS. 17 through 29 show example of a coupling structure for coupling an upper end of the diagonal member with that of the placing member for underwater ground.
Figure 18:
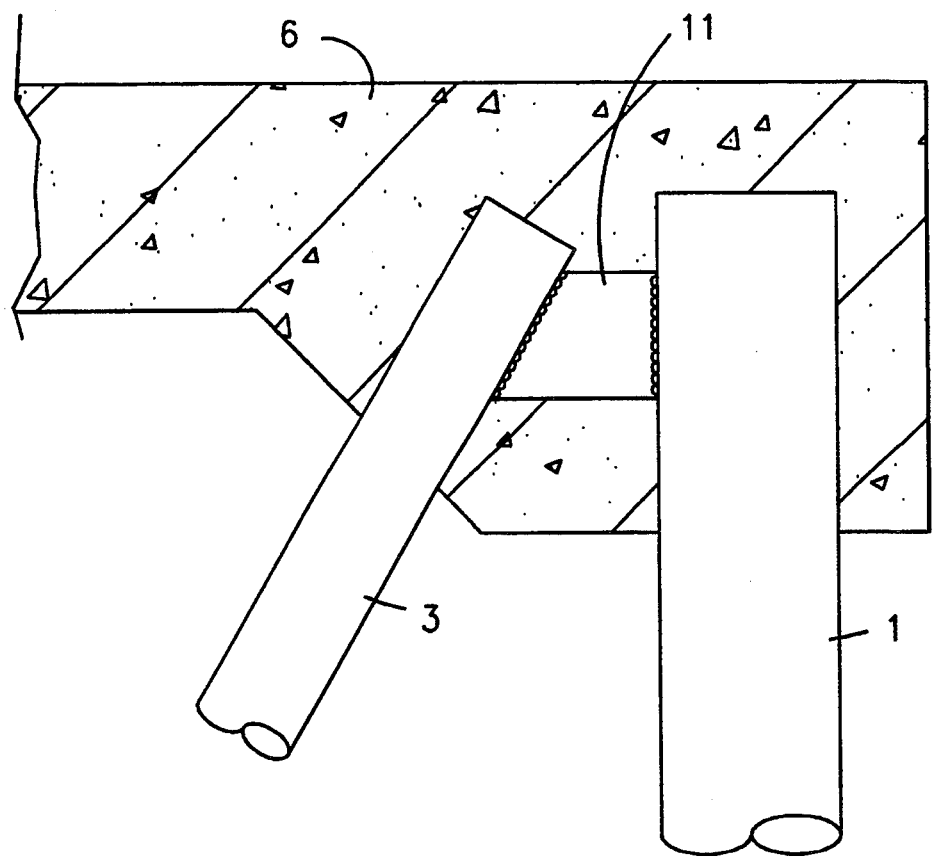
Figure 19:
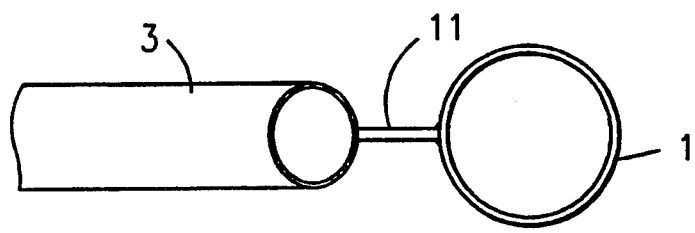

FIGS. 17 through 29 illustrate examples of a coupling structure between coupling the upper end of diagonal member 3 and that of the placing member 1. Referring to FIGS. 17 through 19, a shearing forcing transfer member 11 comprising the desired number of steel plates (one steel plate shown in the drawings) are interposed and secured by welding between the upper end of diagonal member 3 and that of the placing member 1.

Figure 20:
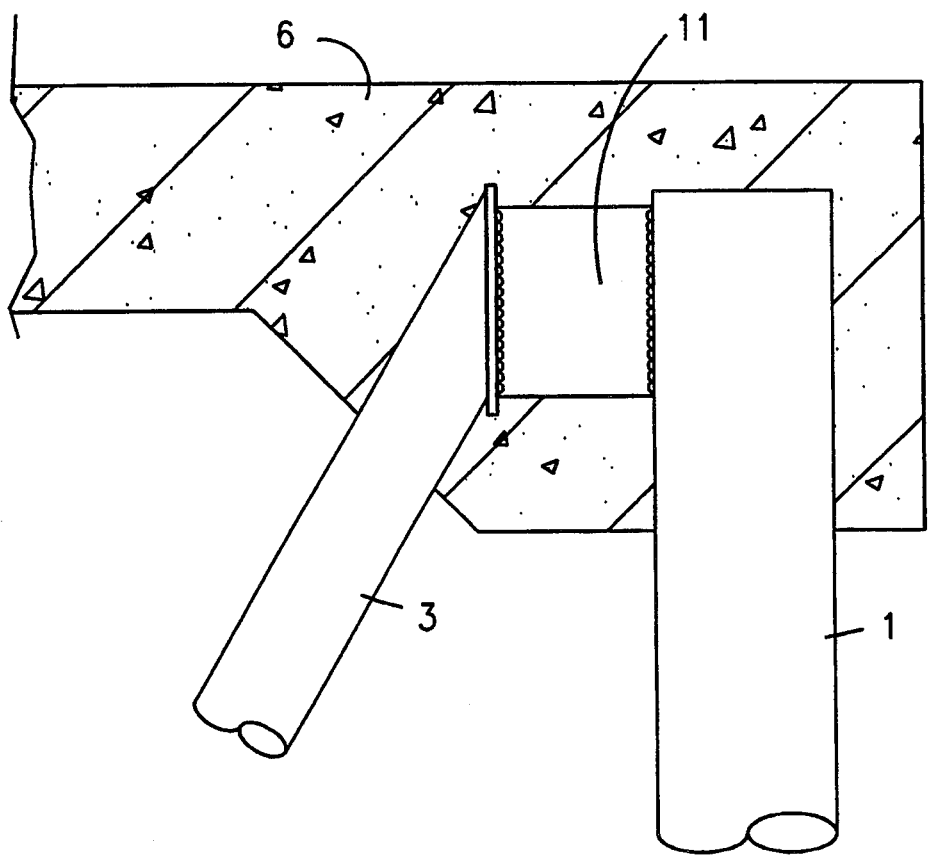
Figure 21:
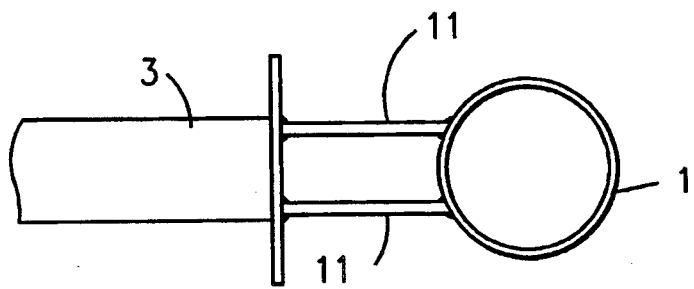

Referring to FIGS. 20 and 21, the shearing forcing transfer member 11 comprising the desired number of steel plates (two steel plates shown in FIG. 21) are interposed and secured by welding between the upper end of diagonal member 3 and that of the placing member 1.

Figure 22:
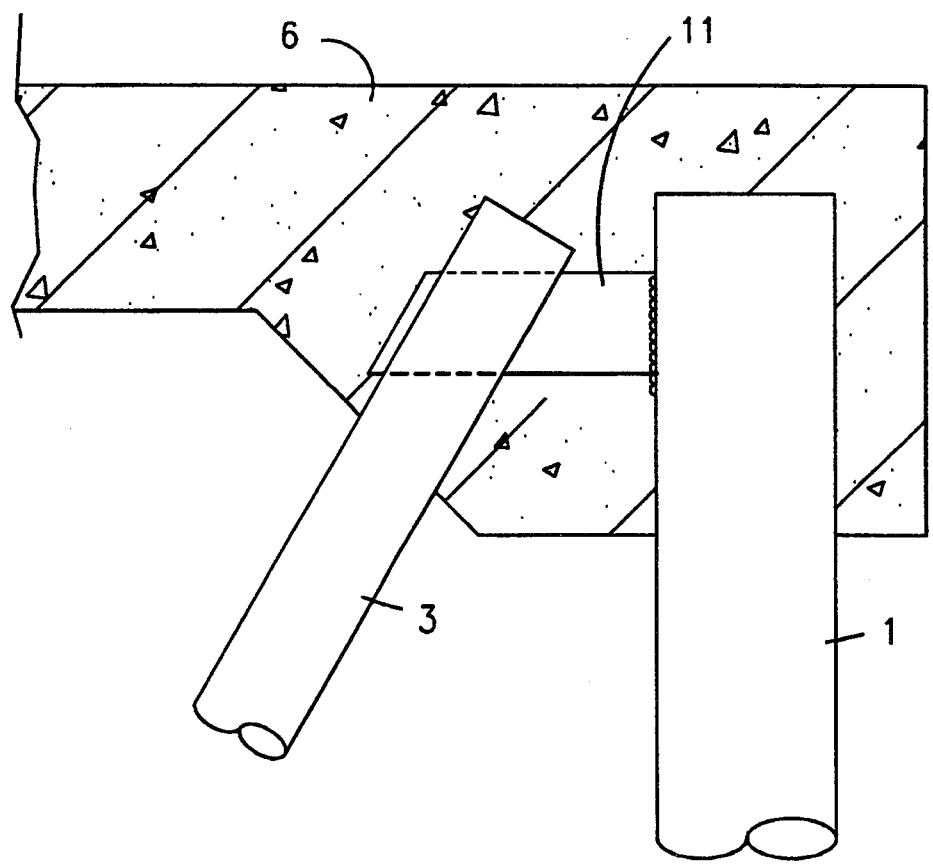
Figure 23:
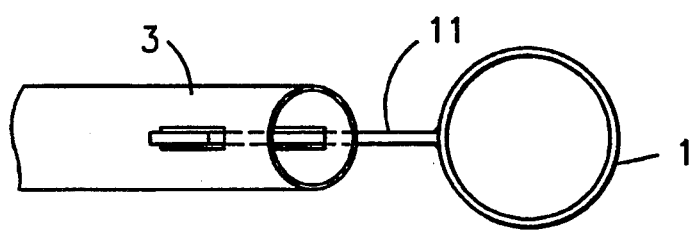

Referring to FIGS. 22 and 23, one end of the shearing forcing transfer member 11 comprising a horizontal steel plate is secured by welding to the upper end of the placing member 1. The shearing forcing transfer member 11 is slidably inserted into elongated holes 15 which are provided in the upper end of diagonal member 3. The shearing forcing transfer member 11 and diagonal member 3 may be secured by welding with each other as required.

Figure 24:
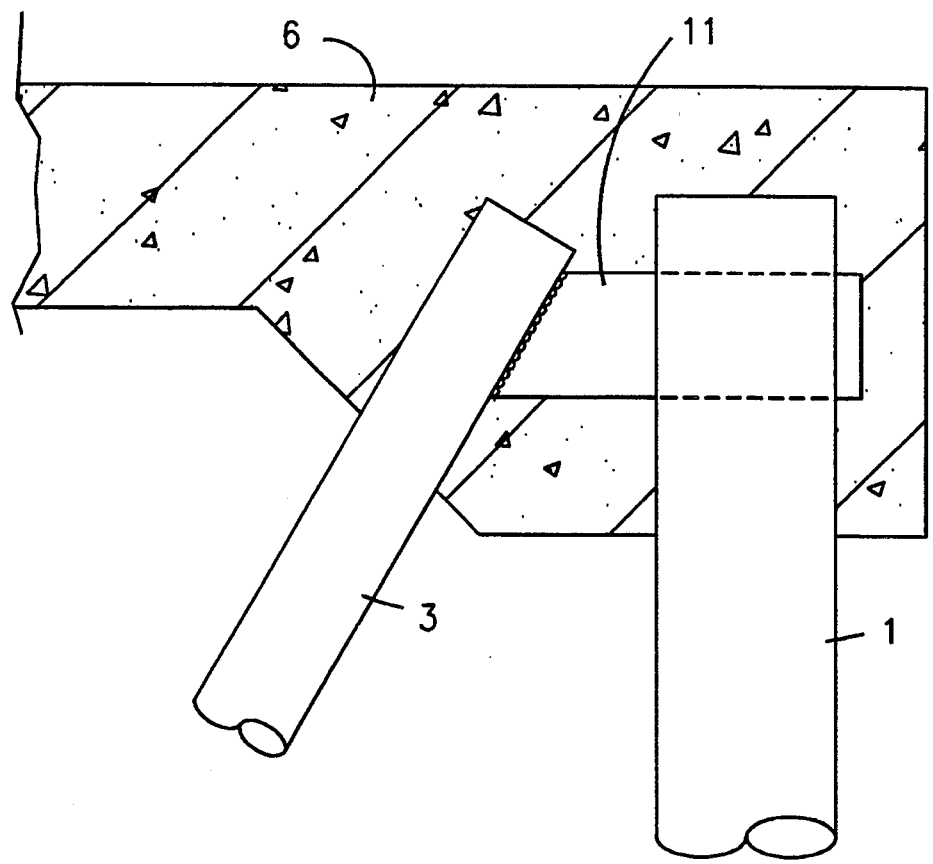
Figure 25:
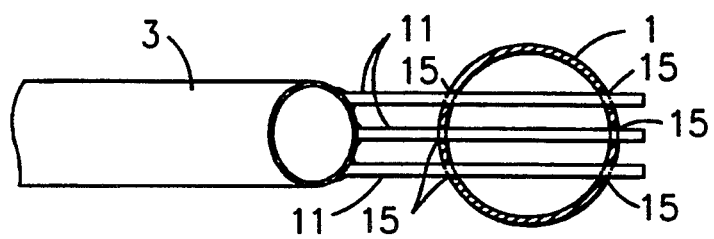
Figure 26:
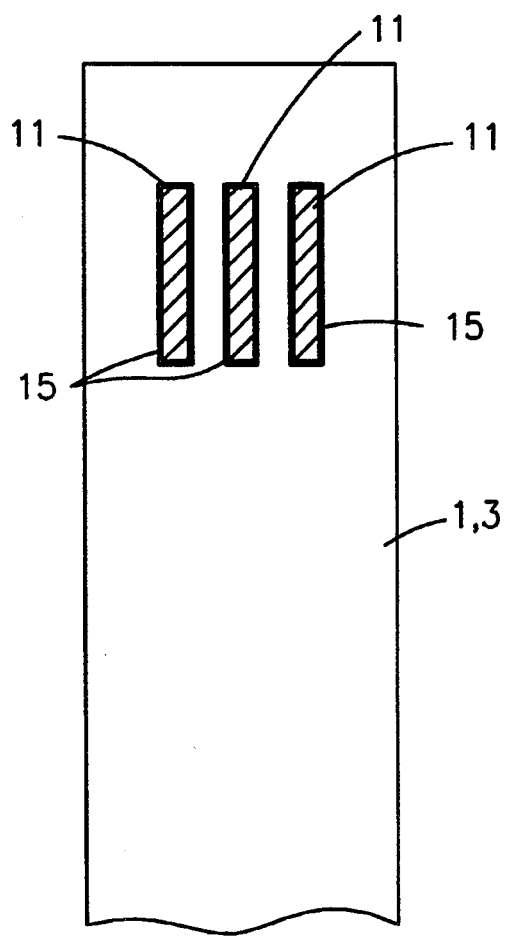

Referring to FIGS. 24 through 26, one end of the shearing forcing transfer member 11 comprising a plurality of horizontal steel plates is secured by welding to the upper end of the placing member 1. The respective shearing forcing transfer members 11 are slidably inserted into the elongate holes 15 which are provided in the upper end of the placing member 1. The shearing forcing transfer member 11 and the placing member for underwater ground 1 may be secured by welding with each other as required.

Figure 27:
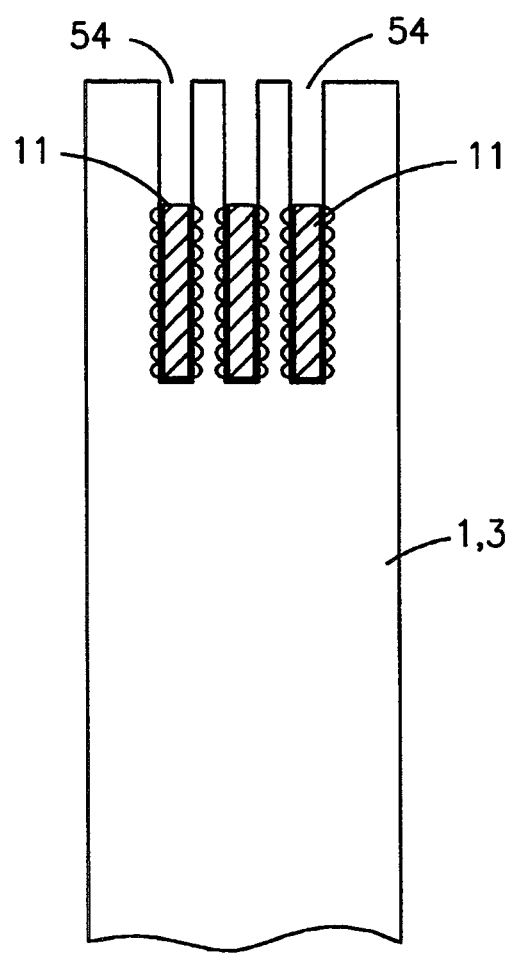

As shown in FIG. 27, the placing member 1 or diagonal member 3 may be provided with slits 54 instead of the elongated holes 15. The shearing forcing transfer members 11 may be fitted into and secured by welding to the slits 54.

Figure 28:
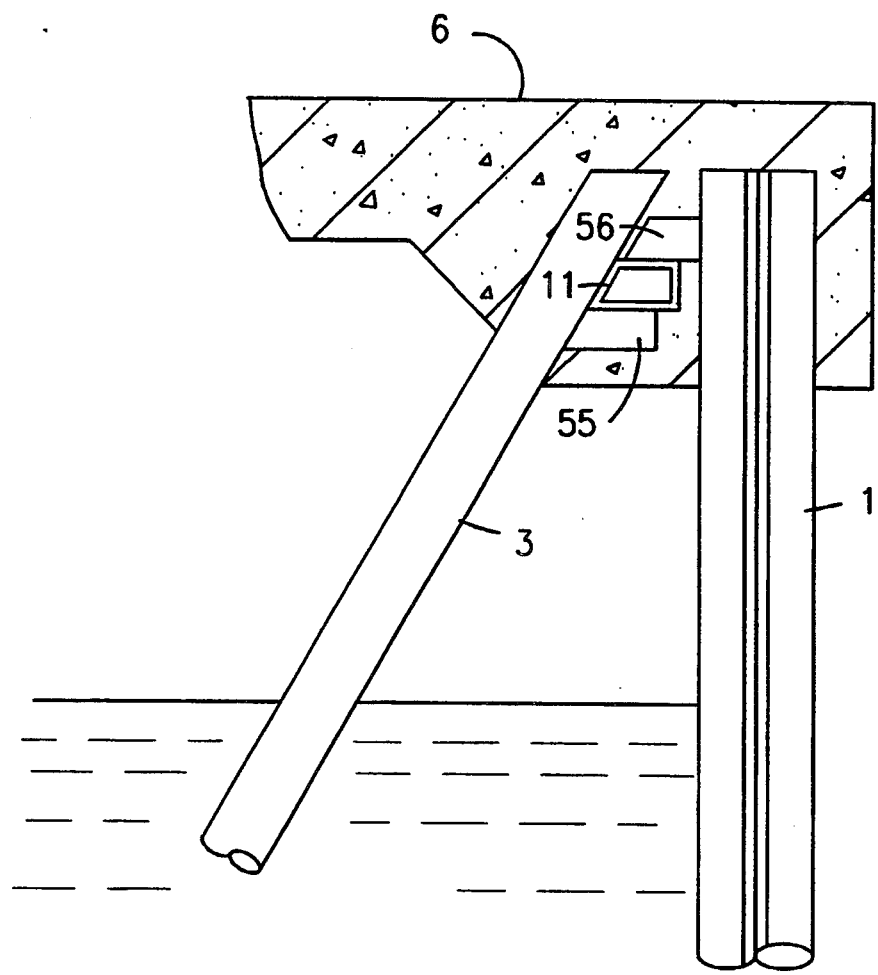
Figure 29:
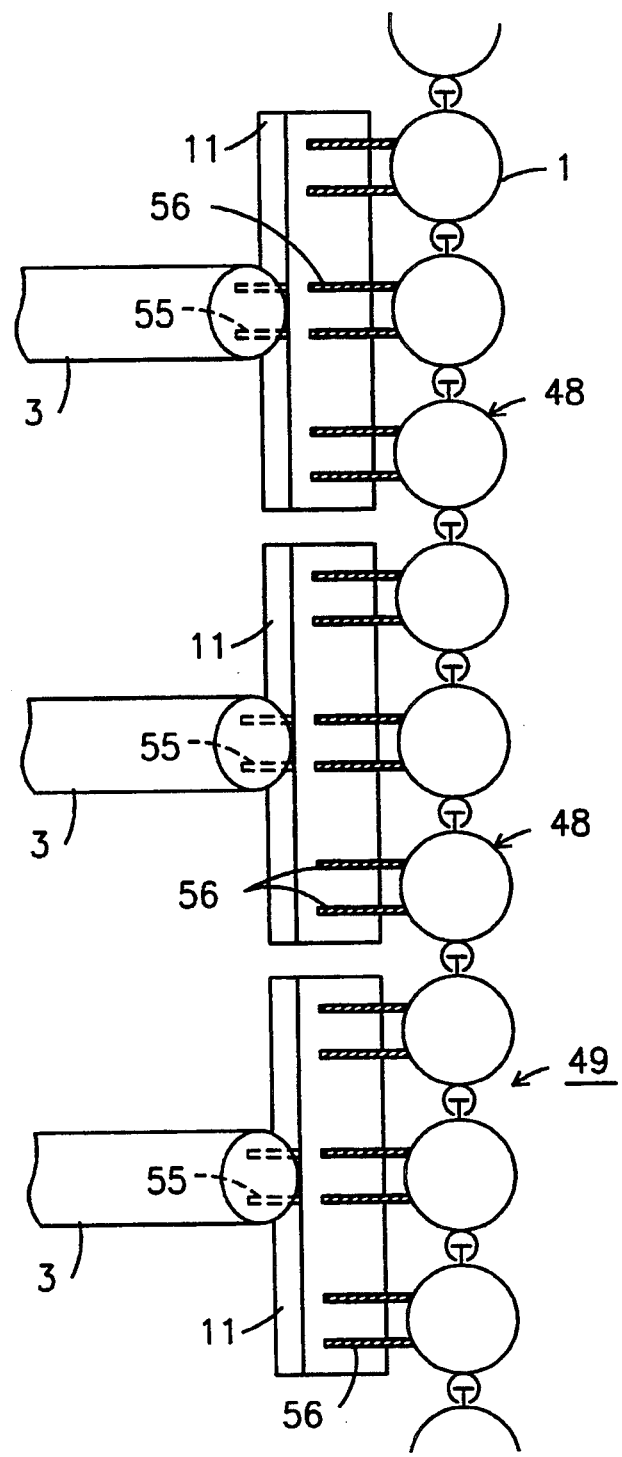
Figure 30:
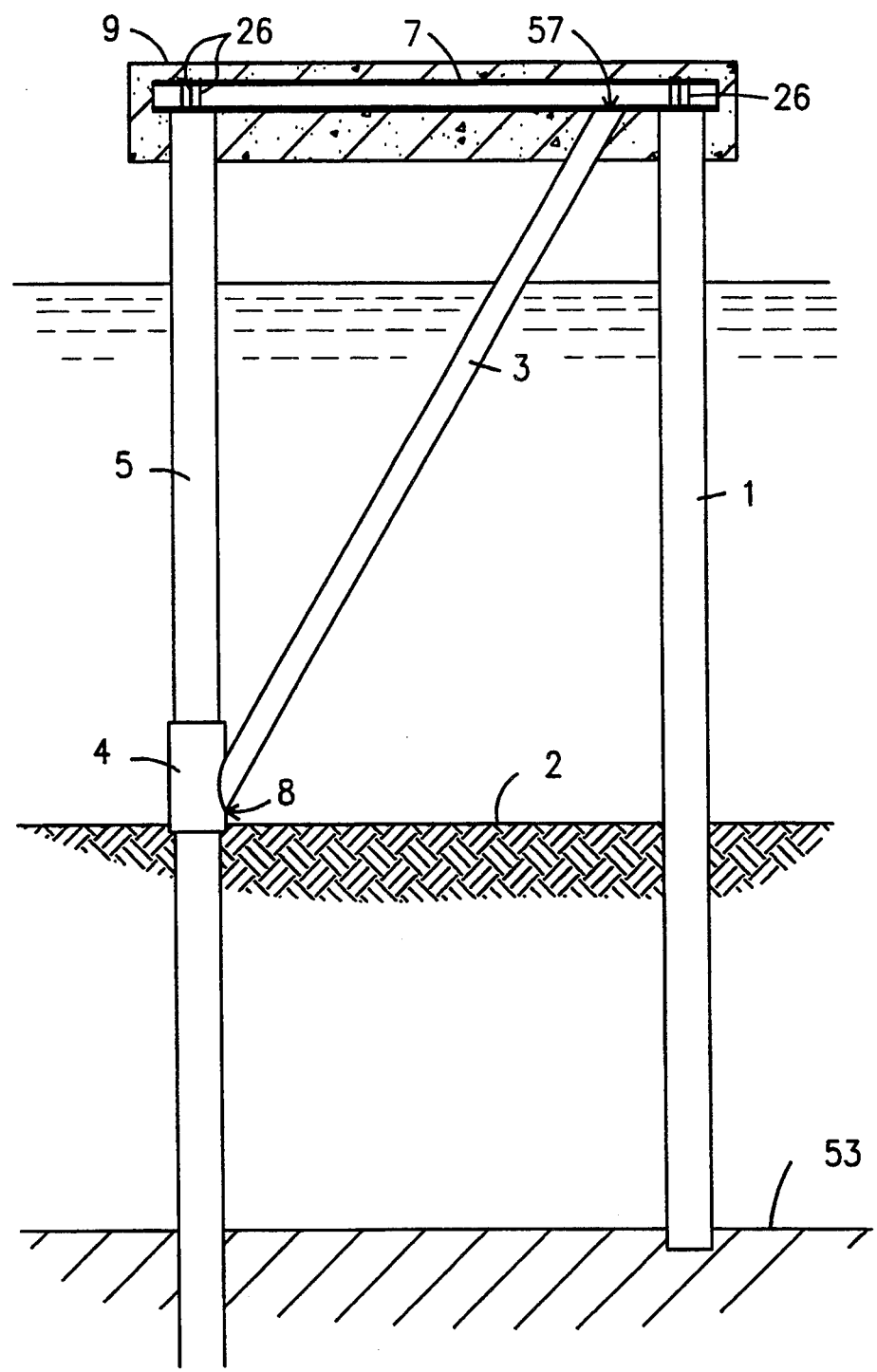
FIGS. 30 through 34 show a third embodiment of a water area structure using a placing member for underwater ground.
Figure 31:
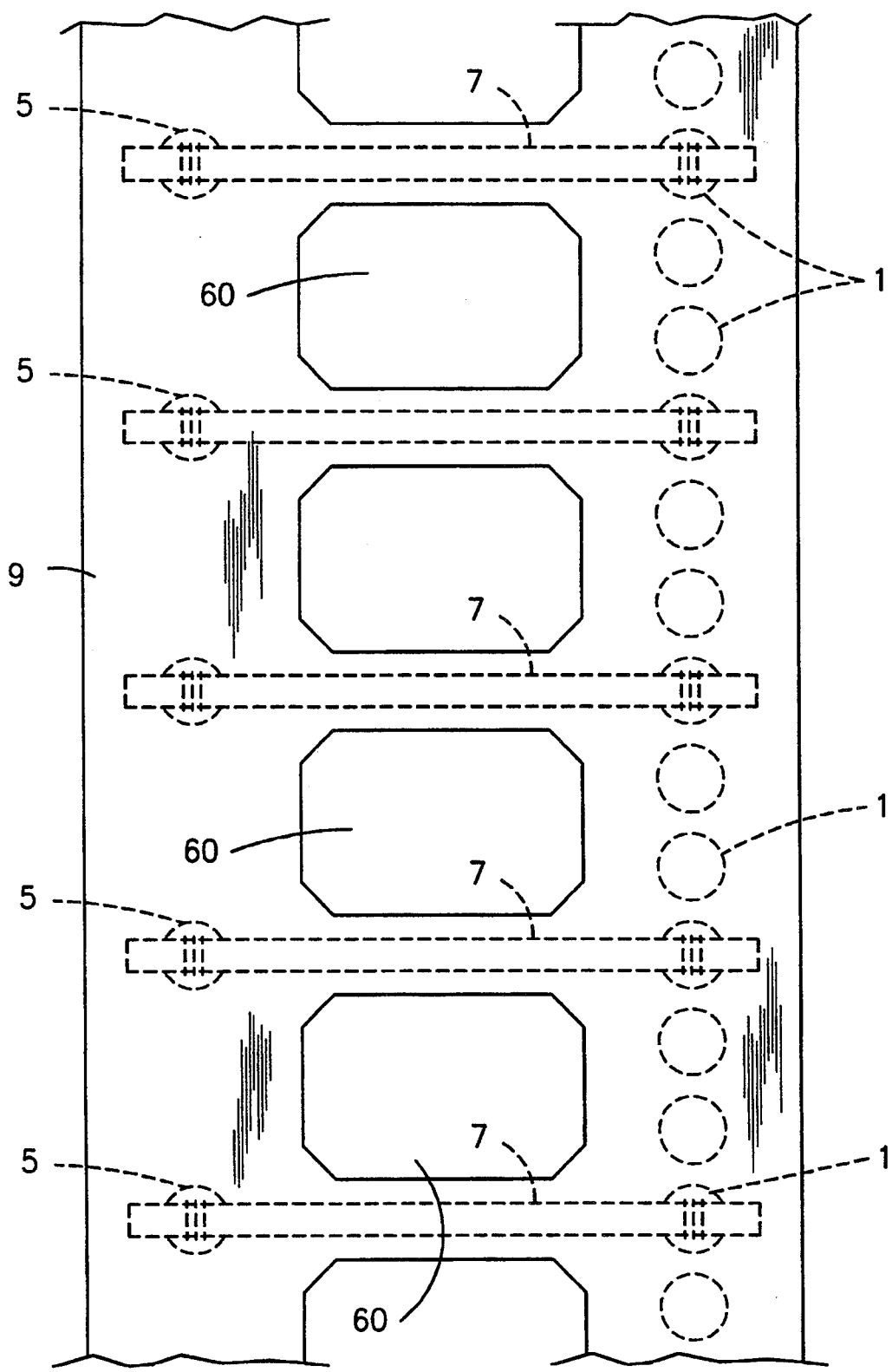
Figure 32:
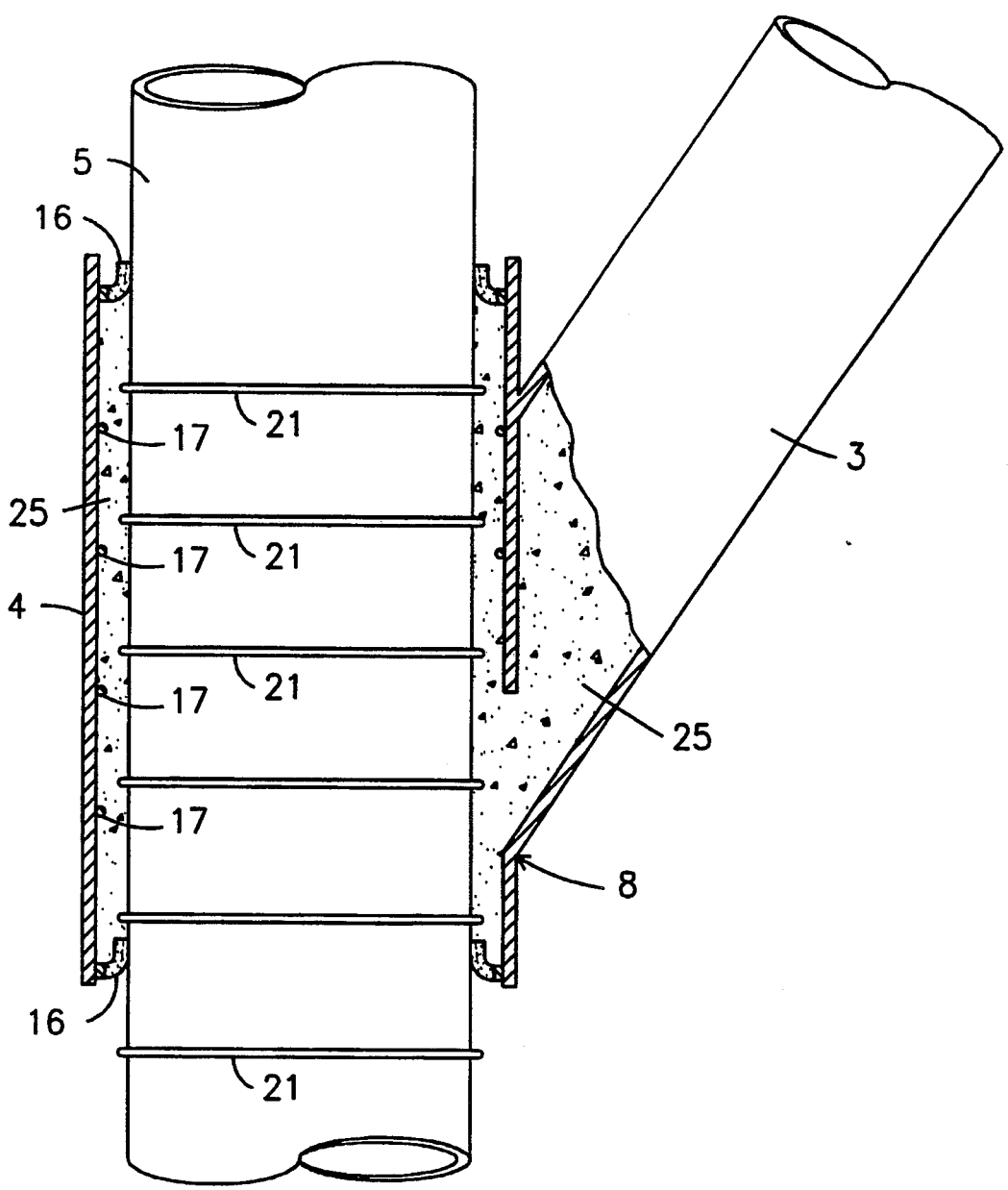

Referring to FIGS. 28 and 29, a steel lower bearing member 55 is secured by welding to the upper end of diagonal member 3. A steel upper bearing member 56 is secured by welding to the upper end of the placing member 1. The steel shearing forcing transfer member 11 is interposed, and may be secured by welding as required, between the lower bearing member 55 and the upper bearing member 56.

FIGS. 30 through 34 show a third embodiment of the present invention. An upper end of a diagonal member 3 is secured by welding to a steel upper beam 7 which surmounts pile sand placing member 1. A lower cylindrical body 4 provided with connectors 17 (FIG. 32) is secured to a lower end of the diagonal member 3. A supporting frame 57 is constructed as described hereinbefore. After the placing member 1 and pile 5 have been driven into underwater ground 2, the lower cylindrical body 4 in the supporting frame 57 is fitted onto pile 5. The supporting frame 57 is lowered so that the upper beam 7 is mounted on each upper end of the placing member 1 and pile 5. An inverted U-shaped reinforcement 26 is downwardly fitted onto the upper beam 7 at each upper position of the placing member 1 and pile 5. Time elapsing curing material 25 is injected through an injection hole which is provided in an upper position of the diagonal member 3. The time elapsing curing material 25 is filled between the lower cylindrical body 4 and pile 5.

Partition plates 27 (FIG. 33) are secured in advance to each upper portion within the placing member 1 and pile 5. The upper end of the placing member 1, that of pile 5, and the upper beam 7 are embedded in time elapsing curing material 9. The driven time elapsing curing material 9 made of concrete is driven to couple each upper portion of each placing member 1 with that of each pile 5. The time elapsing curing material 9 is filled in each upper portion of the placing member 1 and pile 5. Leg portions of the inverted U-shaped reinforcing bar 26 are embedded into the time elapsing curing material 9 so that the upper beam 7 is secured to each upper portion of the placing member 1 and pile 5.

Preferably a steel bar is used as the inverted U-shaped reinforcing bar 26. A reinforcing bar may be embedded into the time elapsing curing material 9. When the time elapsing curing material 9 is driven, timbering and a mold are employed but not shown.

In the third embodiment, an opening 60 (FIG. 31) provided in the time elapsing curing material may be covered with a floor plate. The floor plate may be formed by driving the time elapsing curing material such as concrete in the execution field for a water area structure. Otherwise, a floor plate of a precast concrete may be arranged to block the opening 60, and may be secured to the time elapsing curing material 9 by a mechanical means such as a bolt.

Figure 35:
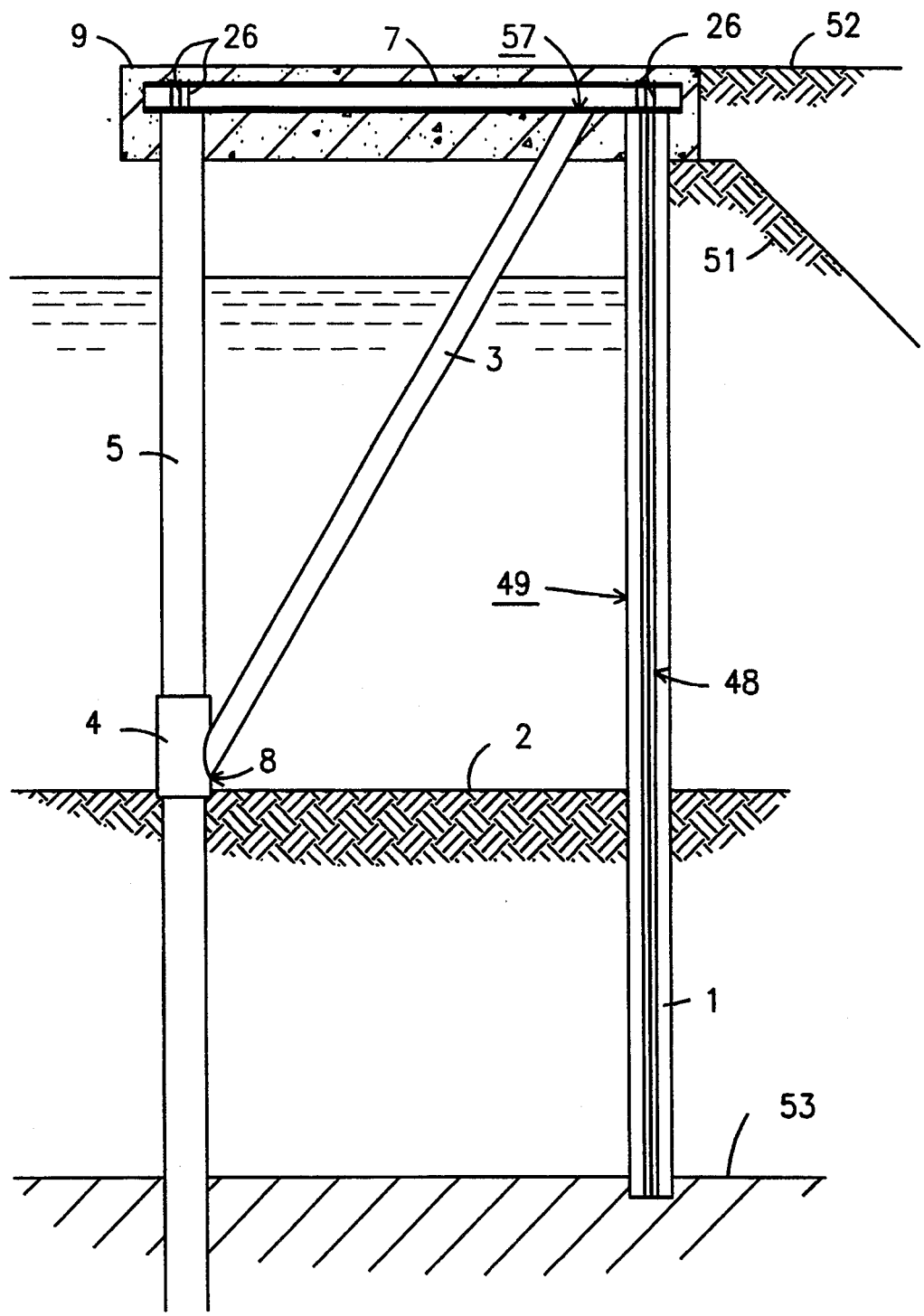
FIG. 35 is a vertical side view showing a fourth embodiment of a water area structure using a placing member for underwater ground.

FIG. 35 shows a fourth embodiment of the present invention. A sheet pile wall 49 is driven into underwater ground 2, and a sheet pile body in the sheet pile wall 49 is used as a placing member 1. The remaining construction is identical with the construction of the third embodiment.

Figure 36:
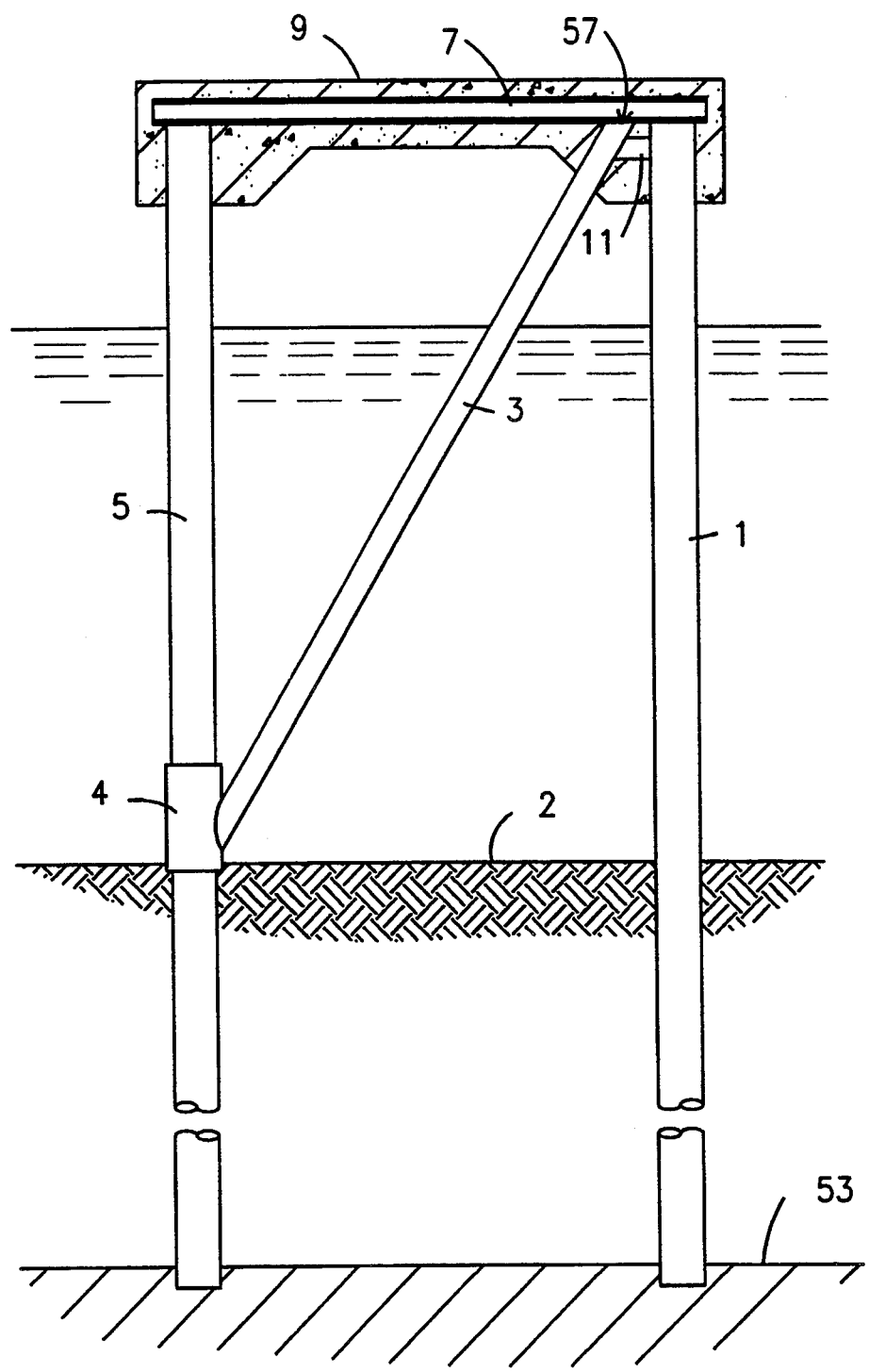
FIGS. 36 through 40 show a coupling structure of an upper end of a diagonal member in a water area structure with an upper beam 7.

FIGS. 36 through 40 show a coupling structure of an upper end of a diagonal member 3 in a water area using the placing member 1 with an upper beam 7. Referring to FIG. 36, the upper end of the diagonal member 3 is secured by welding to the upper beam 7. A shearing forcing transfer member 11 is interposed and secured by welding between an upper end of the placing member 1 and that of the diagonal member 3.

Figure 37:
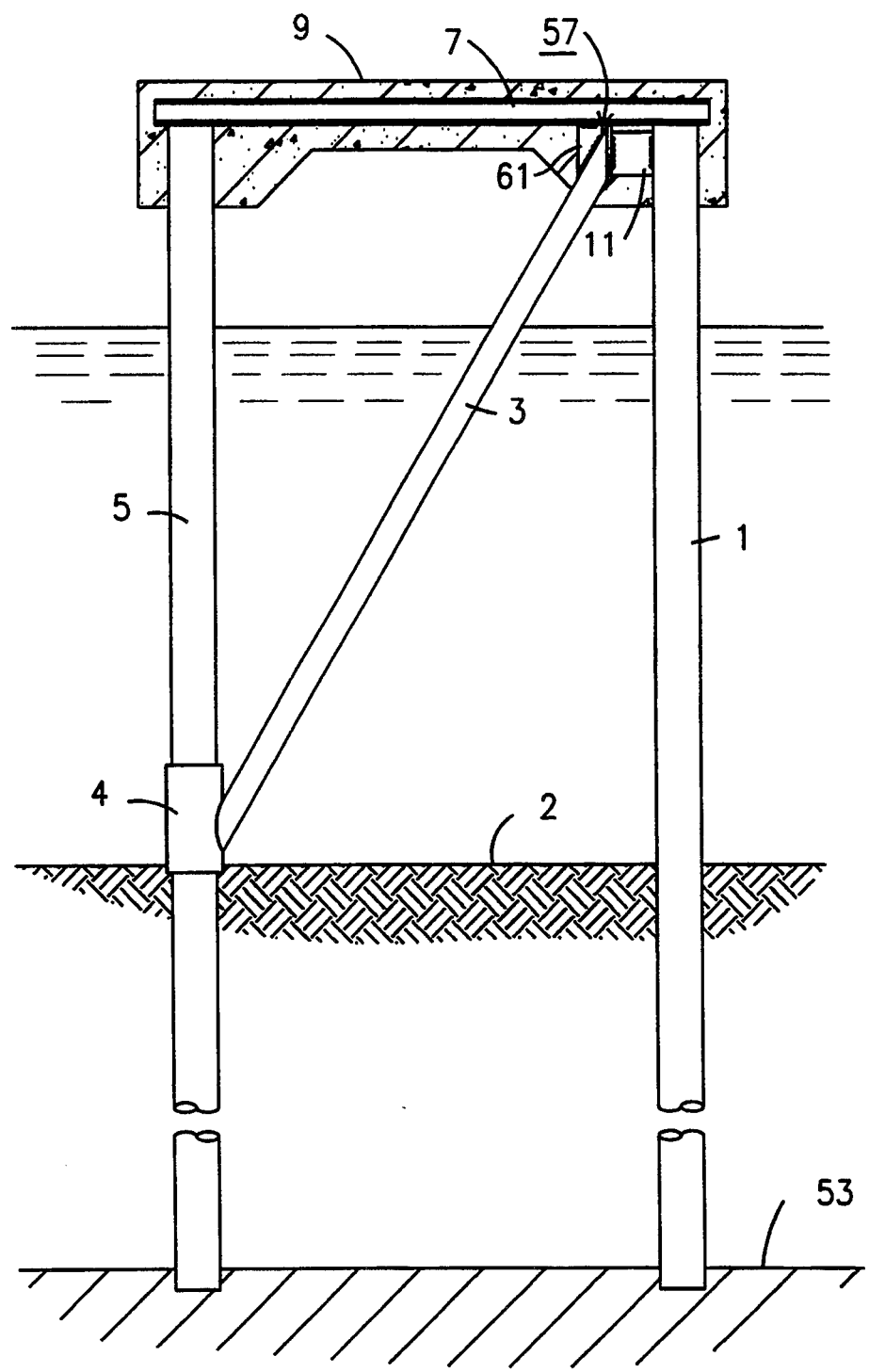

Referring now to FIG. 37, the shearing forcing transfer member 11 is interposed and secured by welding to the upper end of the diagonal member 3 and that of the placing member 1. Further, a steel reinforcing plate 61 is interposed and secured by welding between the upper end of diagonal member 3 and the upper beam 7.

Figure 38:
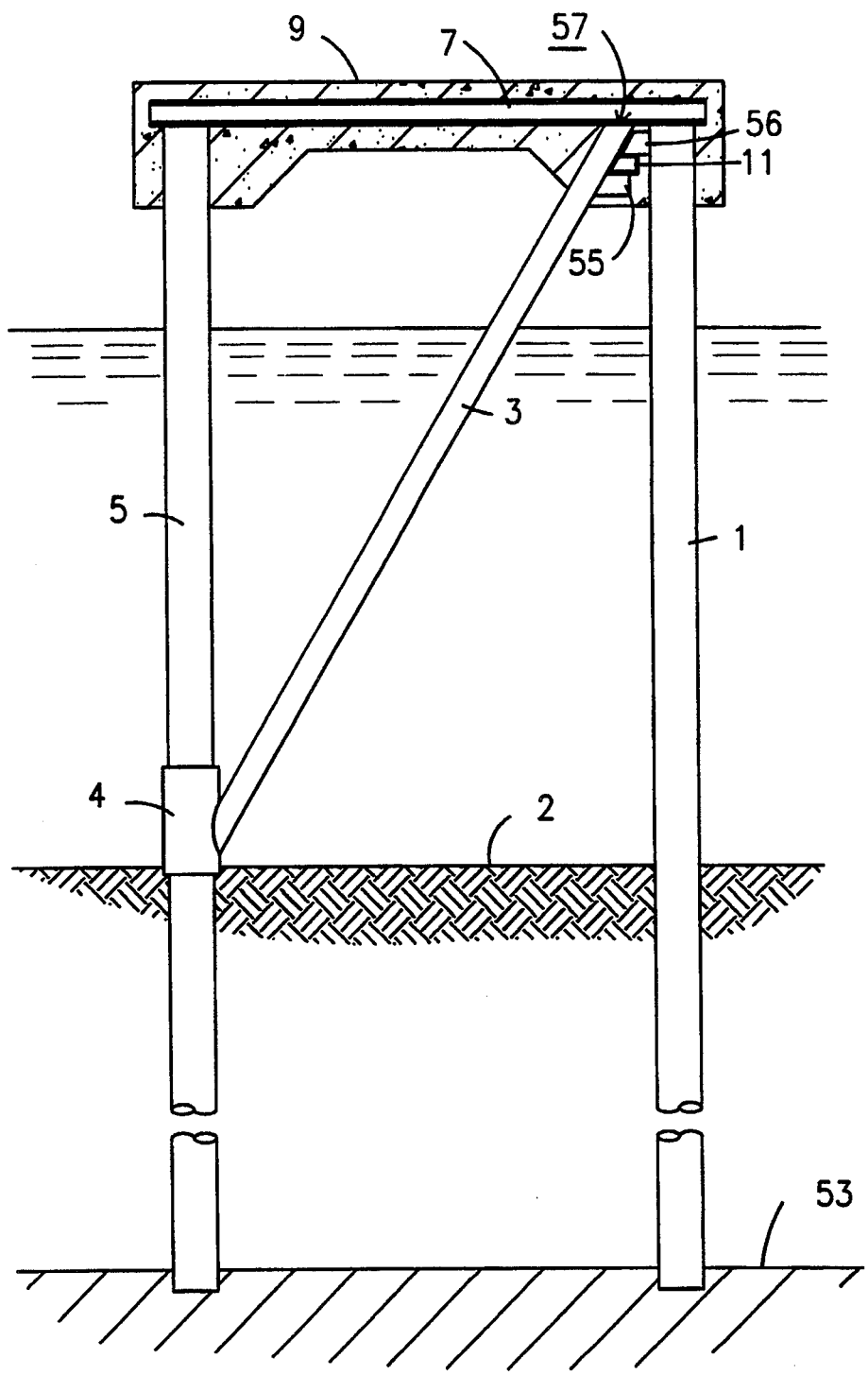

Referring to FIG. 38, a lower bearing member 55 is secured by welding to the upper end of diagonal member 3. An upper bearing member 56 is secured by welding to the upper end of the placing member 1. The shearing forcing transfer member 11 is interposed and secured by welding between the lower bearing member 55 and the upper bearing member 56.

Figure 39:
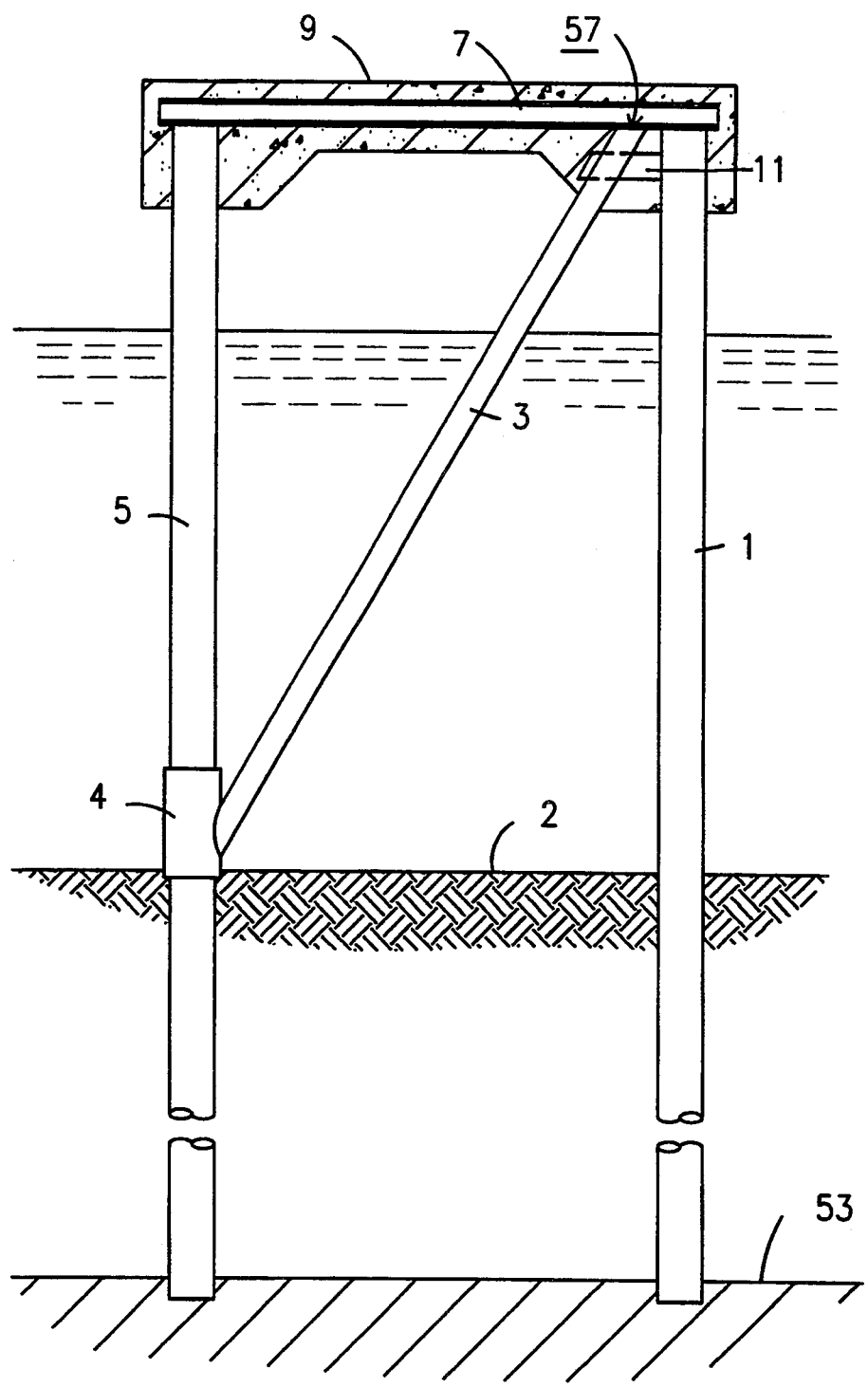

Referring to FIG. 39, the horizontal shearing forcing transfer member 11 is slidably inserted into compressive diagonal member 3. An end of the shearing forcing transfer member 11 is secured by welding to the placing member 1.

Figure 40:
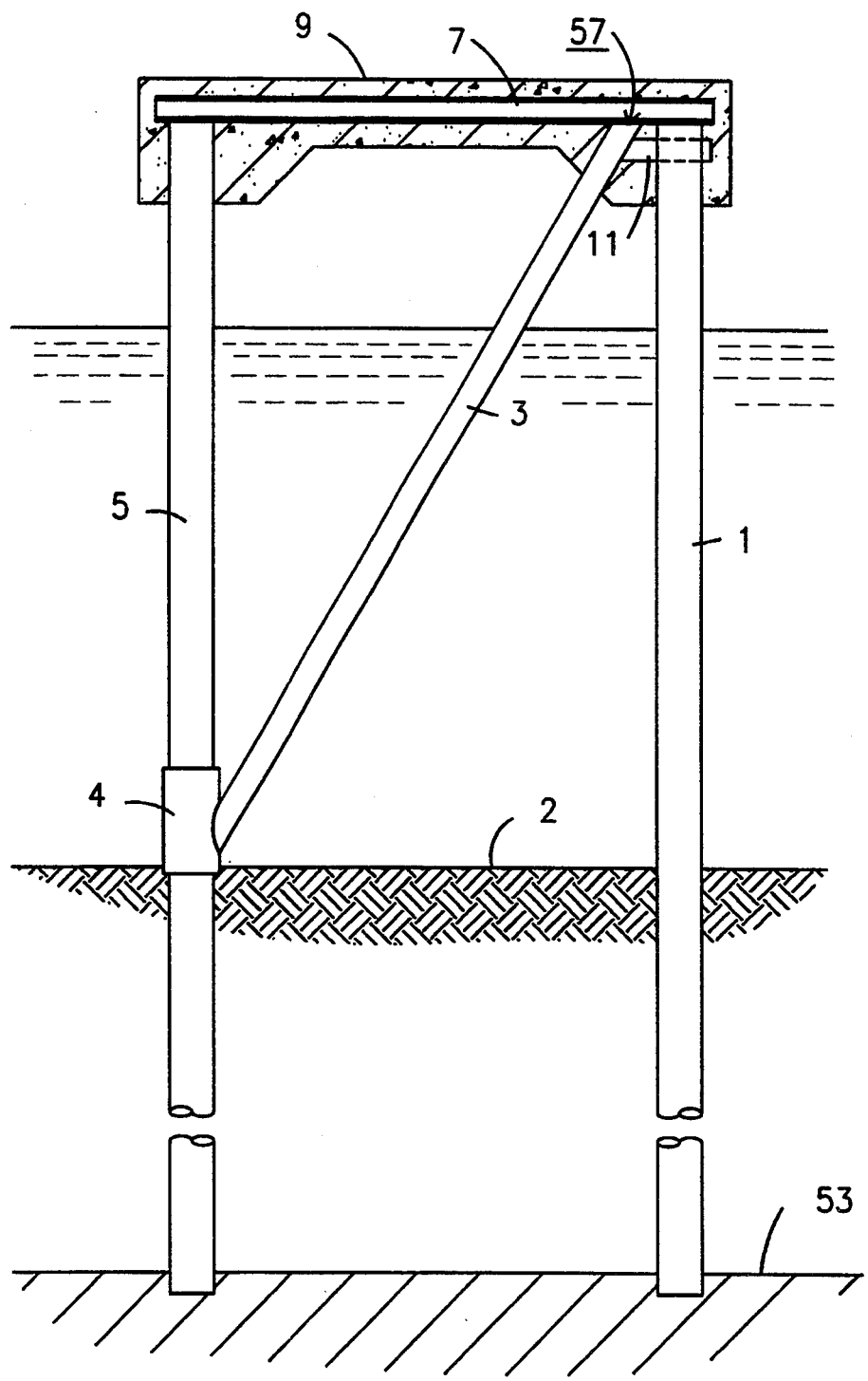
Figure 41:
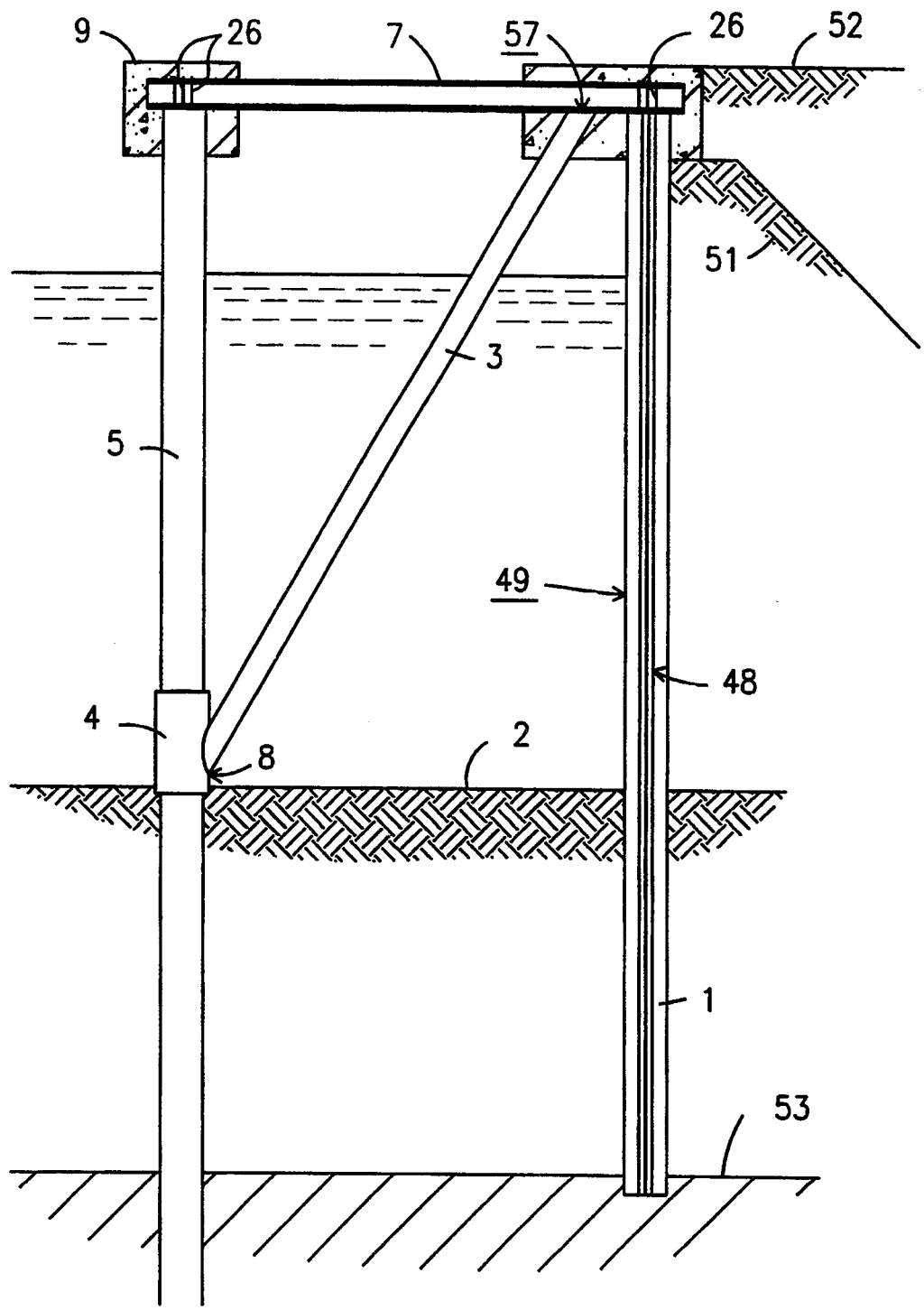
FIGS. 41 through 46 show a fifth embodiment of the present invention.
Figure 42:
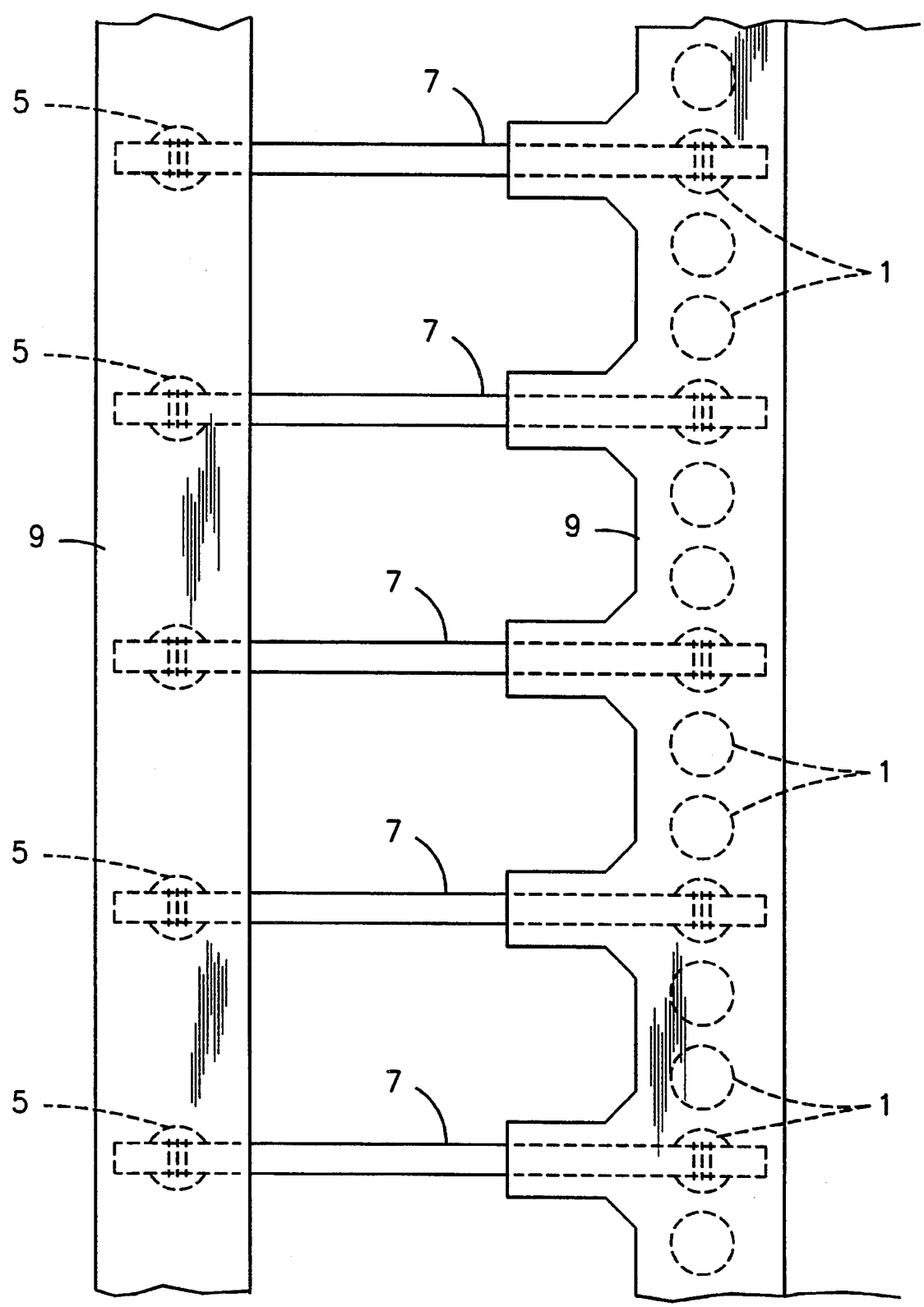
Figure 43:
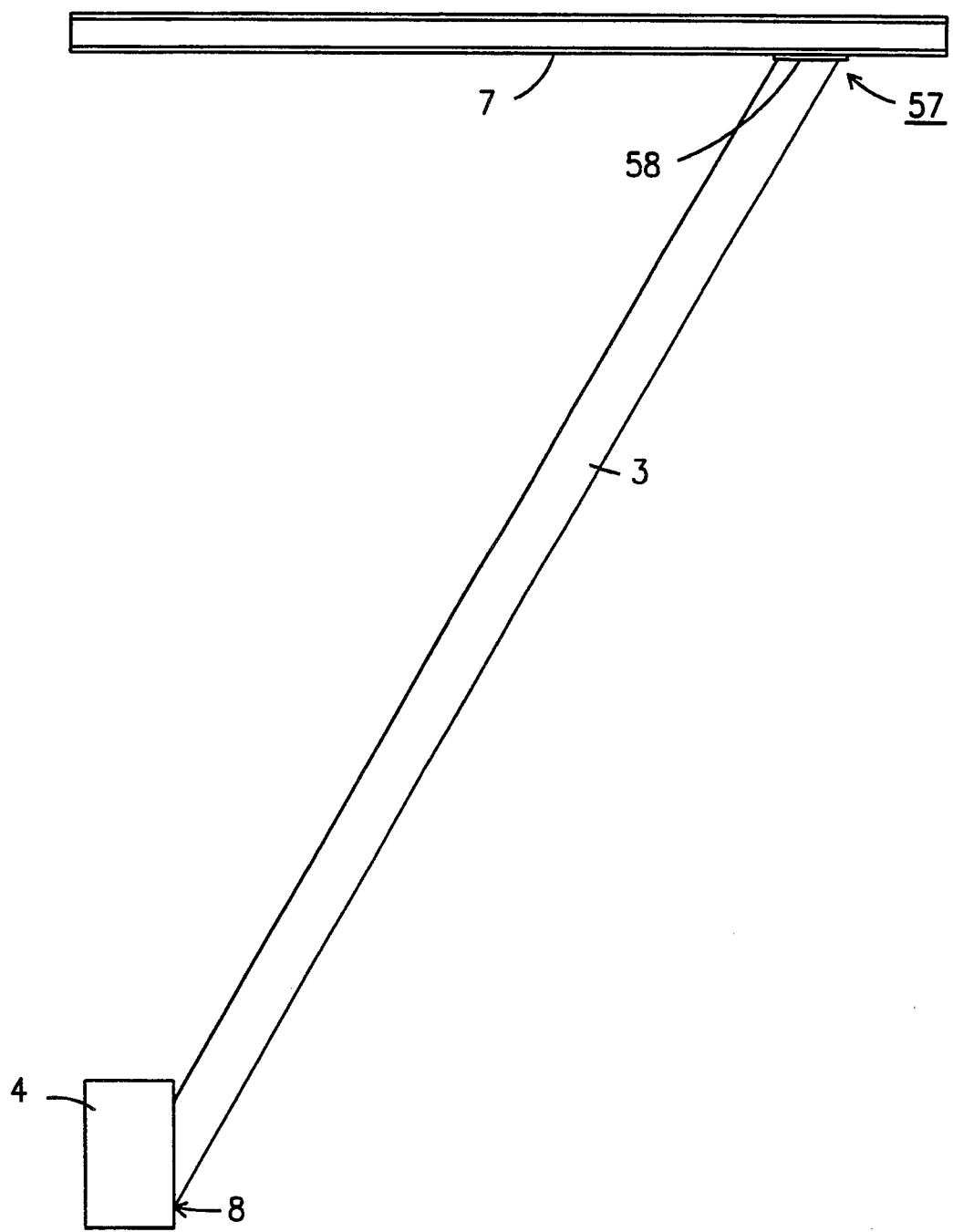
Figure 44:
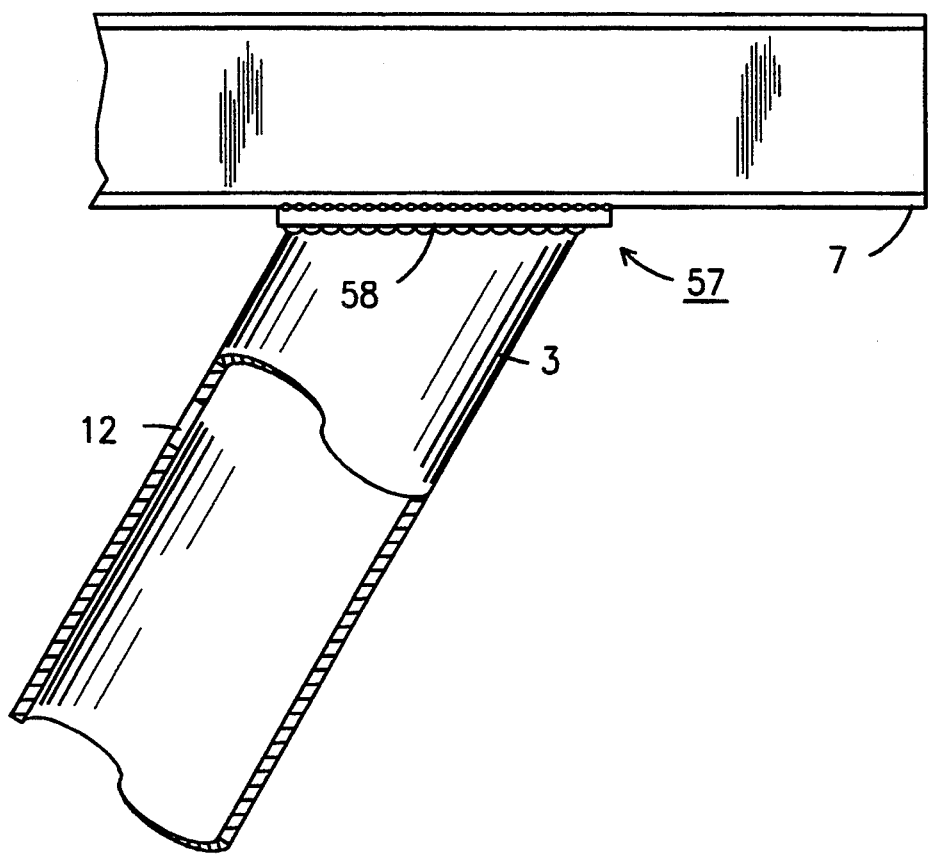
Figure 45:
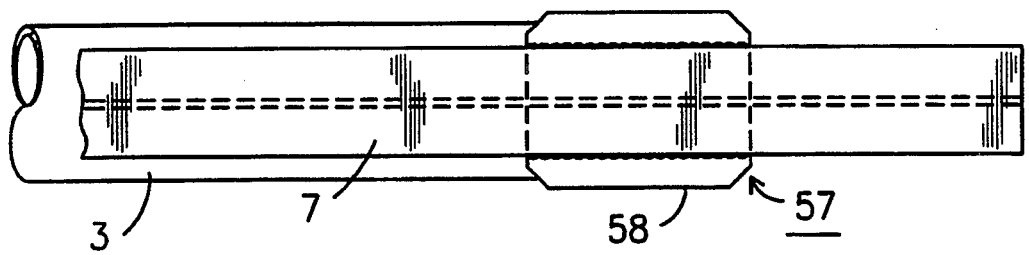
Figure 46:
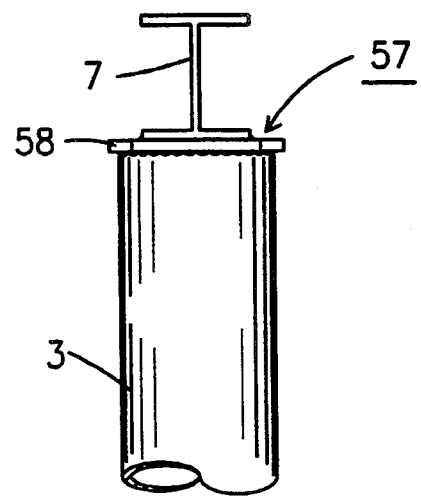

Referring to FIG. 40, the horizontal shearing forcing transfer member 11 is slidably inserted into the upper end of the placing member 1. The end of the shearing forcing transfer member 11 is secured by welding to diagonal member 3.

FIGS. 41 through 46 show a fifth embodiment of the present invention. A lower cylindrical body 4 is secured to a lower end of a diagonal member 3. A steel end plate 58 (FIG. 43) is secured by welding to the upper end of diagonal member 3. An upper surface of the steel end plate 58 is secured to the bottom of upper beam 7. A supporting frame 57 is constructed as described above. An upper end of a placing member 1 comprising a sheet pile body in a sheet pile wall 49, and that of pile 5 are coupled with the upper beam 7 by a coupling means shown in FIGS. 33 and 34. Back-fill earth 51 and earth filling 52 are filled at the back of the sheet pile wall 49. An upper end of the sheet pile wall 49, that of diagonal member 3, and one end of the upper beam 7 are embedded into time elapsing curing material 9. Each upper end of each pile 5 and the other end of each upper beam 7 are embedded in the time elapsing curing material 9 to couple with each other.

Figure 47:
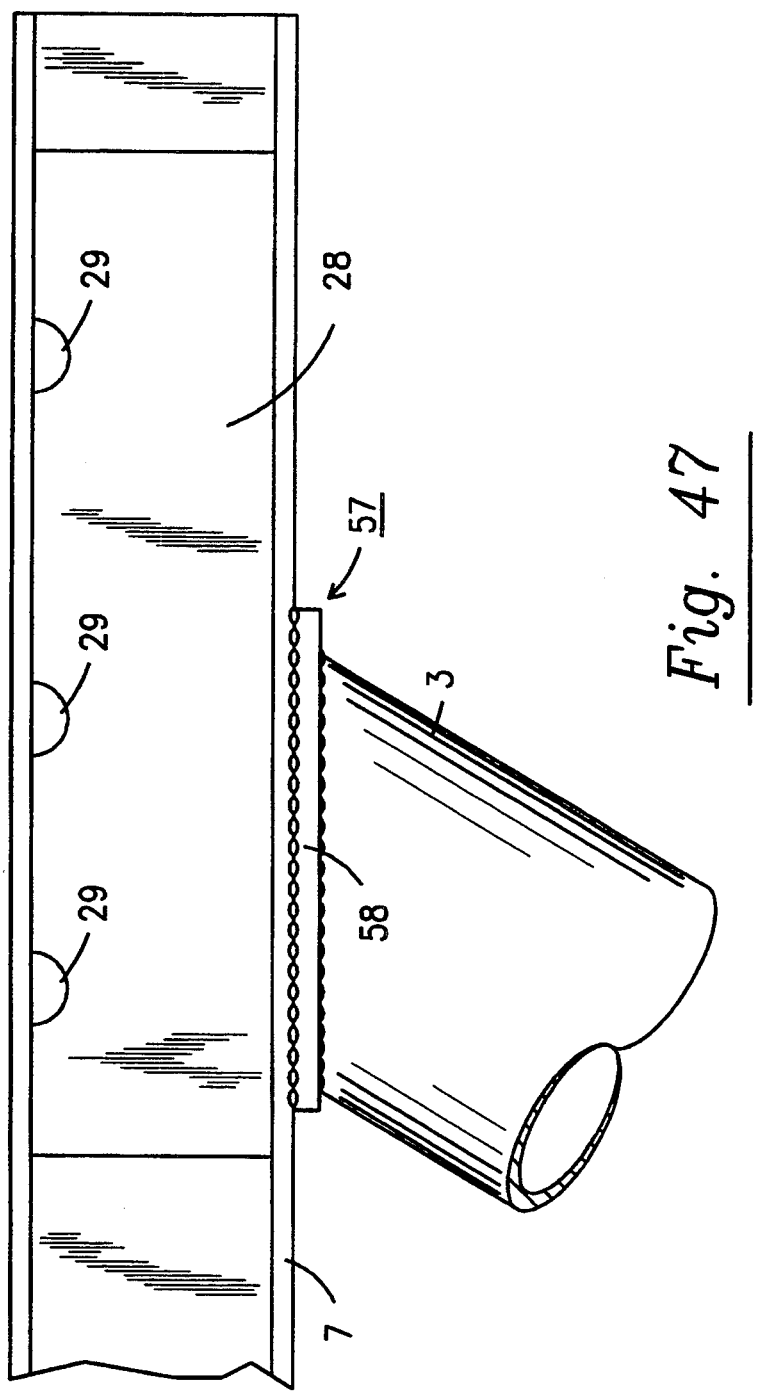
FIGS. 47 through 52 show other examples of a coupling portion between the diagonal member and the upper beam.
Figure 48:
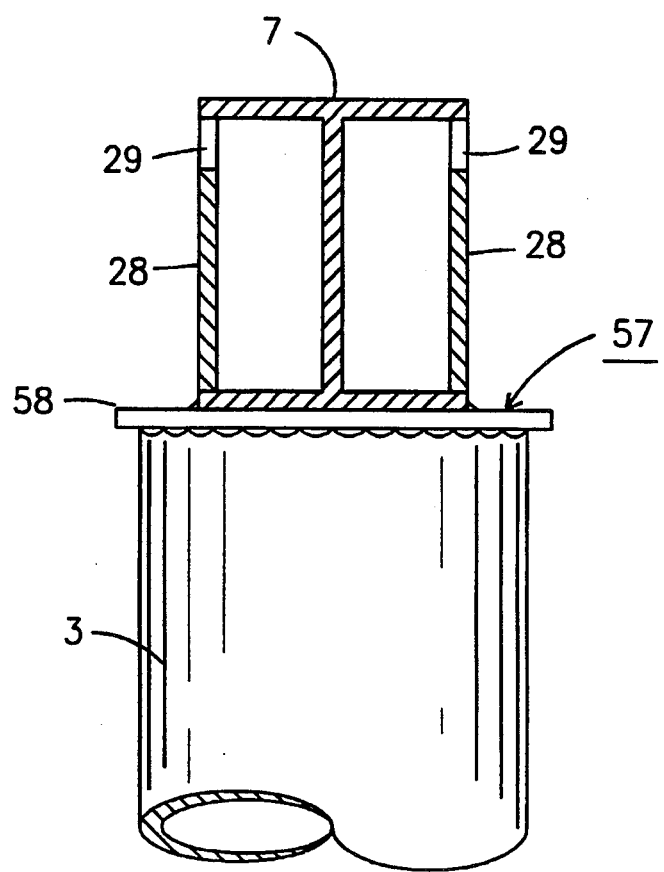

FIGS. 47 through 52 show other examples of a coupling portion between diagonal member 3 in supporting frame 57 and the upper beam 7. FIGS. 47 and 48 show a first example wherein the end plate 58 is secured by welding to an upper end surface of diagonal member 3. Further, the upper beam 7 comprising H sections is mounted on and secured by welding to the end plate 58. The upper beam 7 has portions which are arranged above diagonal member 3 and the placing member 1. Steel stiffening plates 28 are secured by welding at the respective cross directional ends of an upper flange and a lower flange of the portions. The stiffening plate 28 is provided with openings 29 such that concrete is efficiently filled.

Figure 49:
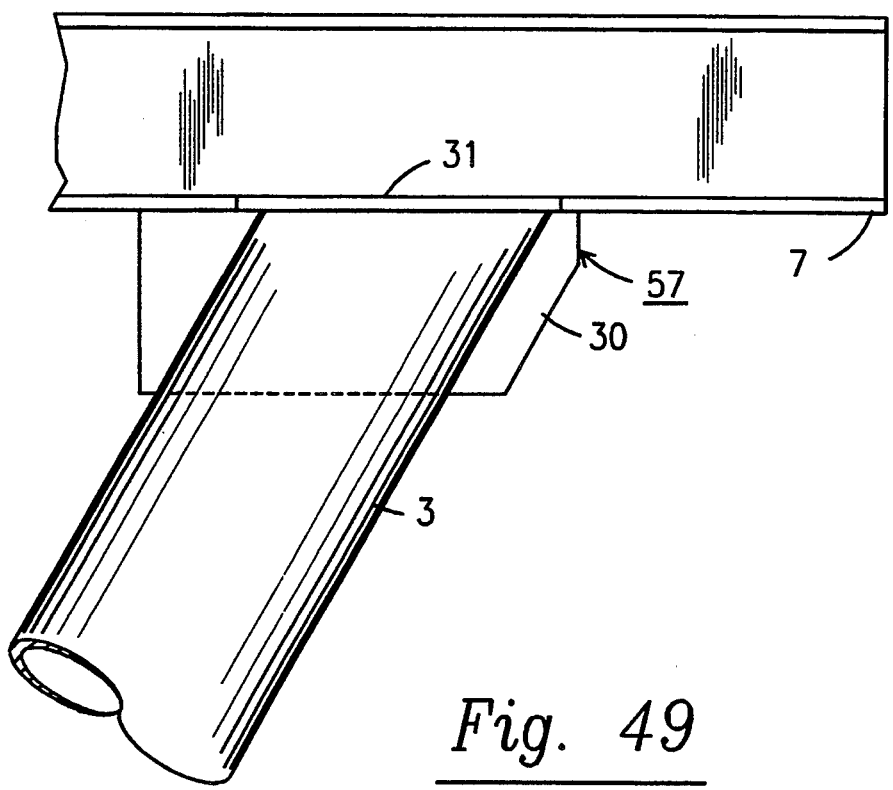
Figure 50:
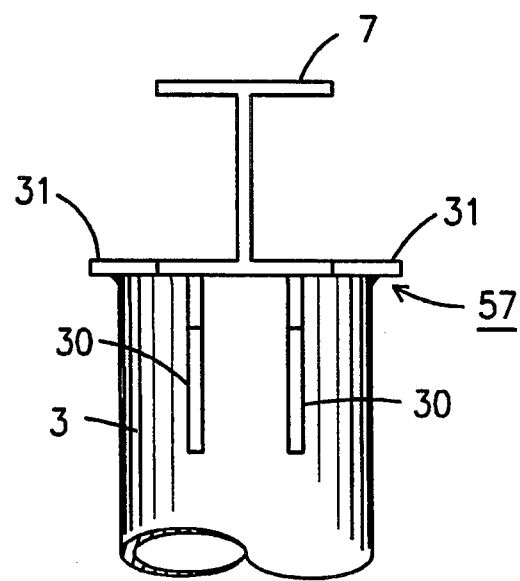

In the second example as shown in FIGS. 49 and 50, a plurality of steel reinforcing plates 30 extends in the longitudinal direction of the upper beam 7. The steel reinforcing plates 30 are fitted and secured by welding into slits which are provided in the upper end of diagonal member 3. The upper end of diagonal member 3 and the reinforcing plate 30 are secured by welding to a lower surface of the upper beam 7 comprising the H sections. Further, cover plates 31 are mounted on and secured by welding to an upper end surface of diagonal member 3 at the respective ends of the upper beam 7.

Figure 51:
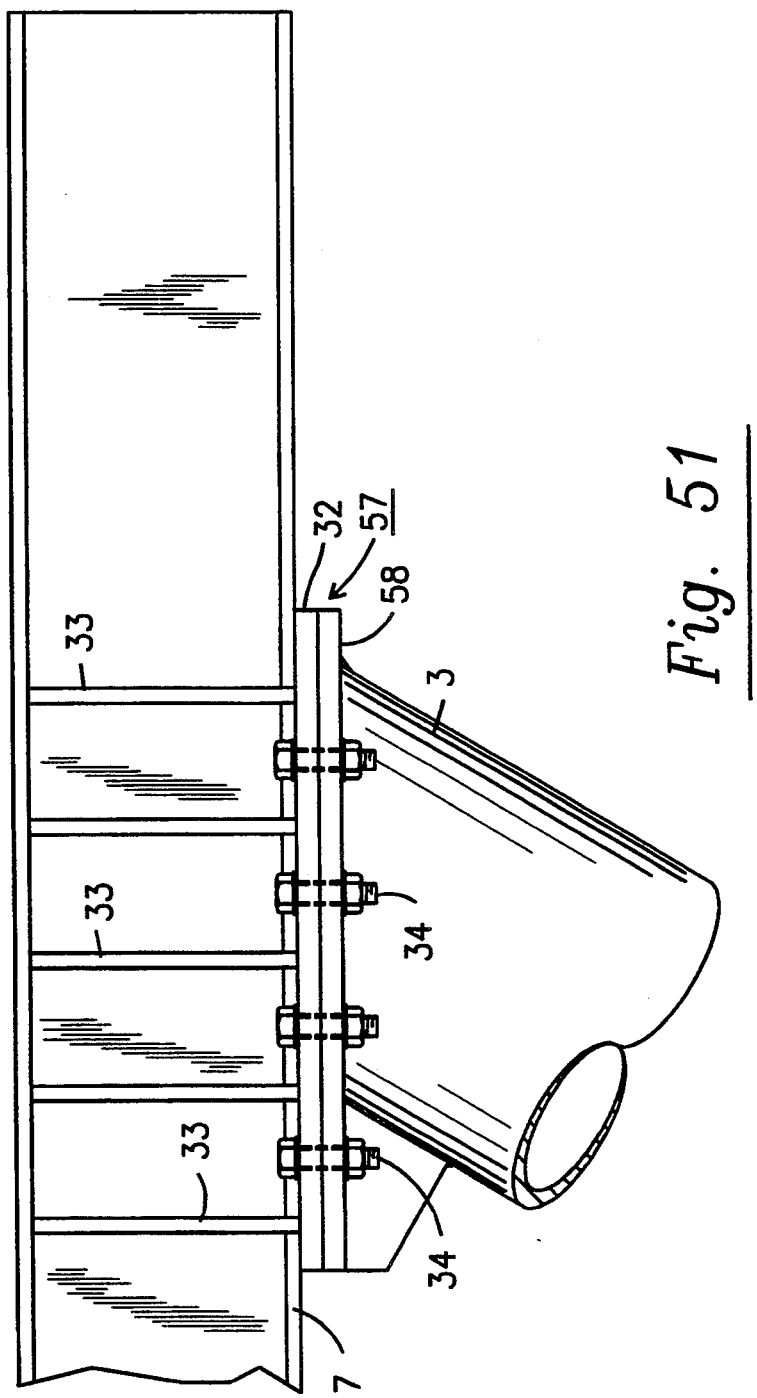
Figure 52:
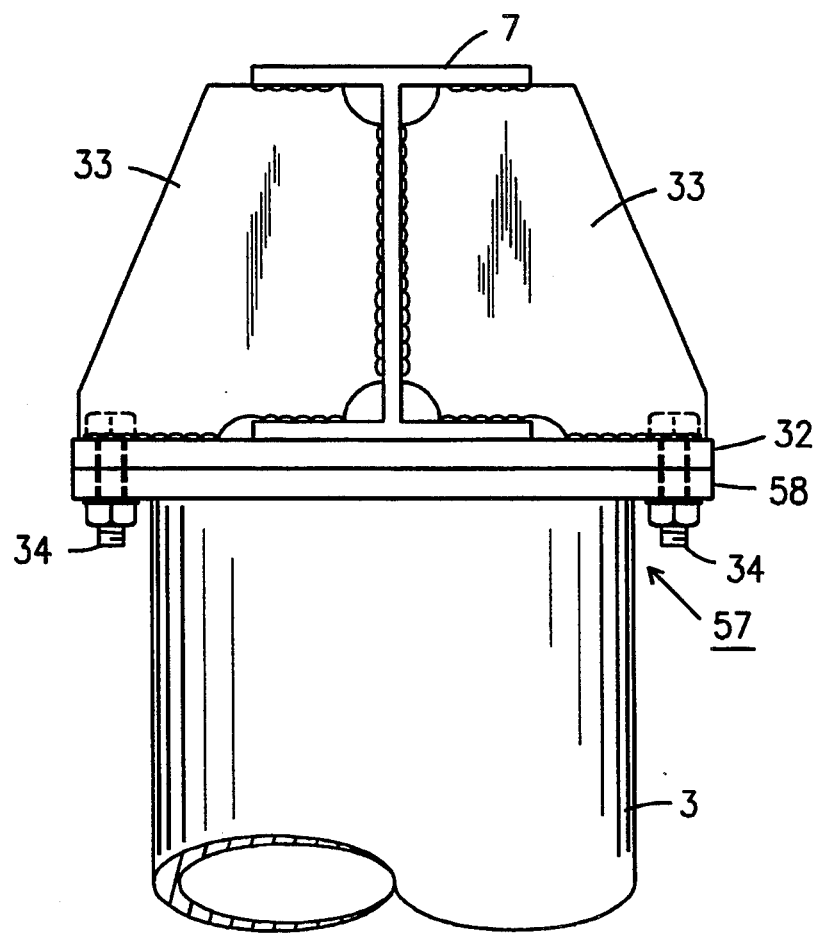

In a third example as shown in FIGS. 51 and 52, an end plate 58 is secured by welding to the upper end of diagonal member 3. A washer plate 32 is secured by welding to a lower surface of the upper beam 7 comprising H sections. A plurality of steel rib plates 33 are disposed and secured by welding between the upper beam 7 and the washer plate 32. Each side portion of the end plate 58 and that of washer plate 32 in the cross direction of the upper beam are coupled by a plurality of bolts 34.

Figure 53:
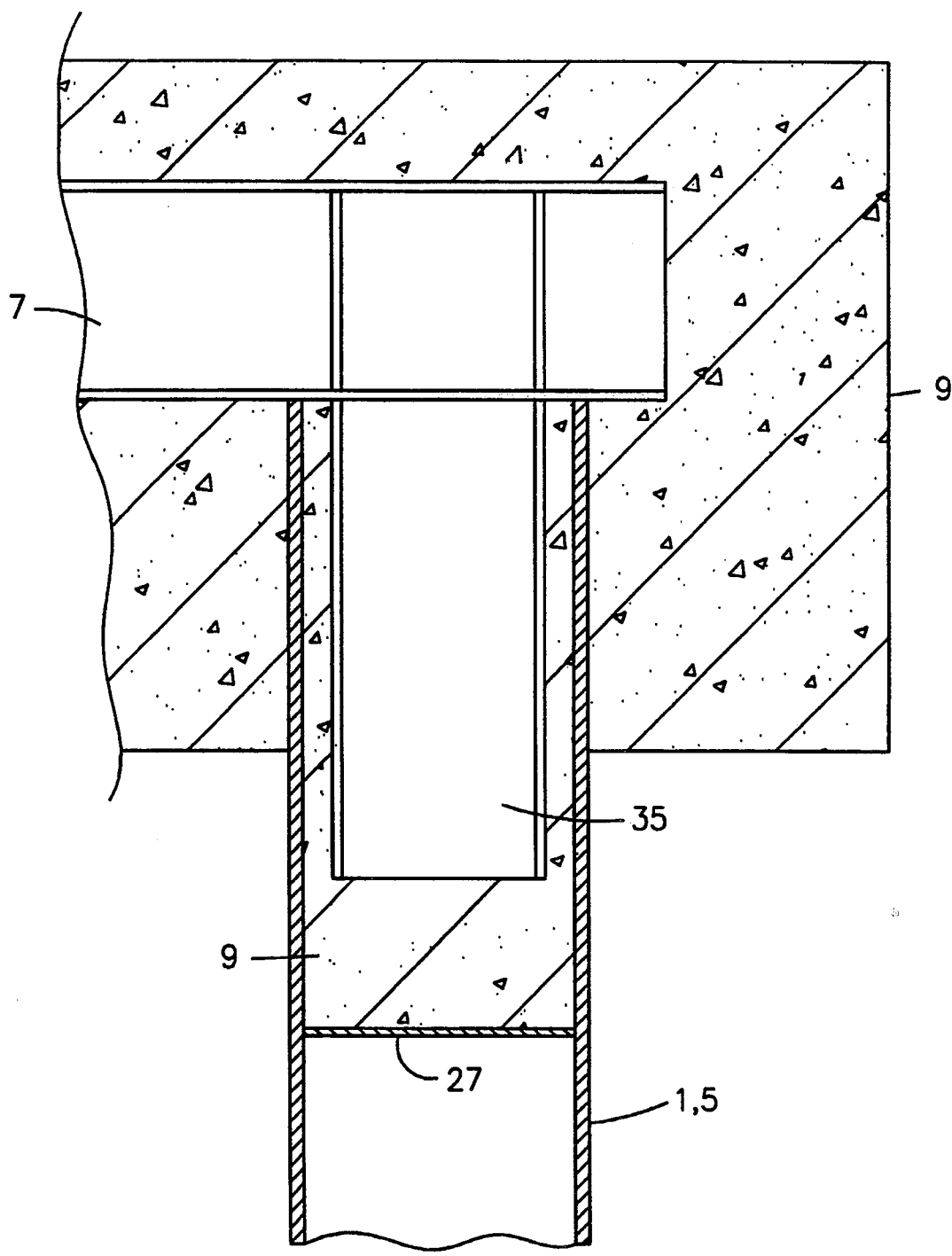
FIGS. 53 through 67 show other examples of a coupling structure for coupling the upper beam with a forward pile and a sheet pile wall.
Figure 54:
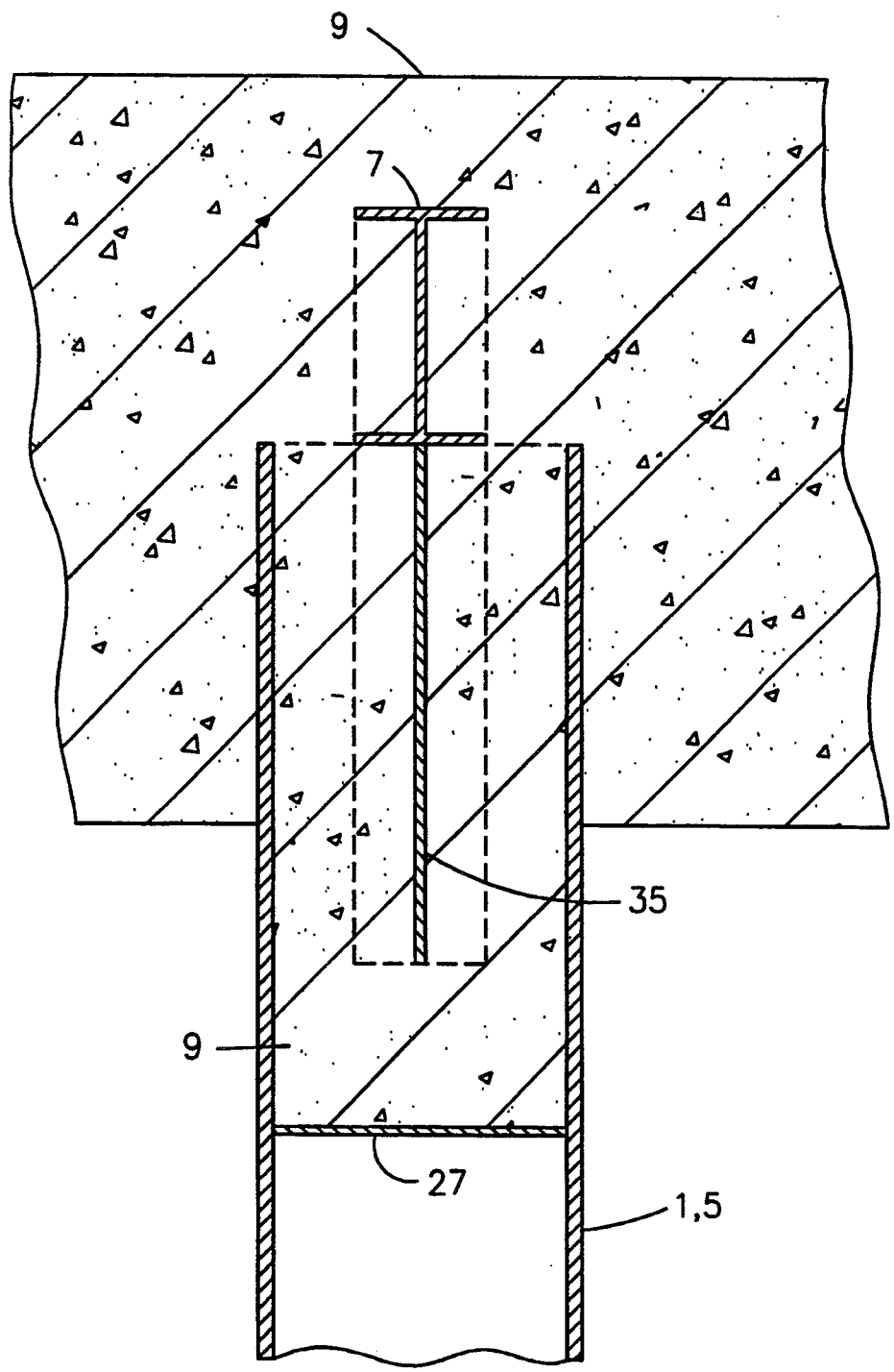

FIGS. 53 through 67 show other examples of a coupling structure for coupling the upper beam 7 with pile 5 and the placing member 1. FIGS. 53 and 54 show a first example wherein an upper end of an inserting member 35 comprising H sections is secured by welding to the lower portion of the upper beam 7 comprising H sections. The inserting member 35 is inserted into pile 5 and the placing member 1. Time elapsing curing material 9 is filled between peripheral walls of pile 5 and the placing member 1 and the inserting member 35 at an upper portion of partition plate 27.

Figure 55:
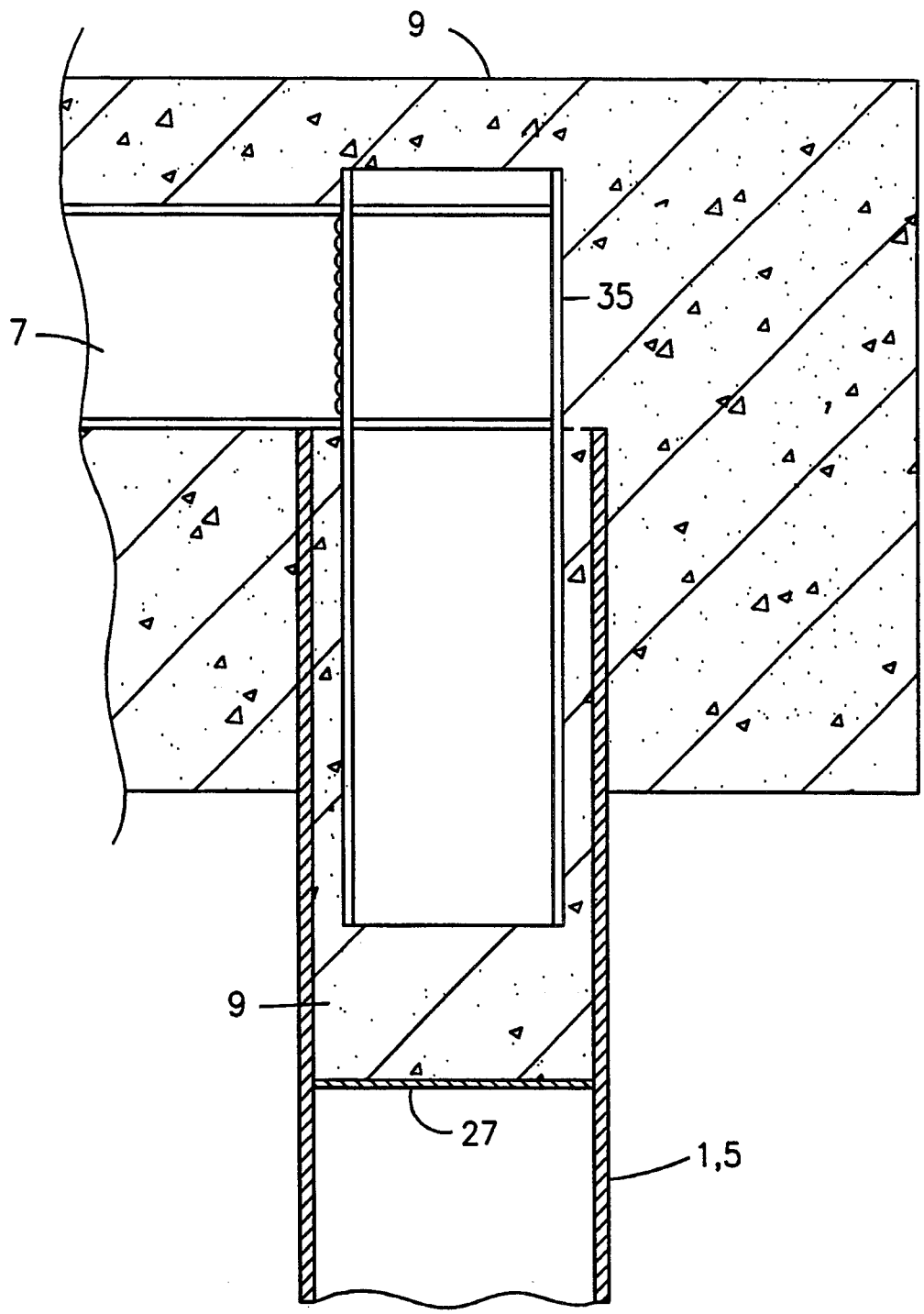
Figure 56:
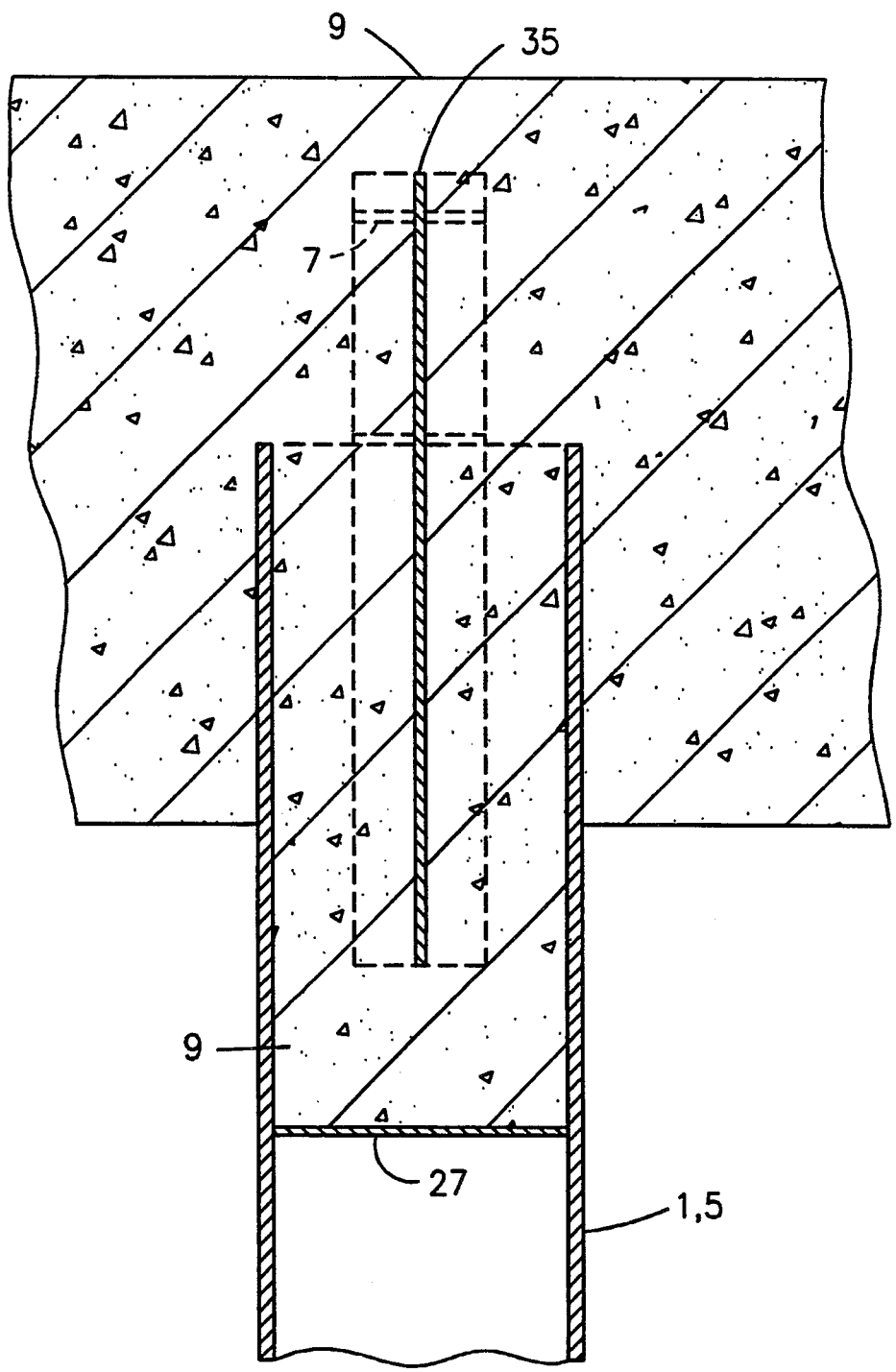

FIGS. 55 and 56 show a second example wherein the end of the upper beam 7 is secured by welding to an upper side surface of the inserting member 35. The remaining construction is identical with the construction in the first example.

Figure 57:
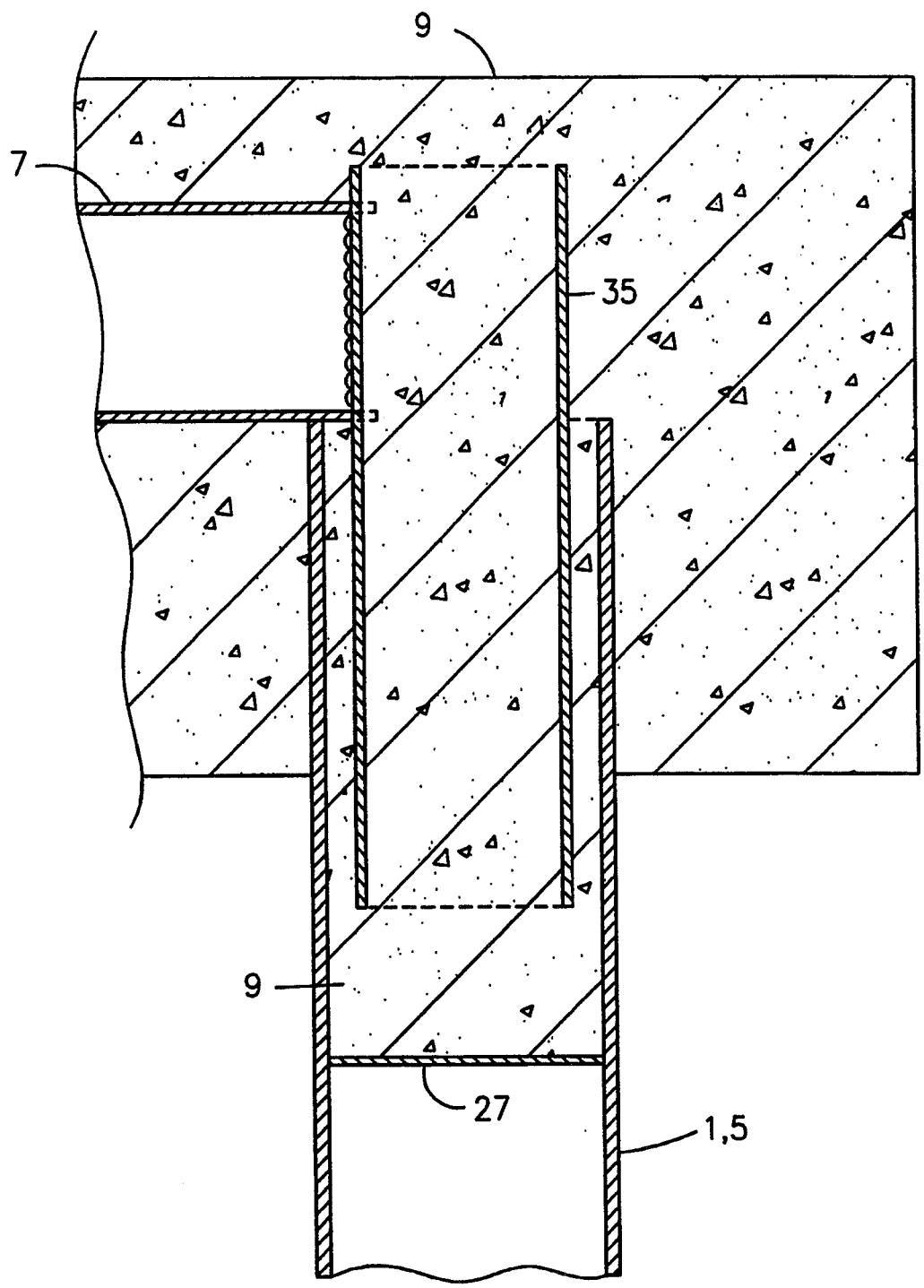
Figure 58:
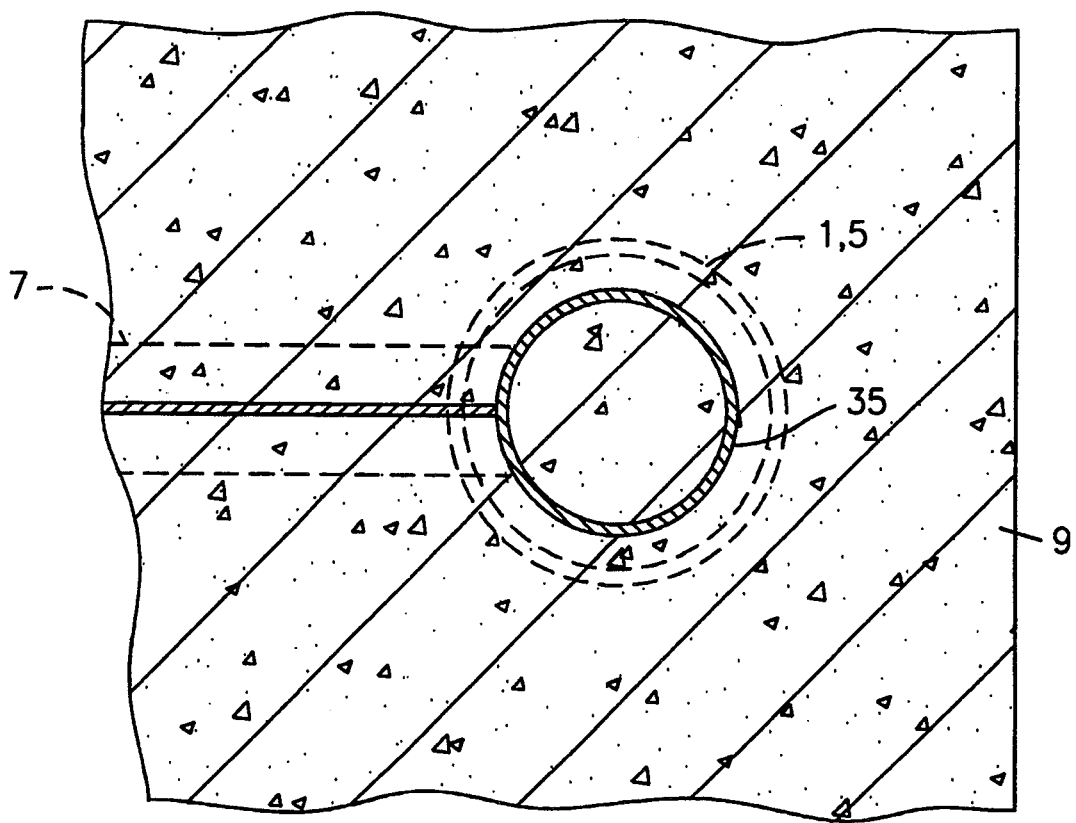

FIGS. 57 and 58 show a third example wherein the end of the upper beam 7 is secured by welding to the upper side surface of the inserting member 35 comprising a steel pipe. The remaining construction is identical with the construction in the first example.

Figure 59:
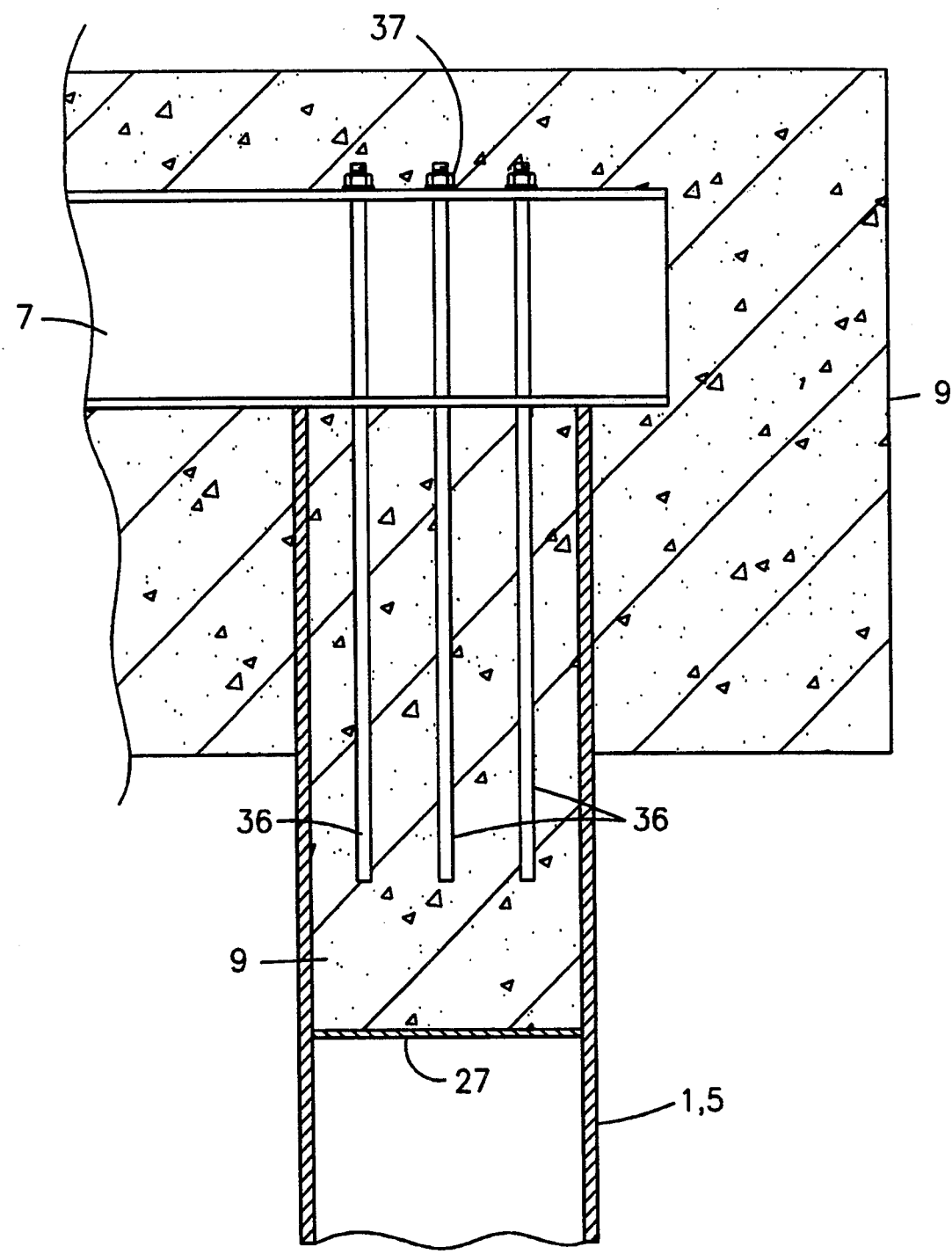
Figure 60:
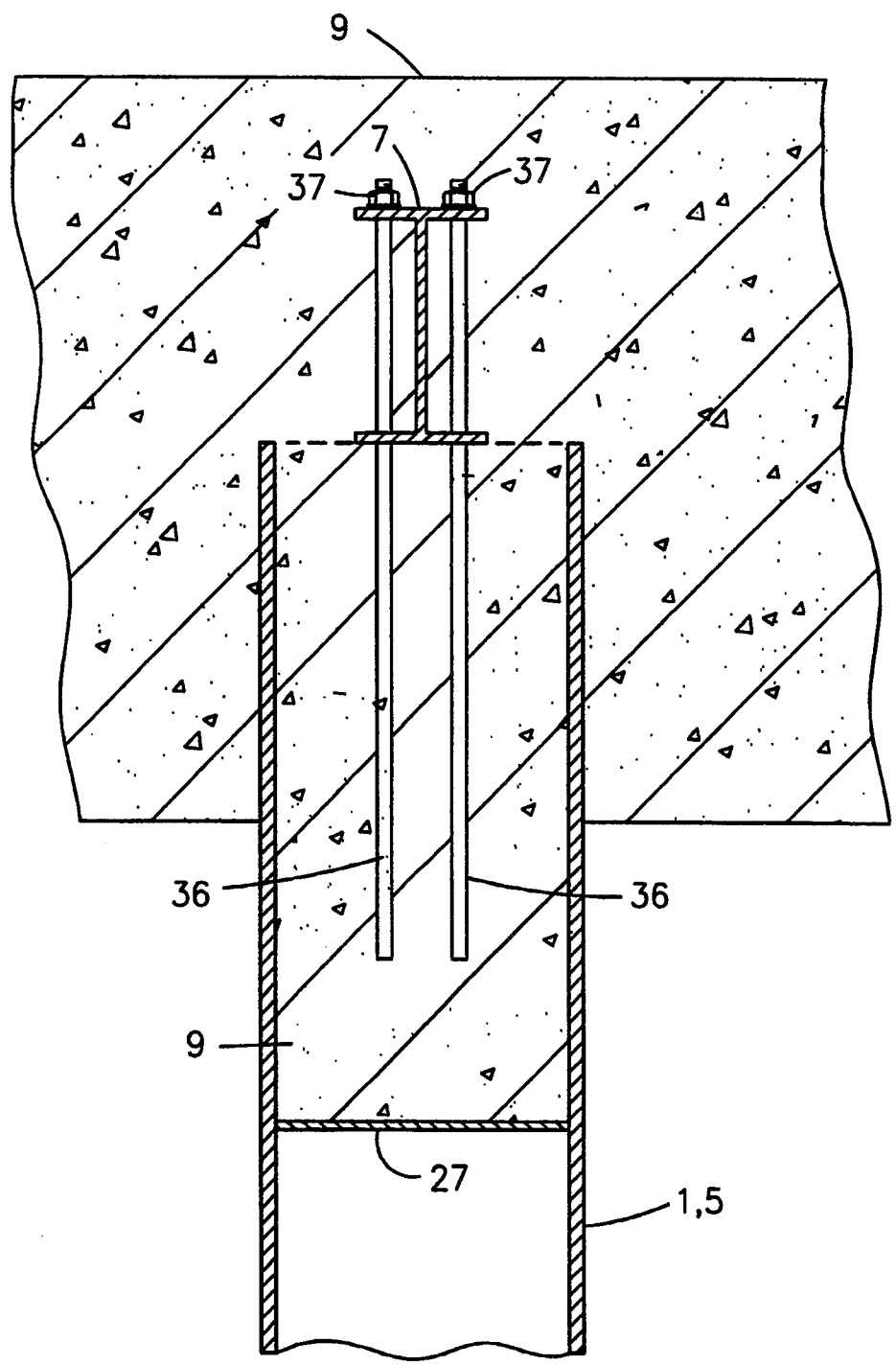

In a fourth example as shown in FIGS. 59 and 60, a number of anchor bolts 36 pass through the upper flange and the lower flange of the upper beam 7 comprising H sections. A nut 37 is screwed at an upper portion of the anchor bolt 36, and is mounted on an upper surface of the upper beam 7. The anchor bolts 36 are embedded into the time elapsing curing material 9 which is filled at an upper portion of the partition plate 27 in pile 5 and the placing member 1.

Figure 61:
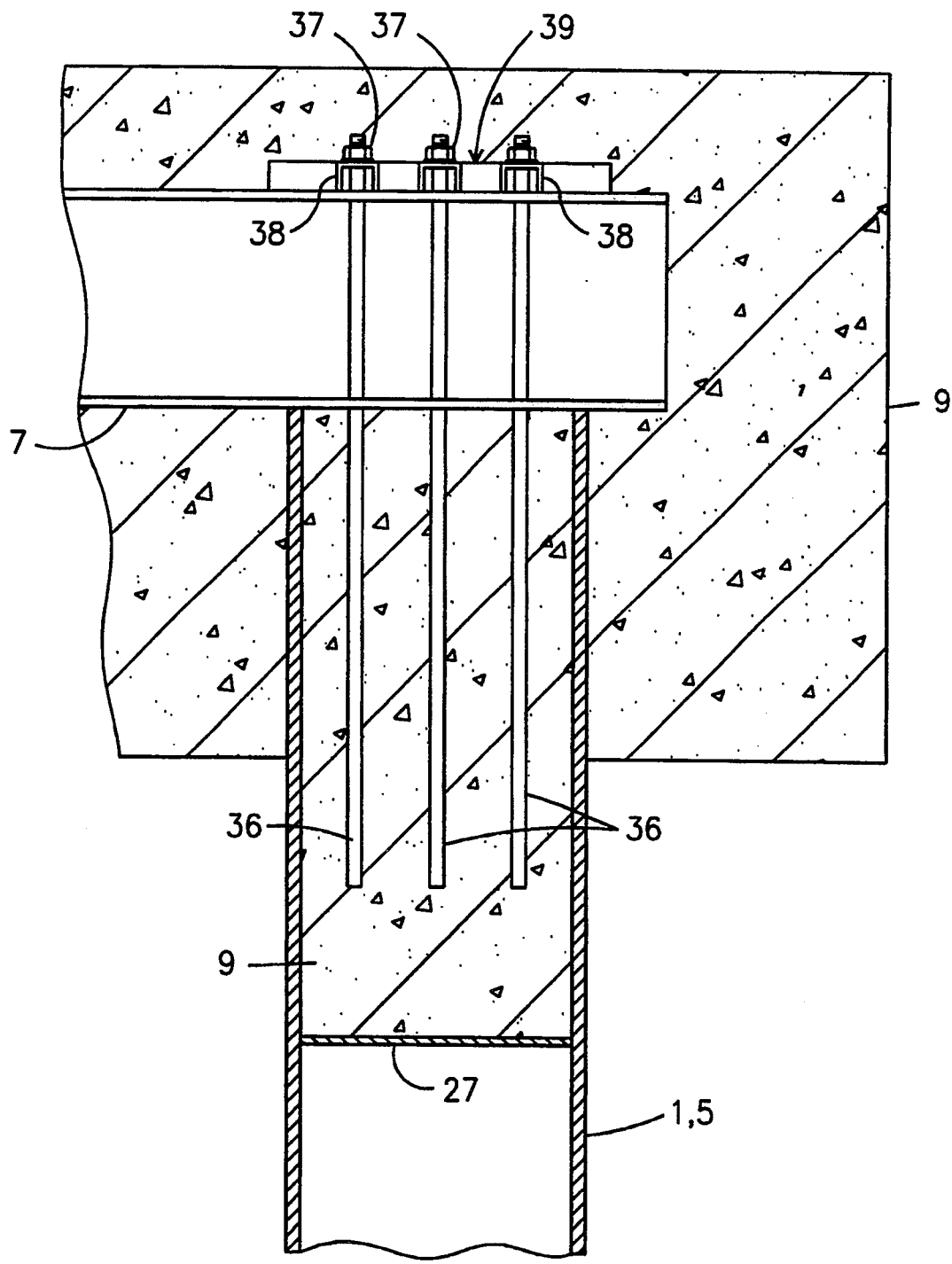
Figure 62:
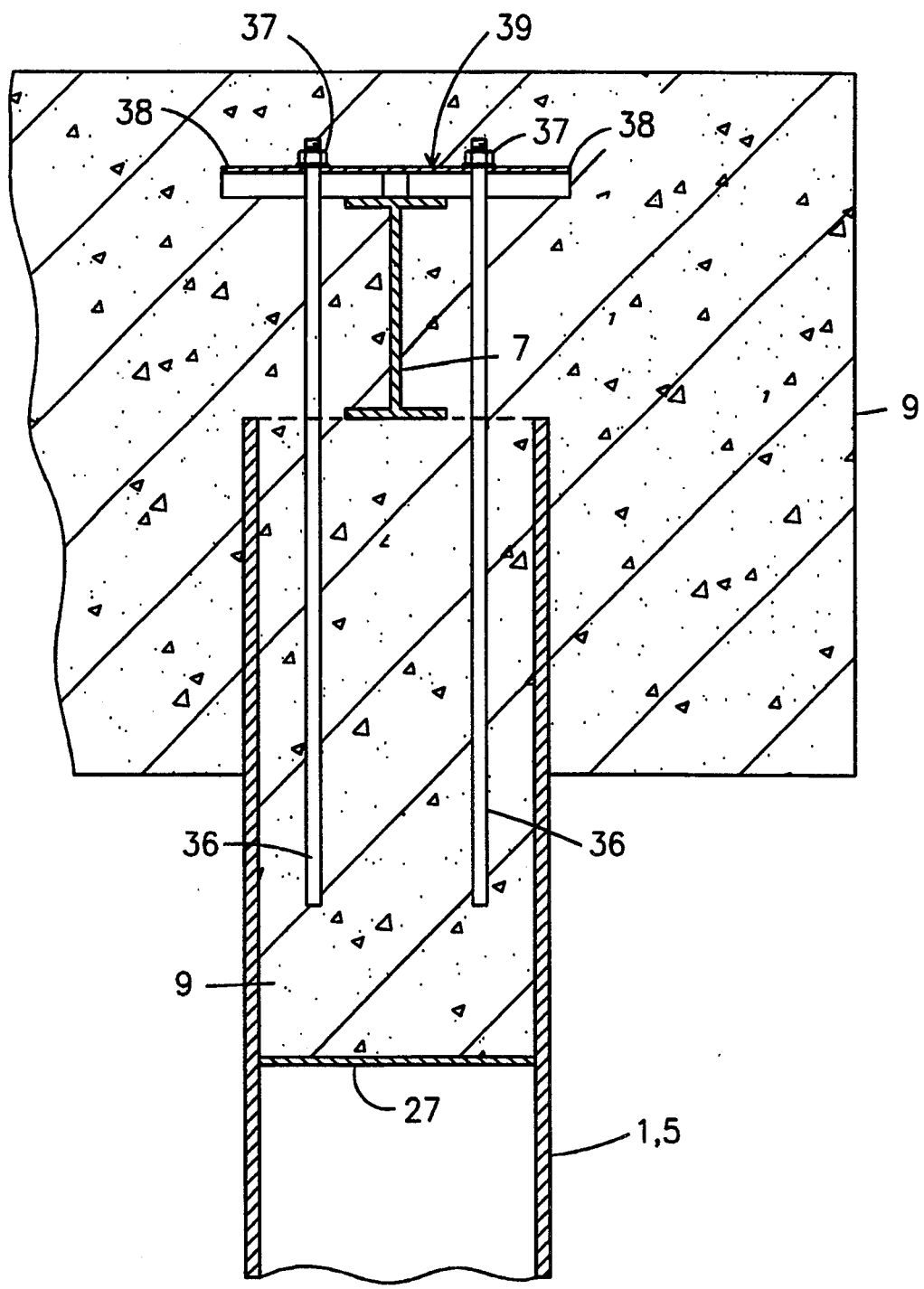
Figure 63:
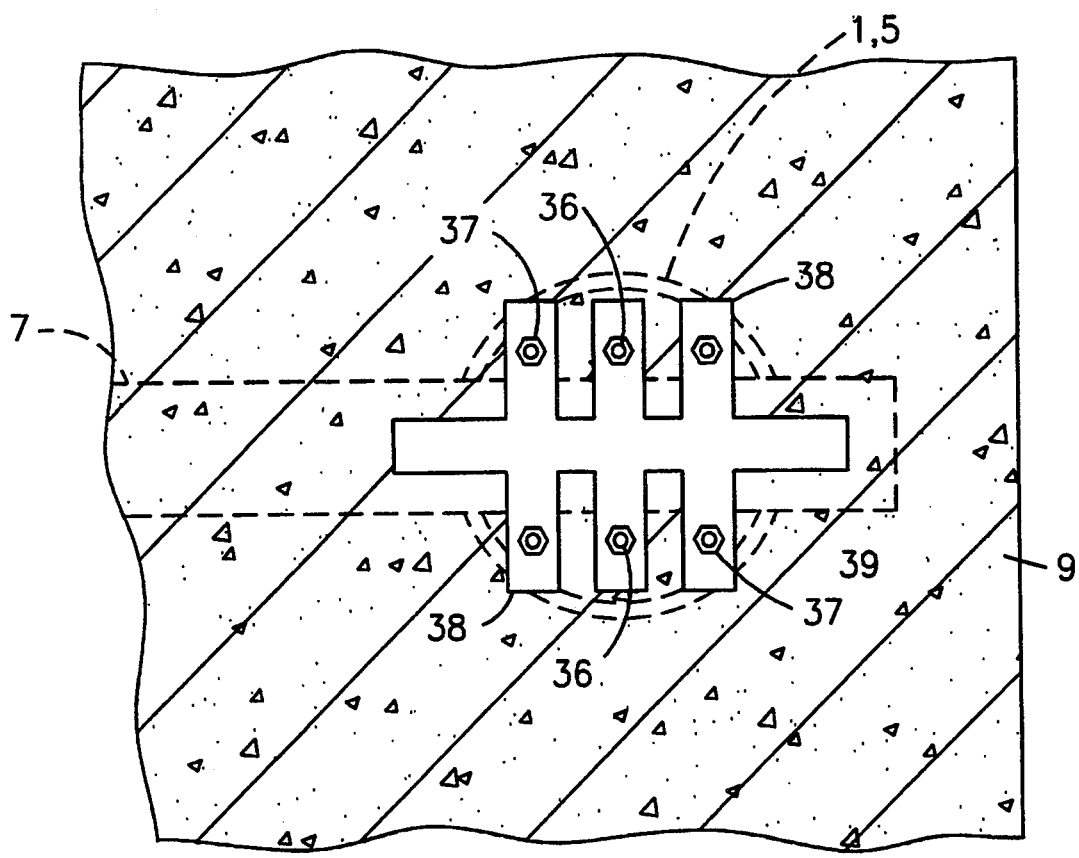

In a fifth example as shown in FIG. 61 through 63, a steel anchor 39 comprises a number of arms 38 extending from side edges of the upper beam 7, and is mounted on the upper portion of the upper beam 7. The anchor bolts 36 pass through pointed ends of the respective arms 38. The nut 37 screwed at the upper portion of the anchor bolt 36 is mounted on an upper surface of the arm 38. The anchor bolts 36 are embedded into the time elapsing curing material 9 which is filled at an upper portion of the partition plate 27 in pile 5 and the placing member 1.

The steel anchor 39 may be secured by welding to the upper beam 7 as required. The nut 37 may be also secured by welding to the arm 38 as required.

Figure 64:
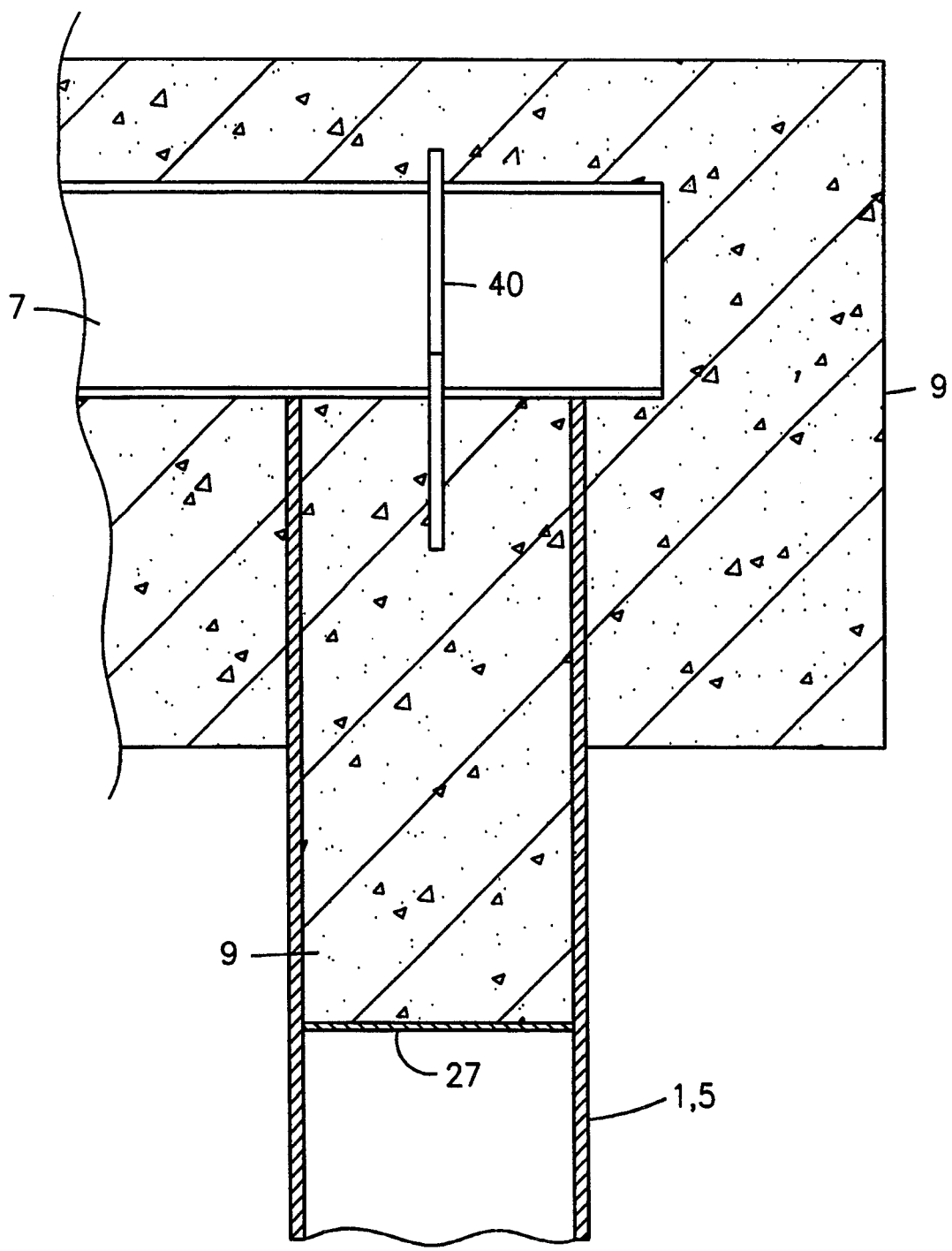
Figure 65:
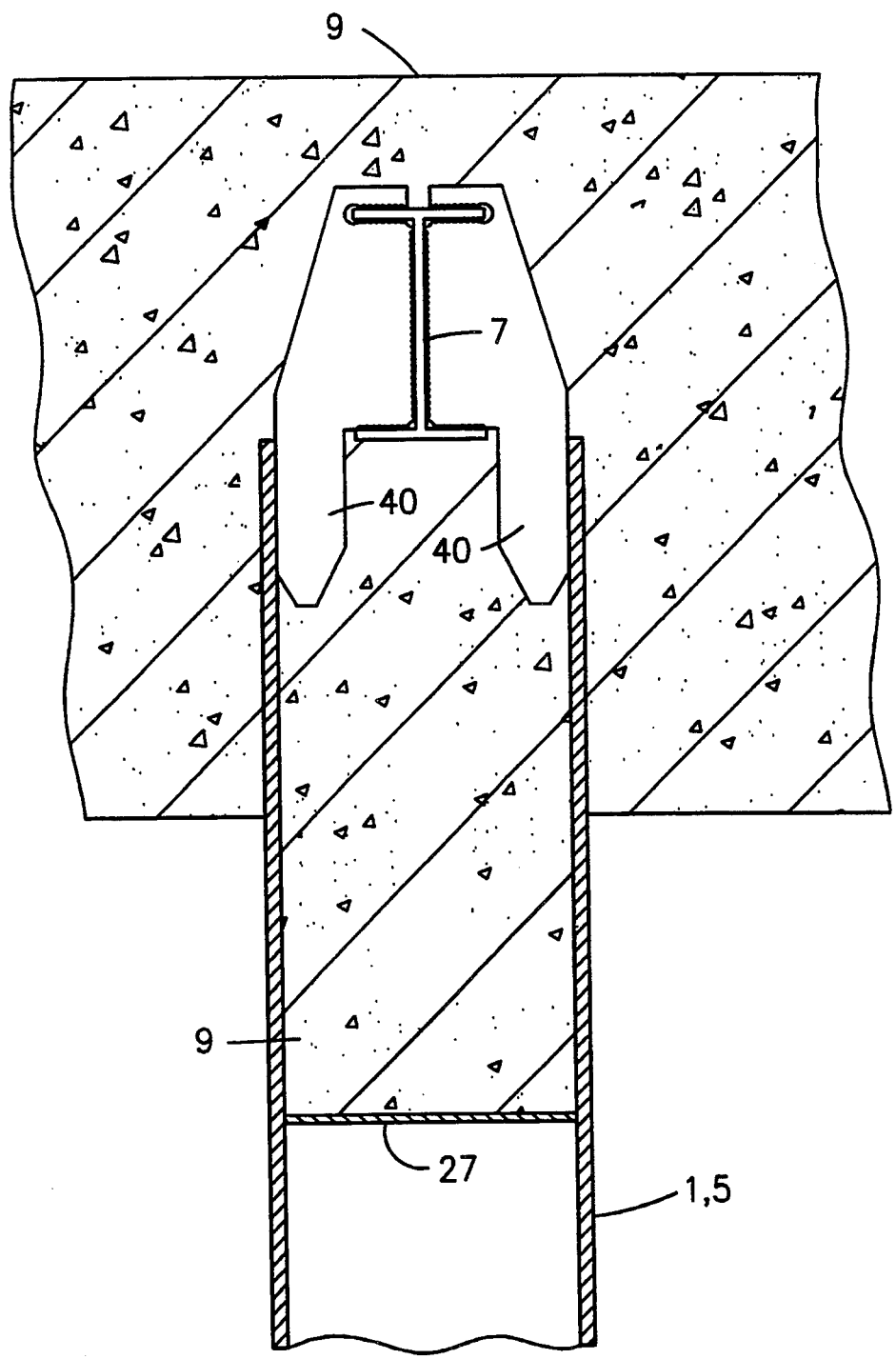

In a sixth example as shown in FIGS. 64 and 65, an upper portion of a steel insert 40 is secured by welding to the respective cross directional ends of the upper beam 7 comprising H sections. A lower portion of each steel insert 40 is fitted into pile 5 and the placing member 1. The steel insert 40 may be secured by welding to the placing member 1 and the 5 as required.

Figure 66:
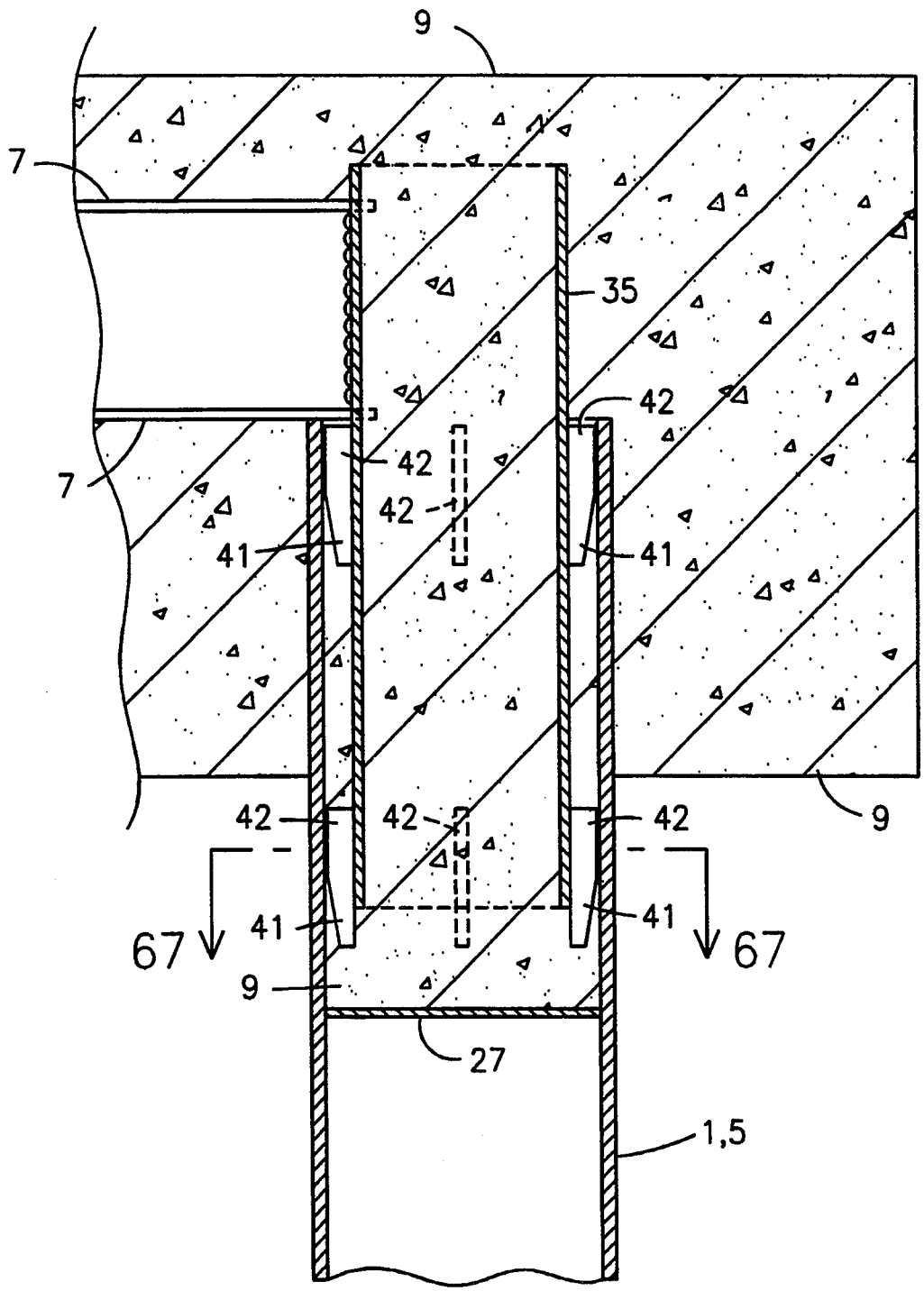
Figure 67:
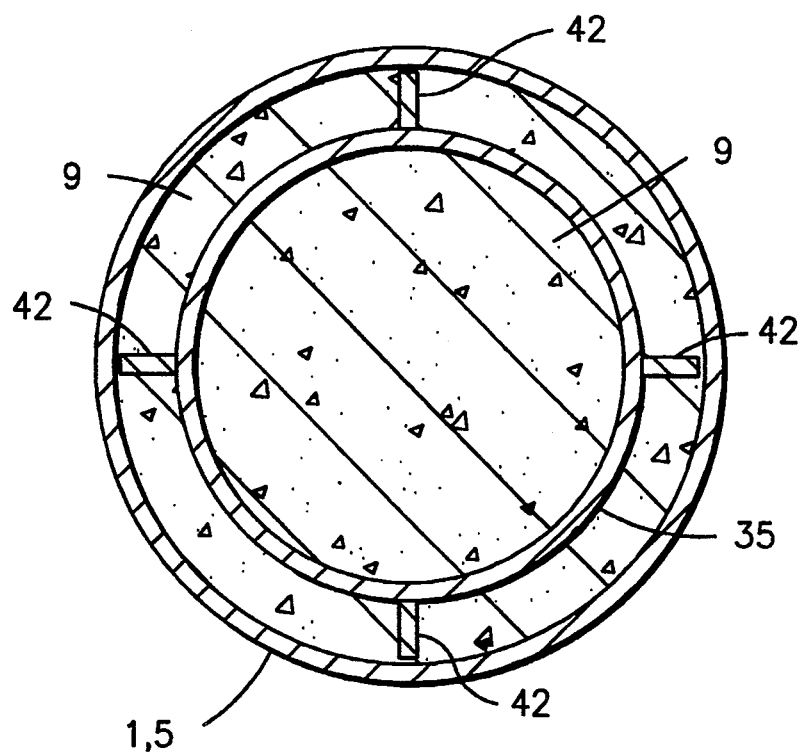

In a seventh example as shown in FIGS. 66 and 67, the end of the upper beam 7 comprising the H sections is secured by welding to the upper side surface of the insert 35 comprising the steel pipe. A plurality of steel anchors 42 (four steel anchors shown in the drawings) having a guide slope 41 are arranged at uniform intervals, and are secured by welding to each outer periphery of an intermediate portion and a lower portion of the insert 35. The insert 35 provided with the steel anchors 42 is inserted pile 5 and the placing member 1. The guide slope 41 may have a linear slope or a circular arc-shaped slope.

Figure 68:
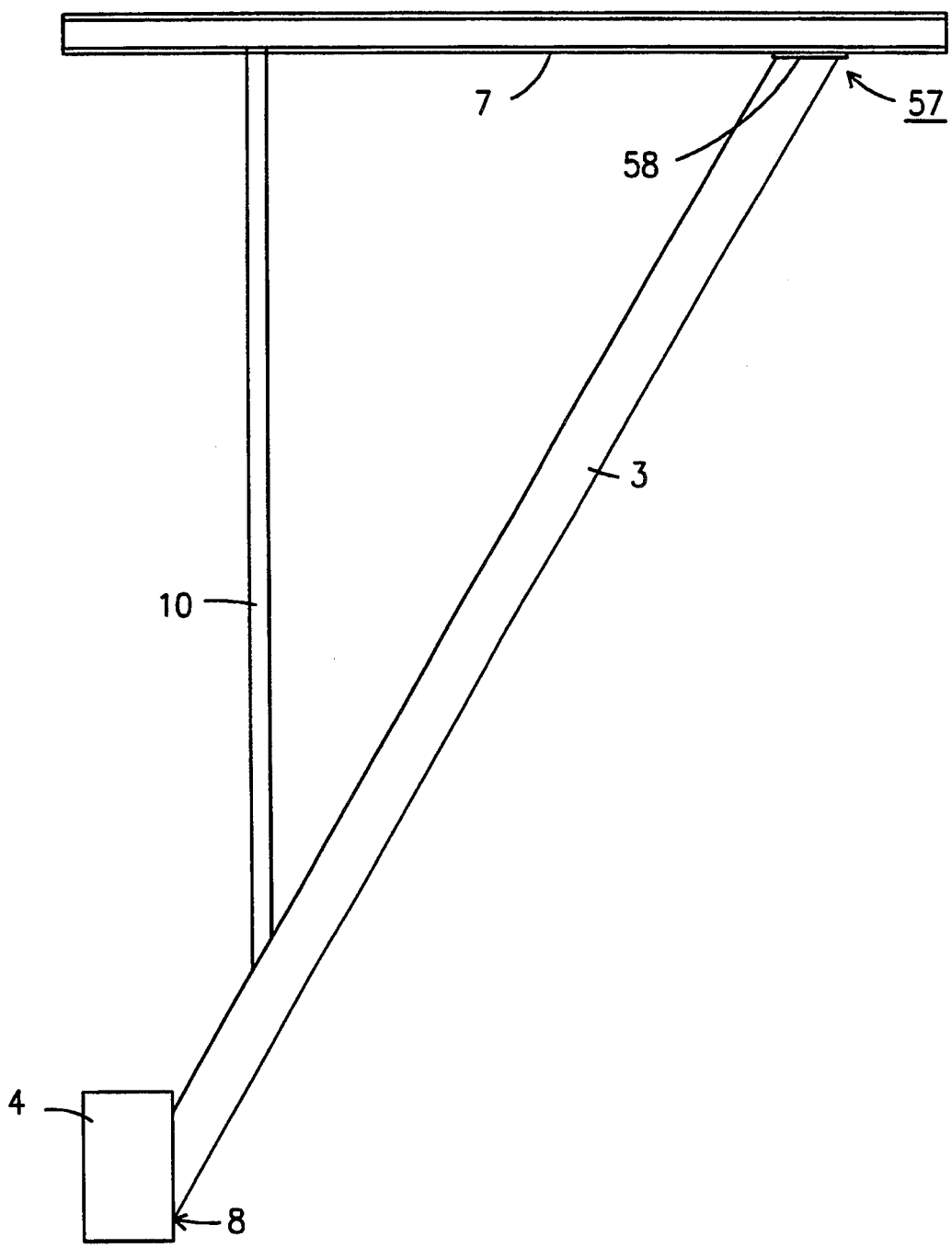
FIG. 68 is a side view showing other examples of a supporting member which can be employed to carry out invention.

FIG. 68 shows another example of supporting frame 57 which can be employed to carry out the present invention. A steel coupling rod 10 extends in the direction perpendicular to the upper beam 7. Ends of the steel coupling rod 10 are secured by welding to a portion of diagonal member 3, which is positioned in the side of the lower cylindrical body 4, and to the upper beam 7. As described above, diagonal member 3 is coupled to the upper beam 7 through the coupling rod 10 at a position apart from a coupling portion for coupling diagonal member 3 with the upper beam 7. Thereby, when lifting supporting frame 57 while supporting upper beam 7, it is possible to prevent excessive bending force from acting on the coupling portion for coupling diagonal member 3 with the upper beam 7. A lower end of the coupling rod 10 may be coupled with the lower cylindrical body 4 rather than diagonal member 3.

Figure 69:
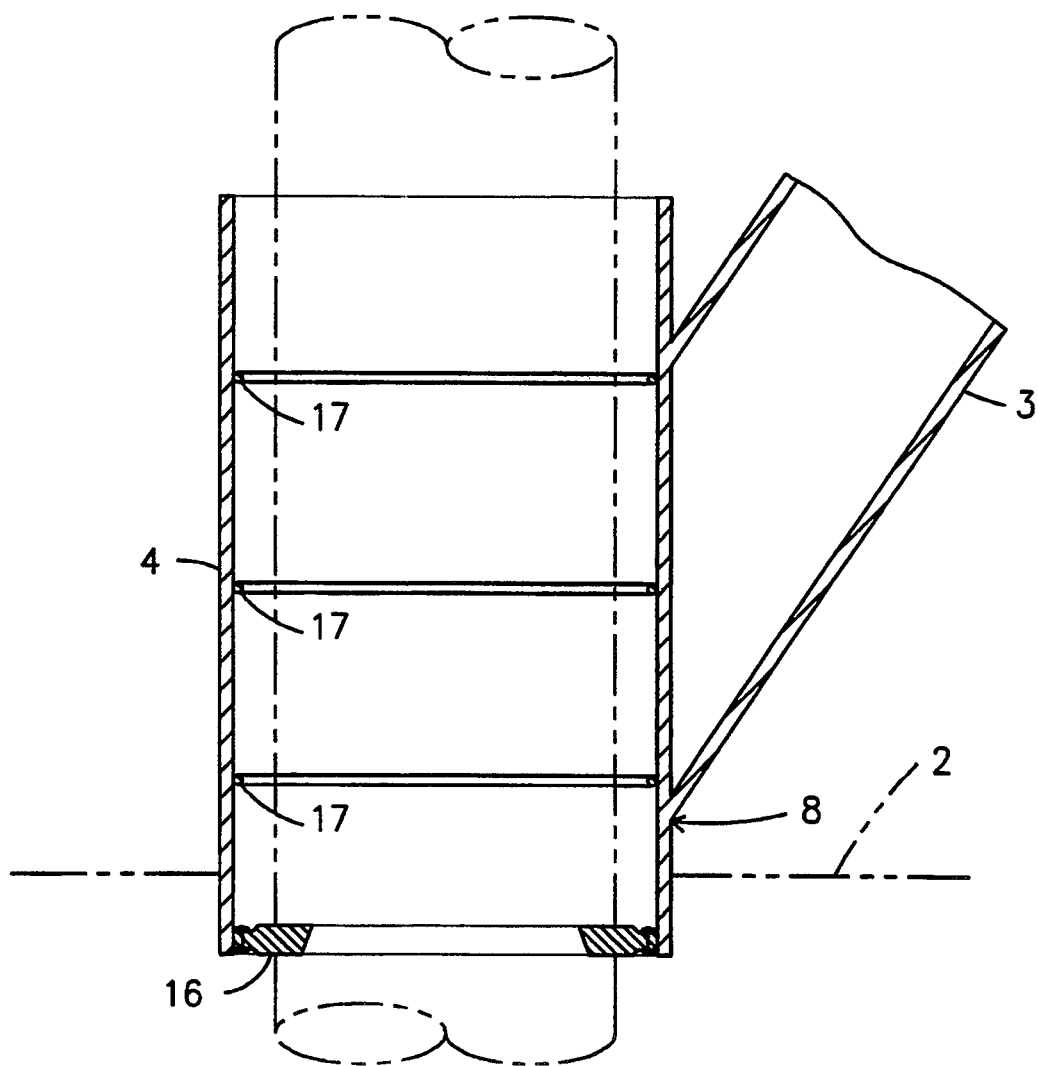
FIG. 69 is a vertical side view showing other examples of a lower cylindrical body with a seal ring.
Figure 70:
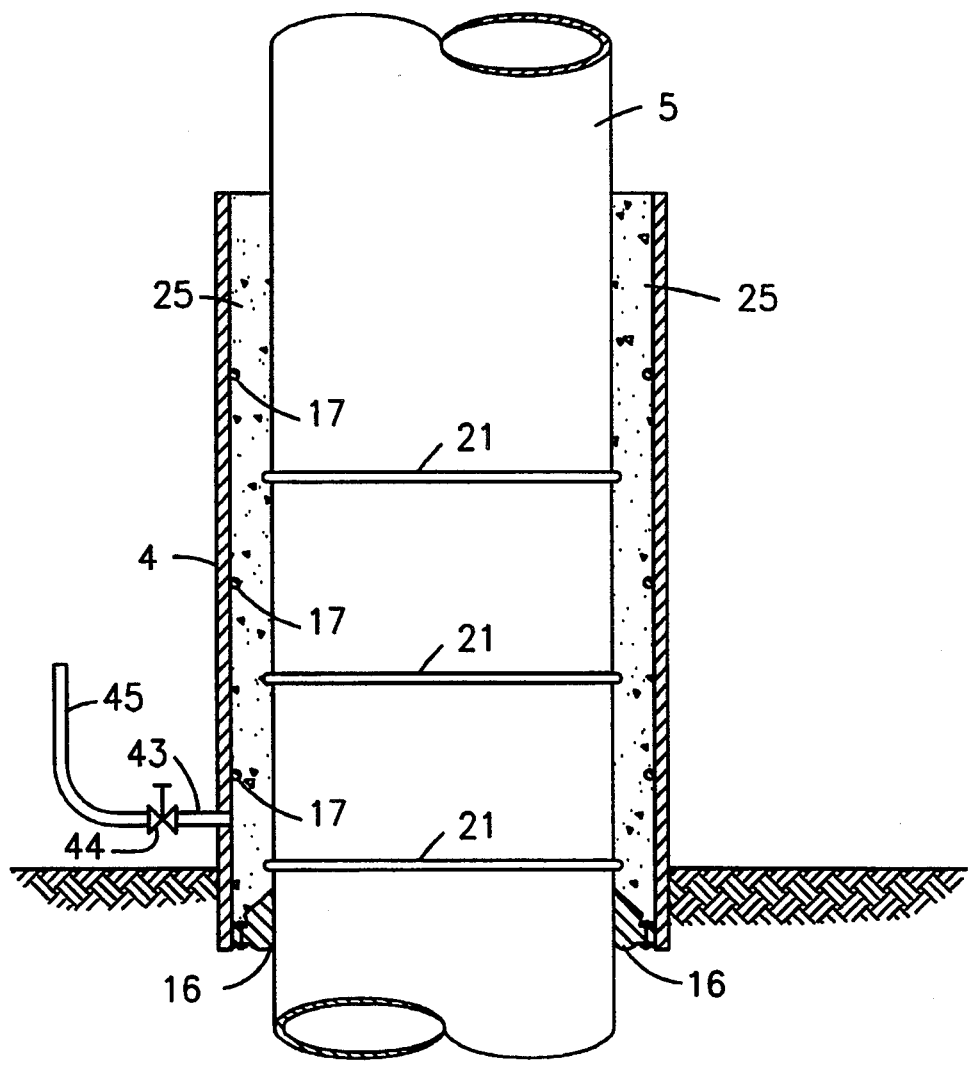
FIG. 70 is a vertical front view showing a time elapsing curing filler filled between the lower cylindrical body with the seal ring and a forward pile.

As shown in FIGS. 69 and 70, a seal ring 16 made of rubber or synthetic resin elastic material is arranged on a lower inner periphery of the lower cylindrical body 4. The lower cylindrical body 4 is provided with a plurality of connectors 17 which are secured to the inner periphery thereof. Further, the seal ring 16 is inserted between a pair of upper and lower supporting rings which are secured to the lower cylindrical body 4, and is fixed by a mechanical means such as a bolt. A grout filling hose 45 is connected through an opening/closing valve 44 to a filling pipe 43 which is coupled on the lower side of the lower cylindrical body 4. The time elapsing curing material 25 is injected and filled between the lower cylindrical body 4 and pile 5 through the hose 45, the opening/closing valve 44, and the filling pipe 43. Then, the hose 45 may be removed and recovered from the opening/closing valve 44 after closing the opening/closing valve 44.

Figure 71:
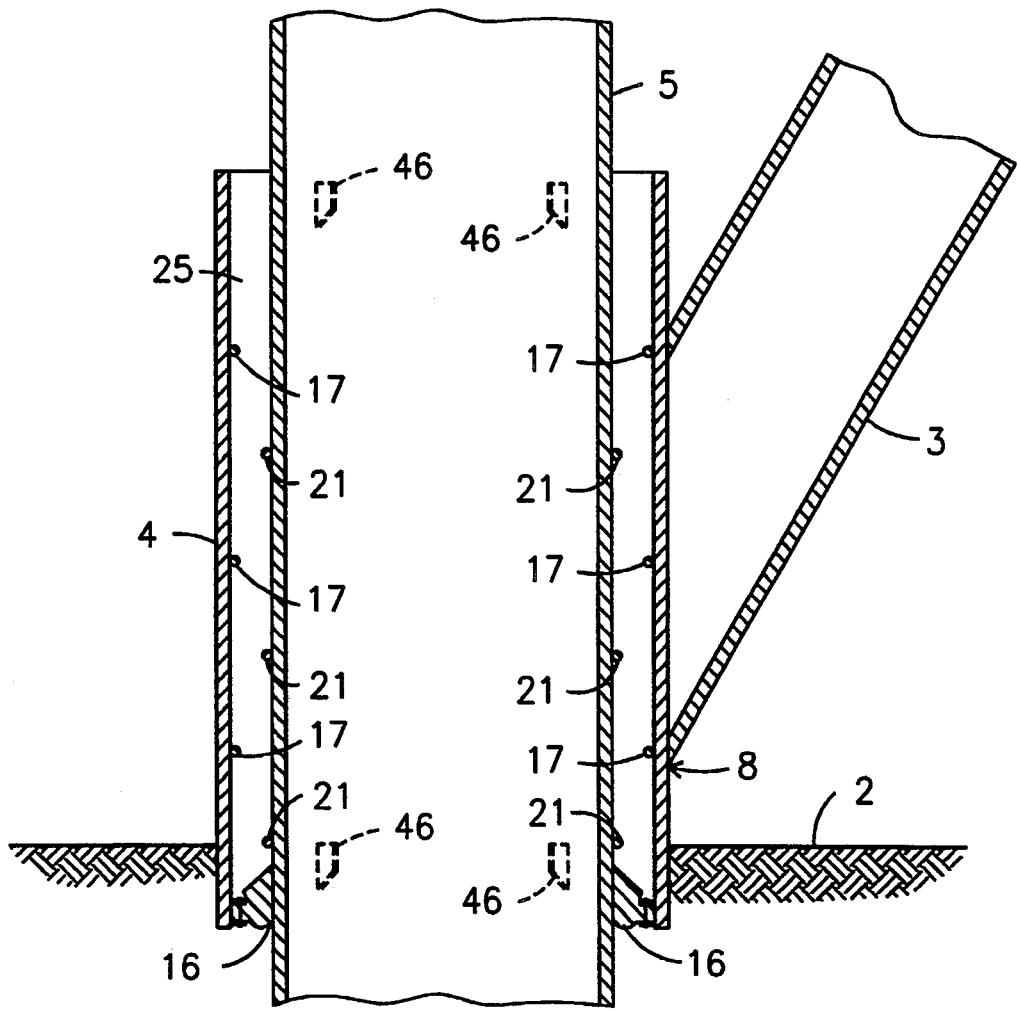
FIG. 71 is a vertical side view showing an example in which spacers are provided for an upper portion and a lower portion in the lower cylindrical body.
Figure 72:
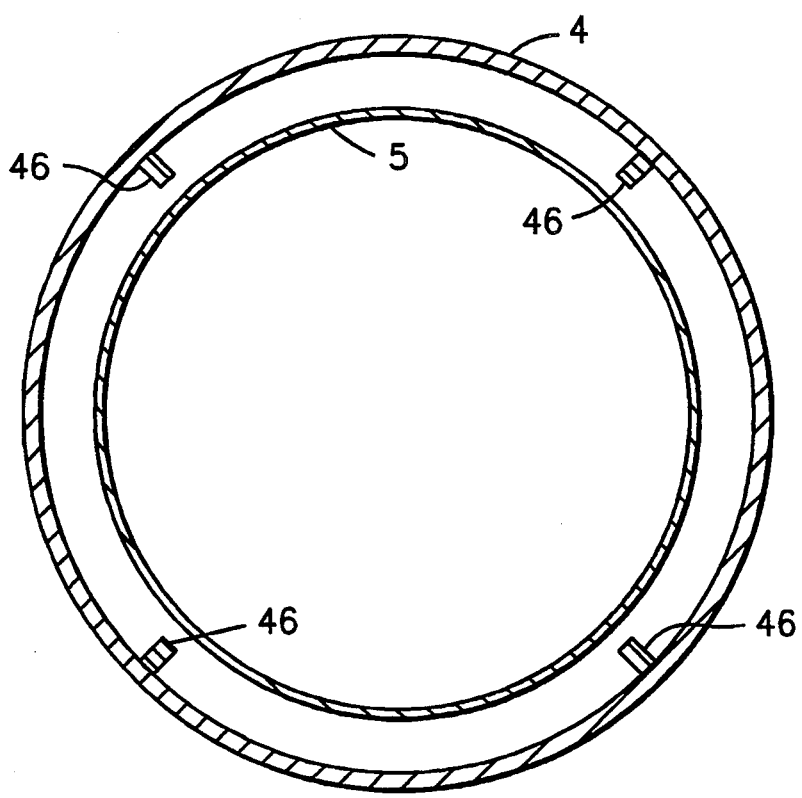
FIG. 72 is a cross-sectional plan view showing arrangement of the spacers.
Figure 73:
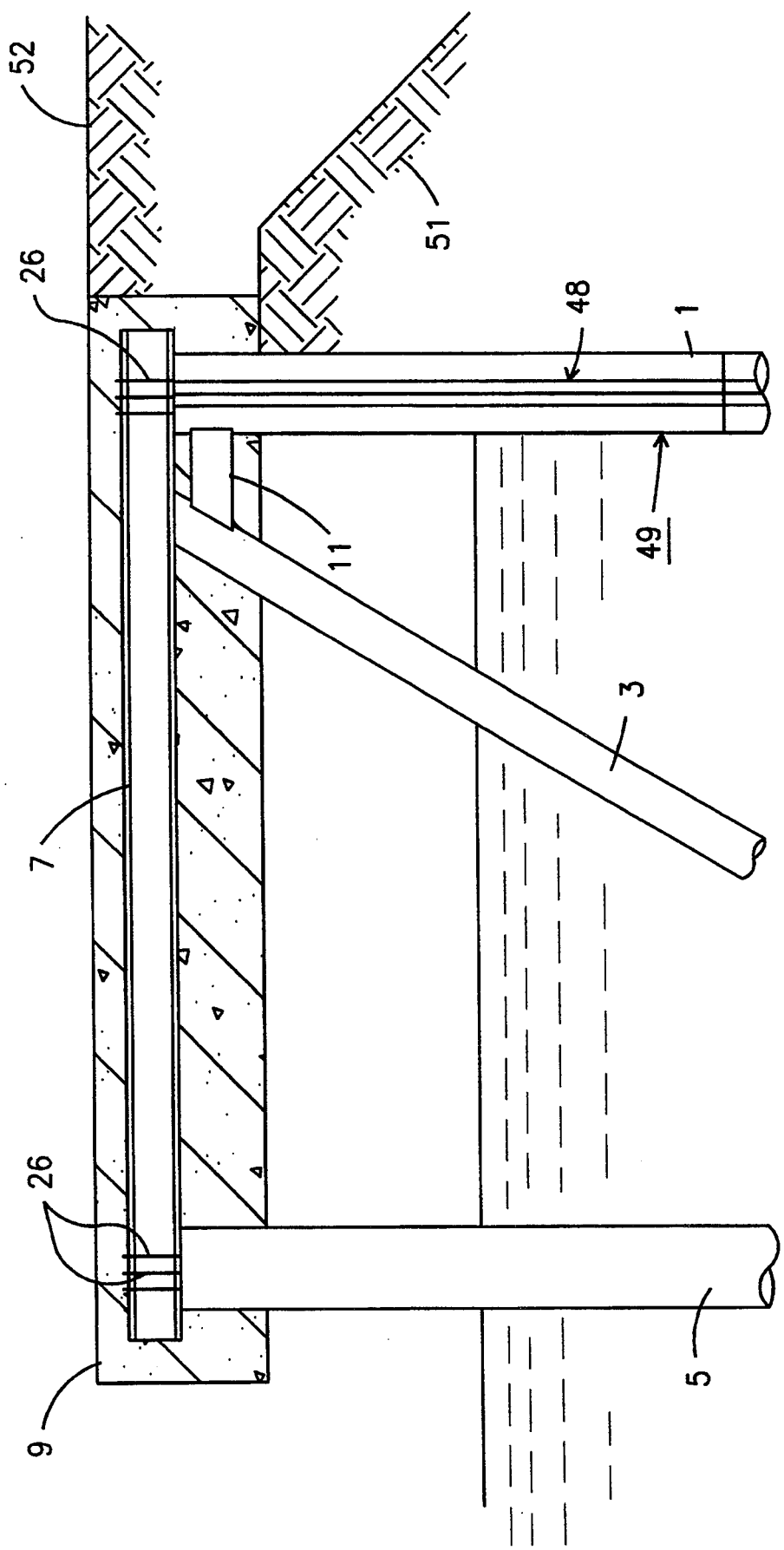
FIG. 73 is a partial vertical side view showing an upper portion of the diagonal member coupled with that of the sheet pile wall.

As shown in FIGS. 71 and 72, a plurality of (for example, four) spacers 46 may be fixed at uniform intervals about upper and lower portions in the lower cylindrical body 4. The spacer 46 serves to provide an interval greater than a predetermined interval between the lower cylindrical body 4 and pile 5. As shown in FIG. 73, the steel shearing forcing transfer member 11 may be interposed between the upper portion of diagonal member 3 and that of the sheet pile wall 49. Further, the shearing forcing transfer member 11 may be fixed by welding or a bolt on the sheet pile wall 39 and diagonal member 3.

Figure 74:
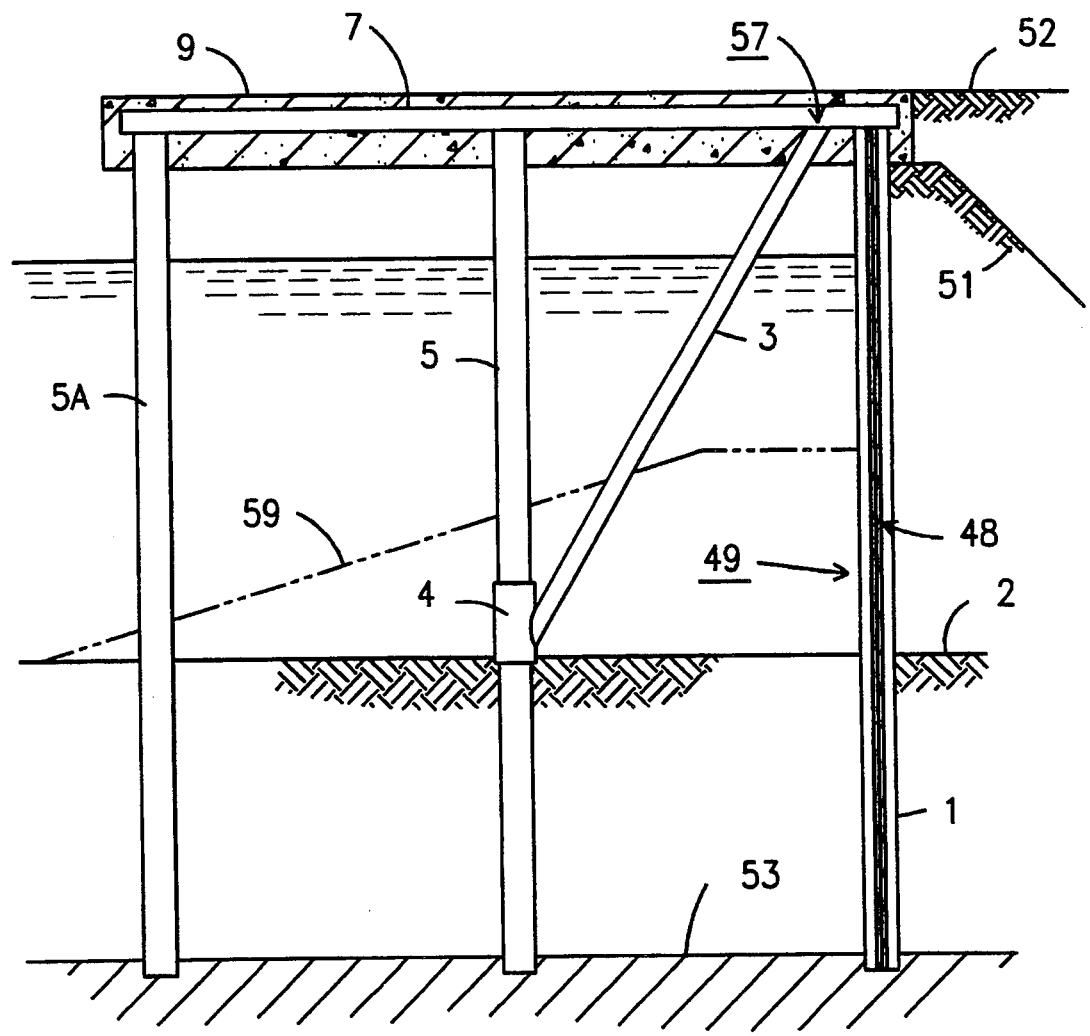
FIGS. 74 and 75 are vertical side views showing overall constructions of a sixth embodiment and a seventh embodiment of a water area structure using a placing member, respectively.

FIG. 74 shows a sixth embodiment of the present invention. A second pile 5A is driven into underwater ground 2 in spaced relation to pile 5. An upper beam 7 is disposed and fixed by a suitable means such as welding among an upper end of a placing member 1 comprising a sheet pile body in a sheet pile wall 49, that of pile 5, and that of the second pile 5A. A lower cylindrical body 4 in a proof compressive supporting member 8 is secured to pile 5 as described hereinbefore. An upper end of diagonal member 3 in supporting member 8 is secured to the upper beam 7 by a suitable means such as welding. Each upper end of the sheet pile wall 49, diagonal member 3, the forward pile 5, the second pile 5A and the upper beam 7 are embedded in time elapsing curing material 9. Banking 59 is provided as required at a position on the underwater ground 2, where a water area structure is positioned.

Figure 75:
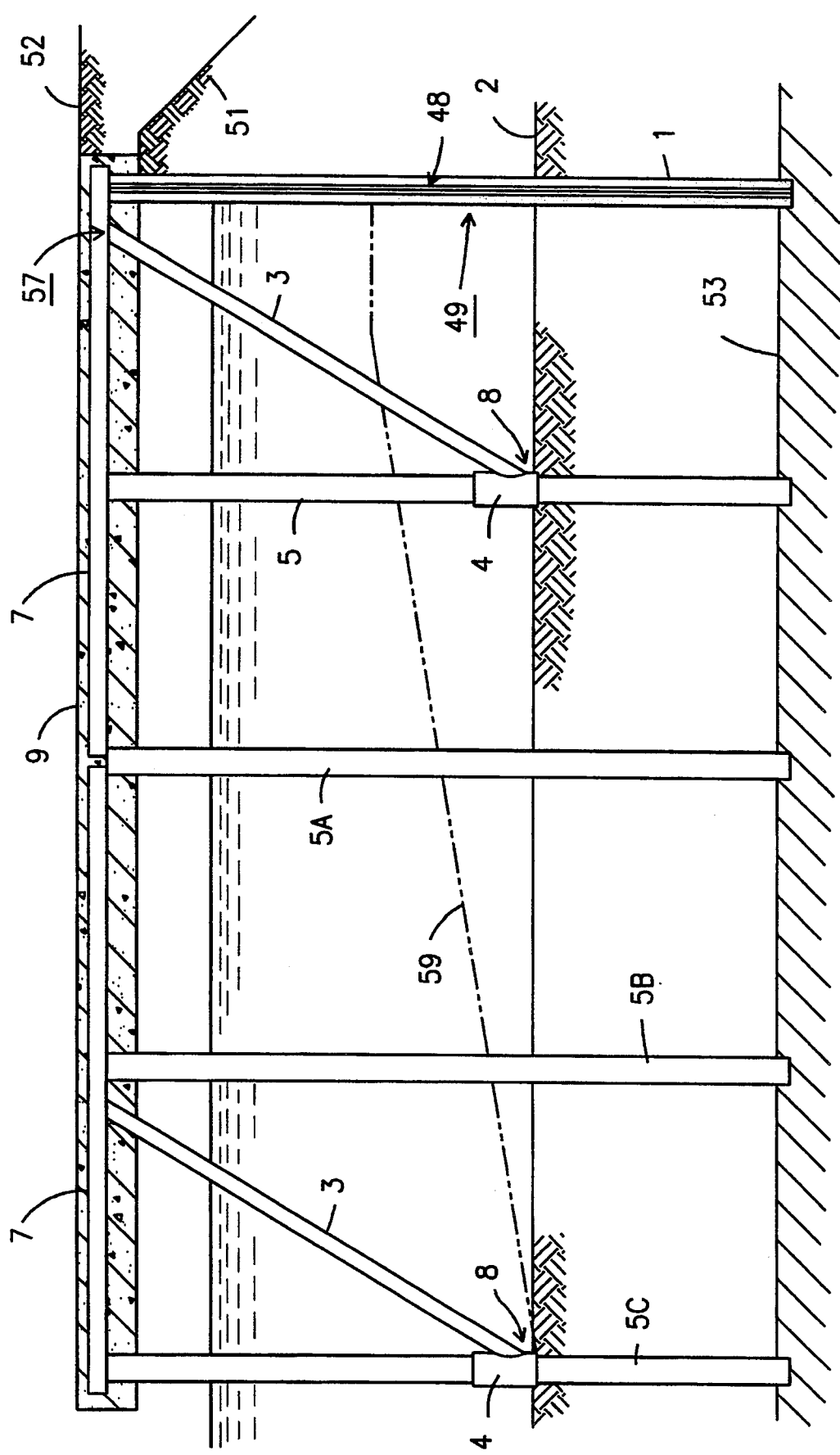

FIG. 75 shows a seventh embodiment of the present invention. A second pile 5A, a third pile 5B, and a fourth pile 5C are driven into underwater ground 2 in spaced relation to forward pile 5. An upper beam 7 is disposed and fixed by a suitable means such as welding among an upper end of a placing member 1 comprising a sheet pile body in a sheet pile wall 49, and the respective upper ends of the piles 5A through 5C. Lower cylindrical bodies 4 in supporting members 8 are secured by the above-mentioned means to pile 5 and the fourth pile 5C. An upper end of diagonal member 3 in supporting member 8 is secured by a suitable means such as welding to the upper beam 7. The upper end of the sheet pile wall, that of each diagonal member 3, that of each pile 5, the upper ends of piles 5A through 5C, and the upper beam 7 are embedded in the time elapsing curing material 9. Banking 59 is provided as required on a position in the underwater ground 2, where a water area structure is positioned.

Figure 76:
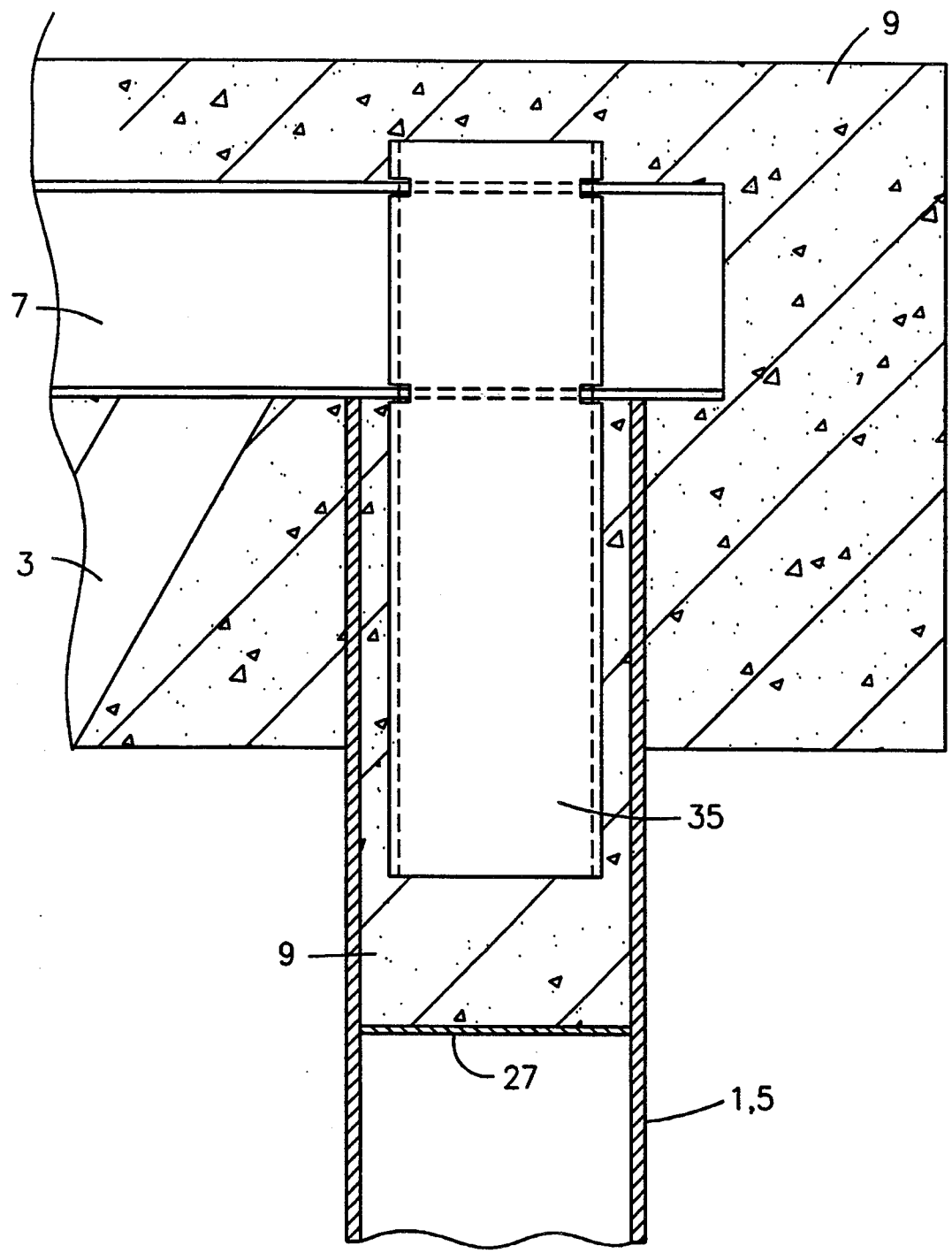
FIGS. 76 and 77 show other examples of a coupling structure for coupling an upper beam with the placing member and a pile.
Figure 77:
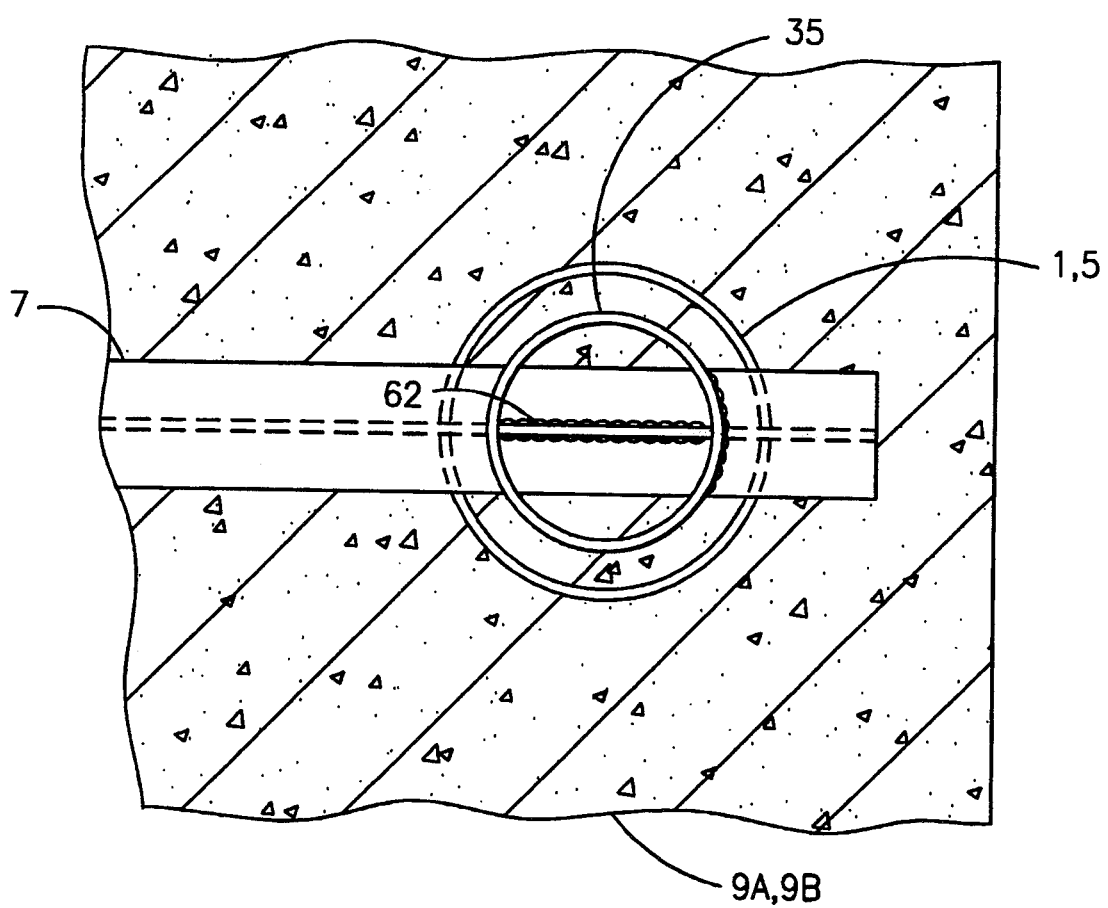

FIGS. 76 and 77 show another example of a coupling structure for coupling the upper beam 7 with the placing member 1 and pile 5. The end of the upper beam 7 is slidably inserted into an opening which is provided in an upper portion of an insert 35 comprising a steel pipe. An end of the upper beam 7 is mounted on the upper ends of the placing member 1 and pile 5. A lower portion of the insert 35 is inserted into the placing member 1 and pile 5. A steel coupling plate 62 is fitted into an upper portion of the insert 35. A lower portion of the steel coupling plate 62 is secured by welding to an upper surface of the upper beam 7. The insert 35 and the upper beam 7 are secured by welding with each other.

Subsequently, the time elapsing curing material 9 is driven to embed the upper beam 7 as well as the upper portions of the placing member 1, diagonal member 3, and pile 5. The time elapsing curing material 9 is filled between the insert 35 and the upper portion of the placing member 1 or that of pile 5, and is also filled in the insert 35.

The coupling plate 62 may be omitted. If the coupling plate 62 is used, the insert 35 may not be secured by welding to the upper beam 7.

Figure 78:
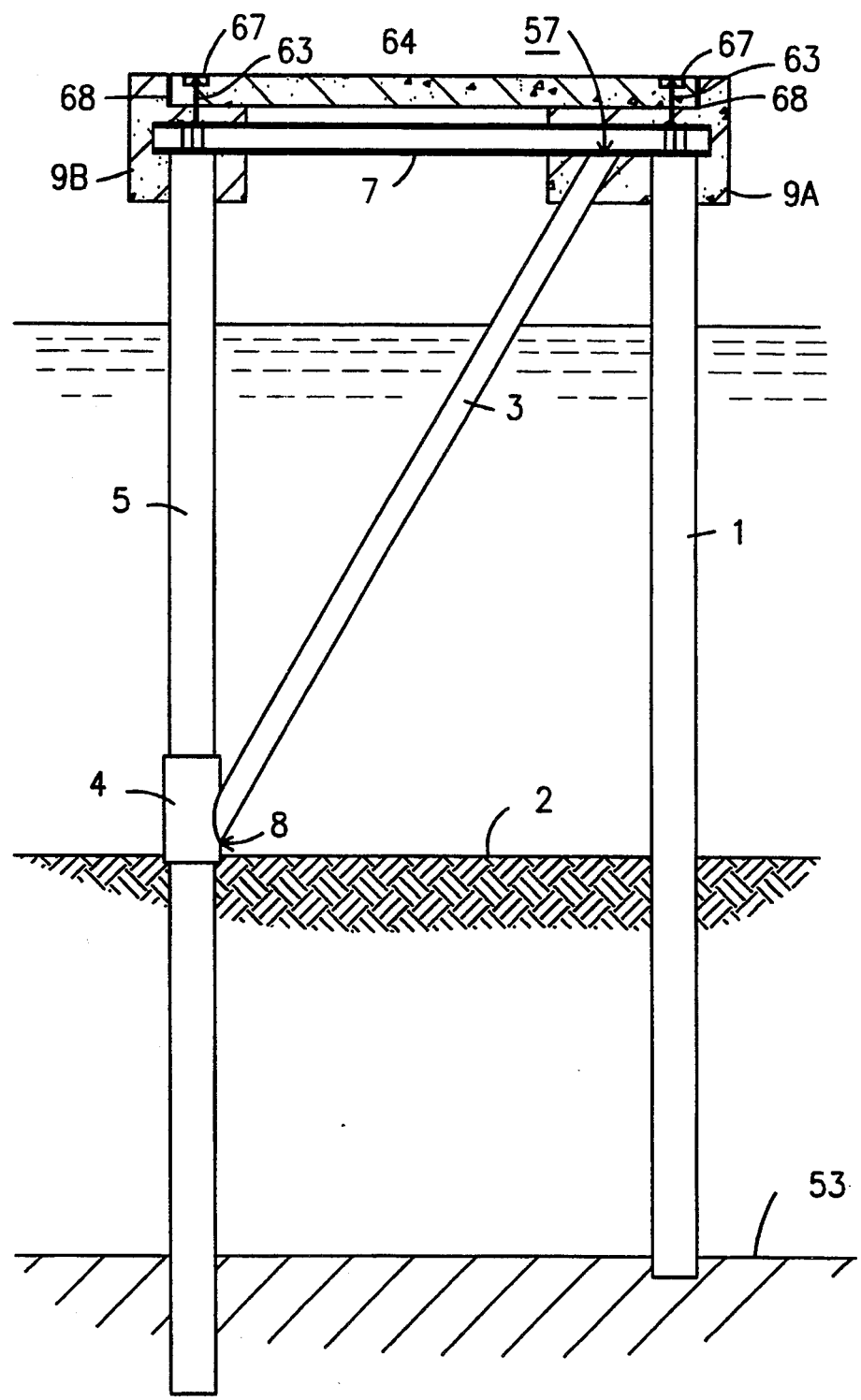
FIG. 78 is a vertical side view showing the water area structure with a floor board interposed and fixed between the opposite time elapsing curing materials.
Figure 79:
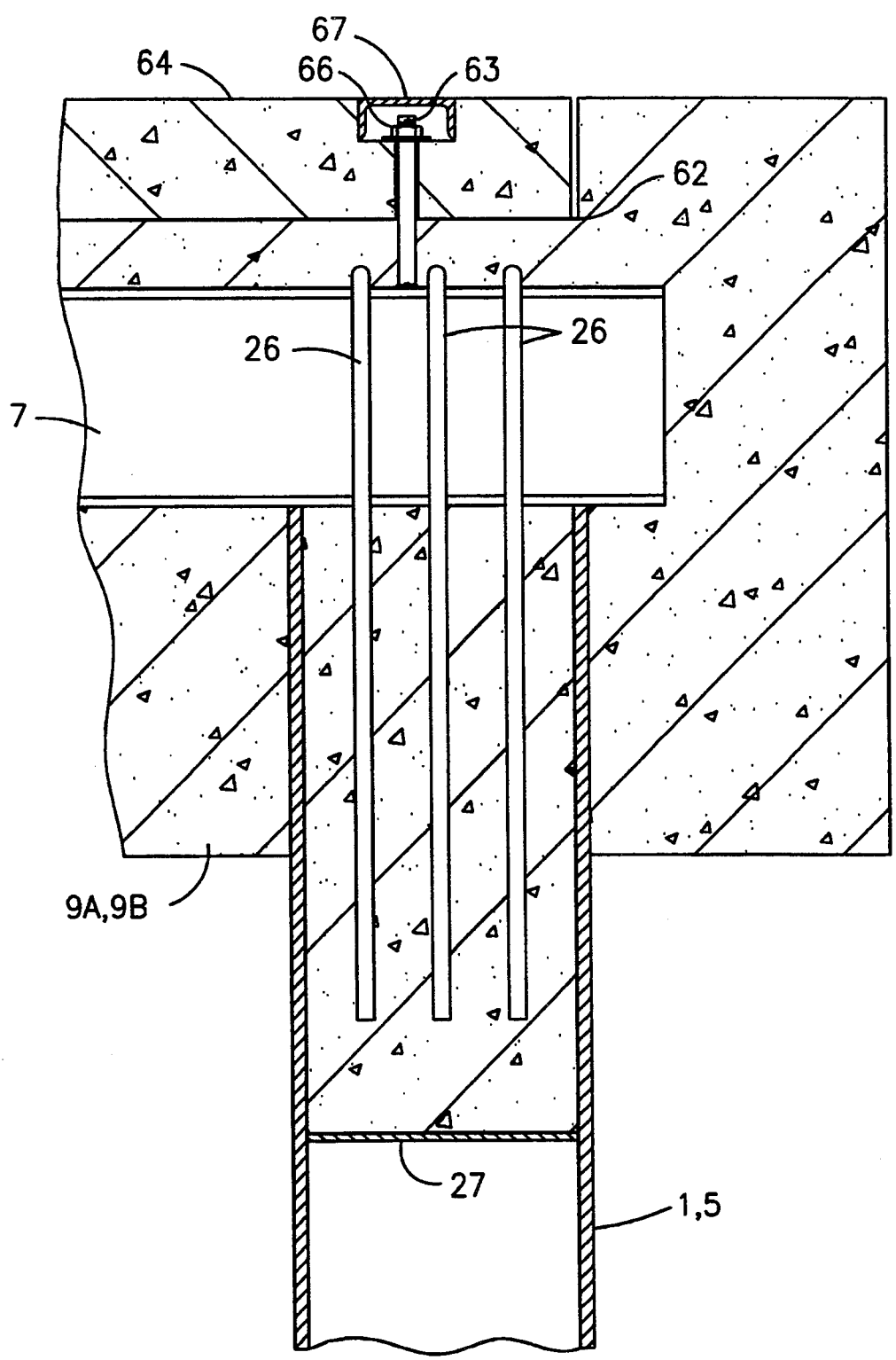
FIG. 79 is a partially enlarged vertical side view thereof.

Referring now to FIGS. 78 and 79, time elapsing curing material 9A serves to embed the upper portions of the placing member 1 and diagonal member 3, and one end of the upper beam 7. Time elapsing curing material 9B serves to embed the upper end of pile 5 and the other end of the upper beam 7. Notched stage portions 68 are provided in the respective time elapsing curing materials 9A and 9B. A bolt 63 projects from a bottom surface of the notched stage portions 68. A lower end of the bolt 63 is secured by welding to the upper beam 7. Each end of a precast concrete floor plate 64 is mounted on each notched stage portion 68 of the time elapsing curing materials 9A, 9B. The bolt 63 passes through a through hole in the floor plate 64. A concave portion 65 having a large diameter is provided in the upper side of the floor plate 64. The floor plate 64 is clamped using a nut 66 screwed onto the bolt 63, and is fixed on the time elapsing curing materials 9A, 9B in the concave portion 65. A cap 67 is fitted into the concave portion 65.

A steel sheet pile or a concrete sheet pile with an optional section may be employed as the placing member 1 to carry out the present invention. An inverted U-shaped reinforcing bar 26 may be secured by welding to the upper beam 7, the placing member 1, pile 5, and the like.

A square pipe or a circular pipe may be used as the upper beam 7. Otherwise, it is possible to employ an upper beam constructed by filling the square pipe or the circular pipe with the time elapsing curing material such as concrete or the time elapsing curing material in which a reinforcement such as a reinforcing bar is embedded.

As diagonal member 3, it is possible to employ a diagonal member constructed by embedding the time elapsing curing material such as concrete or the reinforcement such as a reinforcing bar into a steel pipe body or a steel pipe body with connector which is provided on an inner surface thereof. A steel pipe with internal projection may be used as the lower cylindrical body 4.

The connector may be provided at a position inside pile 5, where at least the lower cylindrical body 4 is positioned. The time elapsing curing material such as concrete may be filled in the portion. Otherwise, the steel pipe with internal projection may be employed at a position of the forward pile 5, where at least the lower cylindrical body 4 is positioned. The time elapsing curing material such as concrete may be filled in the steel pipe. Further, the lower end of diagonal member 3 may be connected by a pin to a blanket fixed on the lower cylindrical body 4.

In the first embodiment, the connector may be provided for an outer periphery, an inner periphery, or the respective peripheries of the placing member 1 and diagonal member 3. Furthermore, the connector may be provided for an outer periphery of the insert 35.

The reinforcement such as a reinforcing bar may be embedded in the time elapsing curing material 9. A lower portion of the lower cylindrical body 4 may be extended longer than the lower portion of diagonal member 3 in the lower cylindrical body 4. Thus, the extended portion may be embedded in the underwater ground 2. Moreover, when the partition plates 27 are disposed in the placing member 1 and pile 5 in the execution field for a water area structure, a lower portion of a lifting sling may be coupled with the partition plate 27. Furthermore, an upper portion of the lifting sling may be anchored to upper edges of the placing member for underwater ground 1 and that of pile 5.

Figure 80:
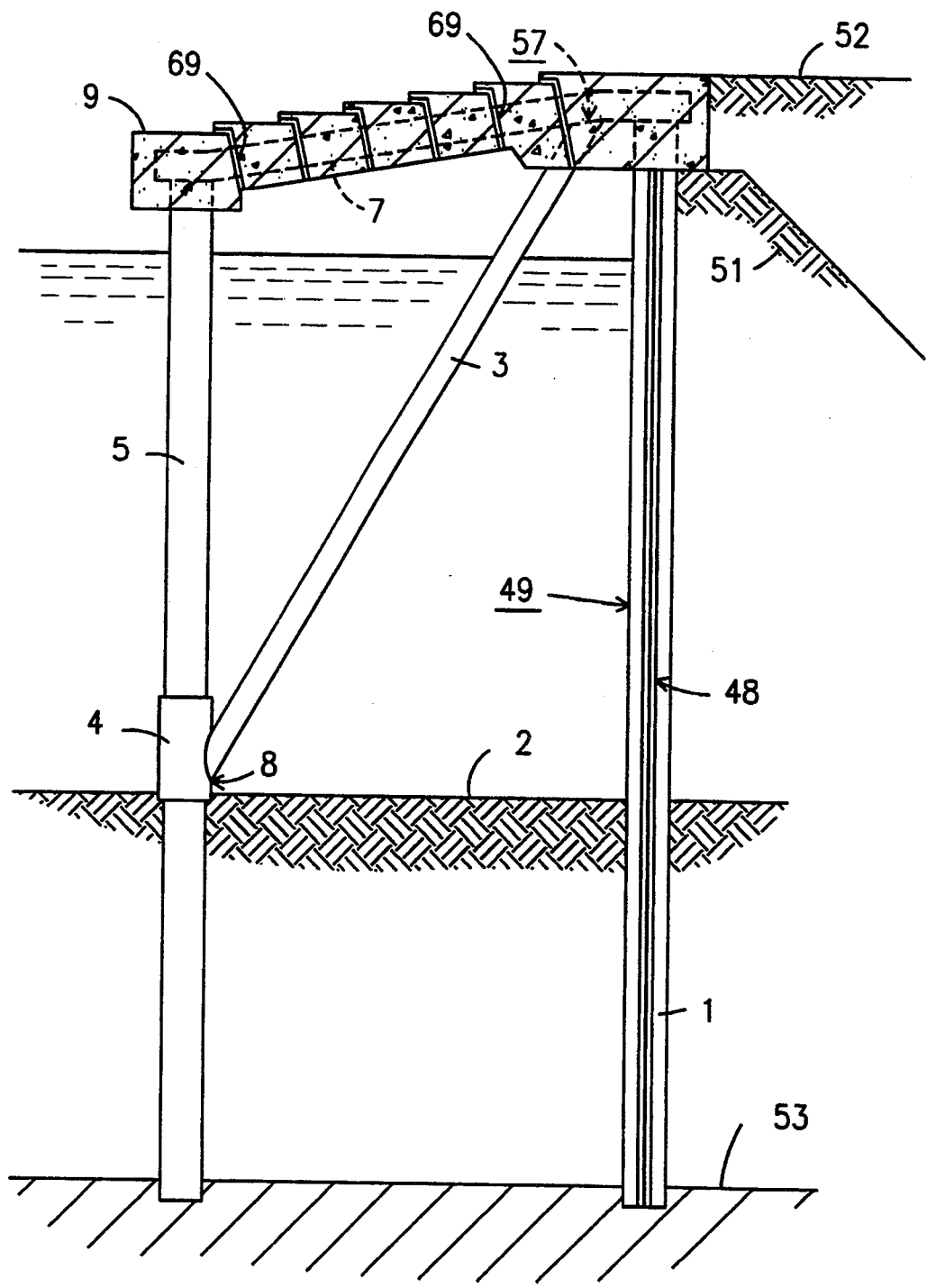
FIG. 80 is a vertical side view showing the water area structure provided with a step type coupling member.
Figure 81:
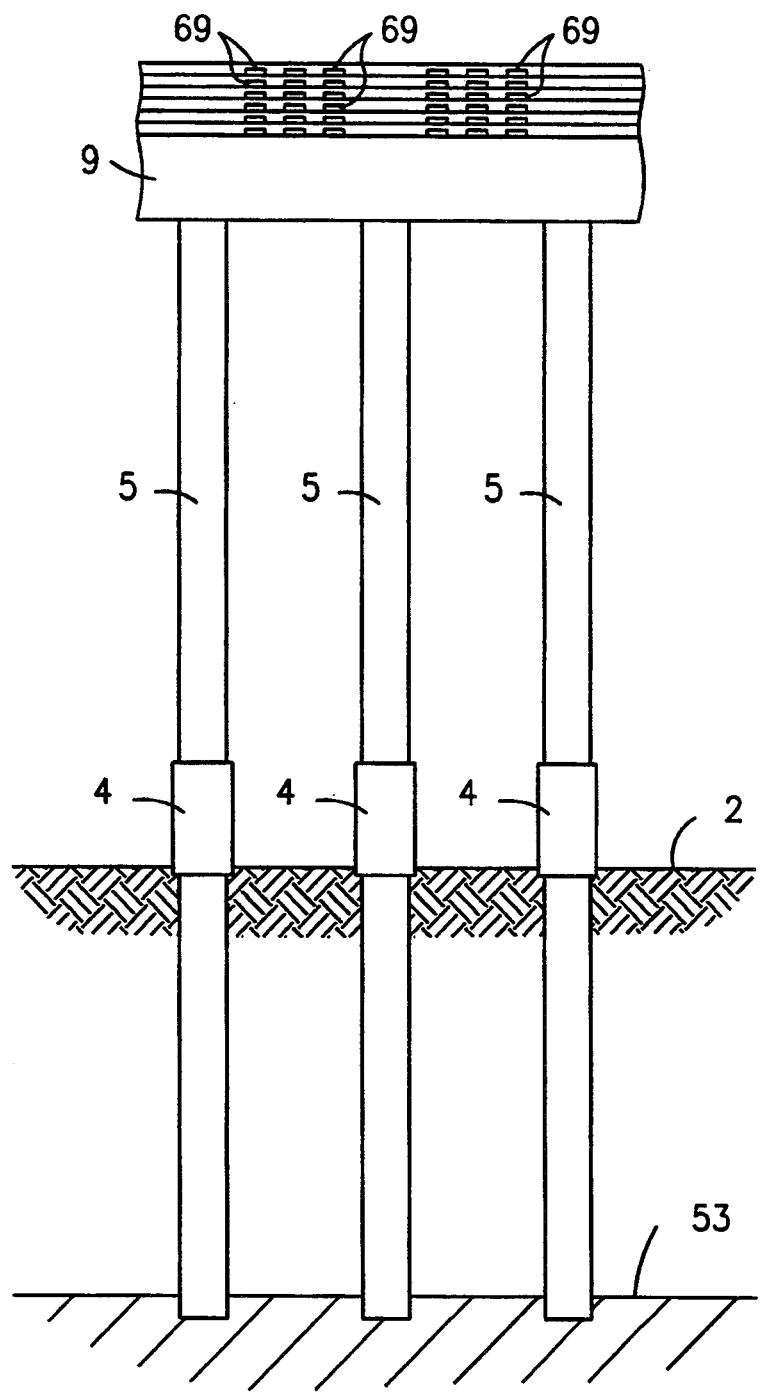
FIG. 81 is a front view thereof.
Figure 82:
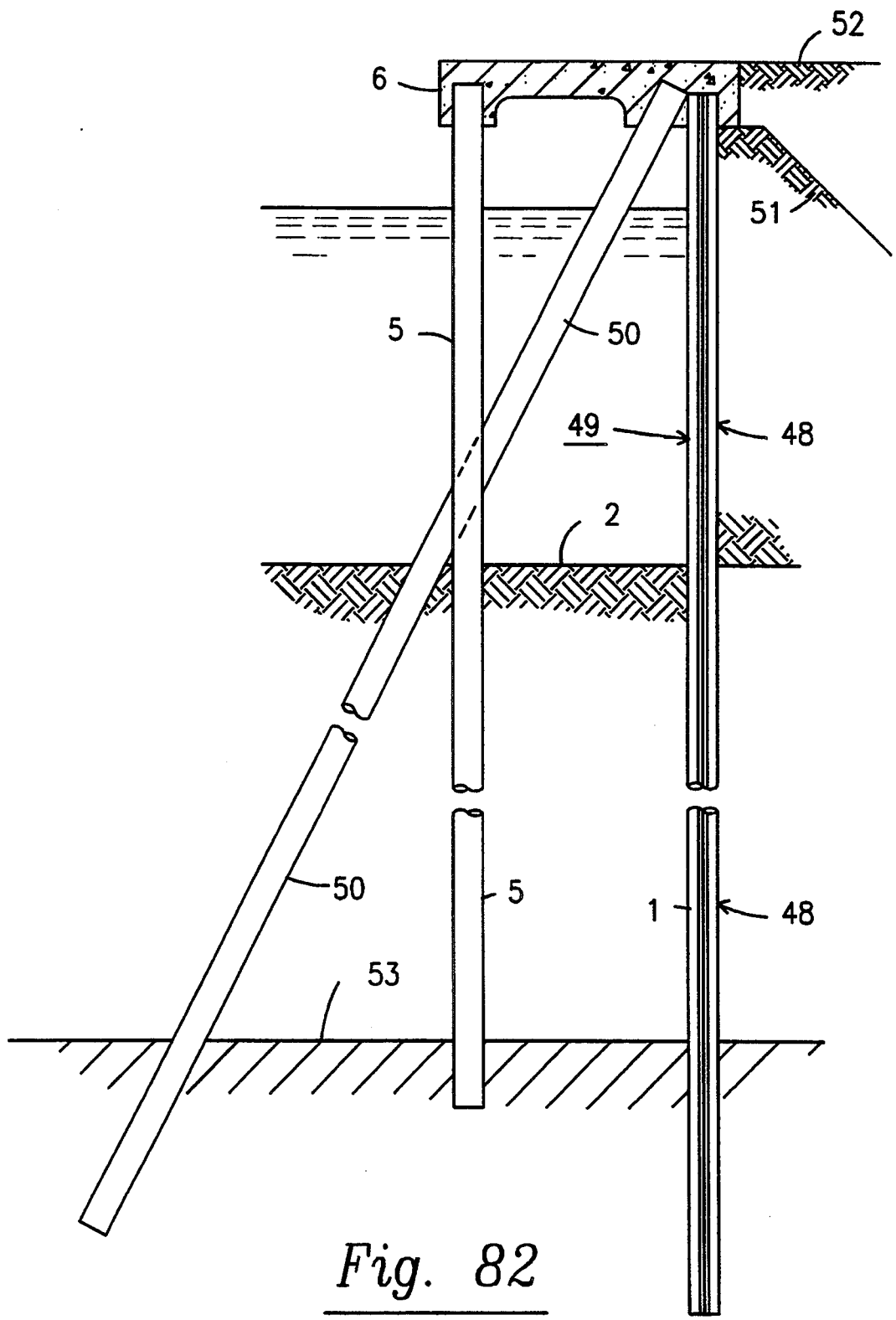
FIG. 82 is a vertical side view showing a conventional water area sheet pile wall structure.
Figure 83:
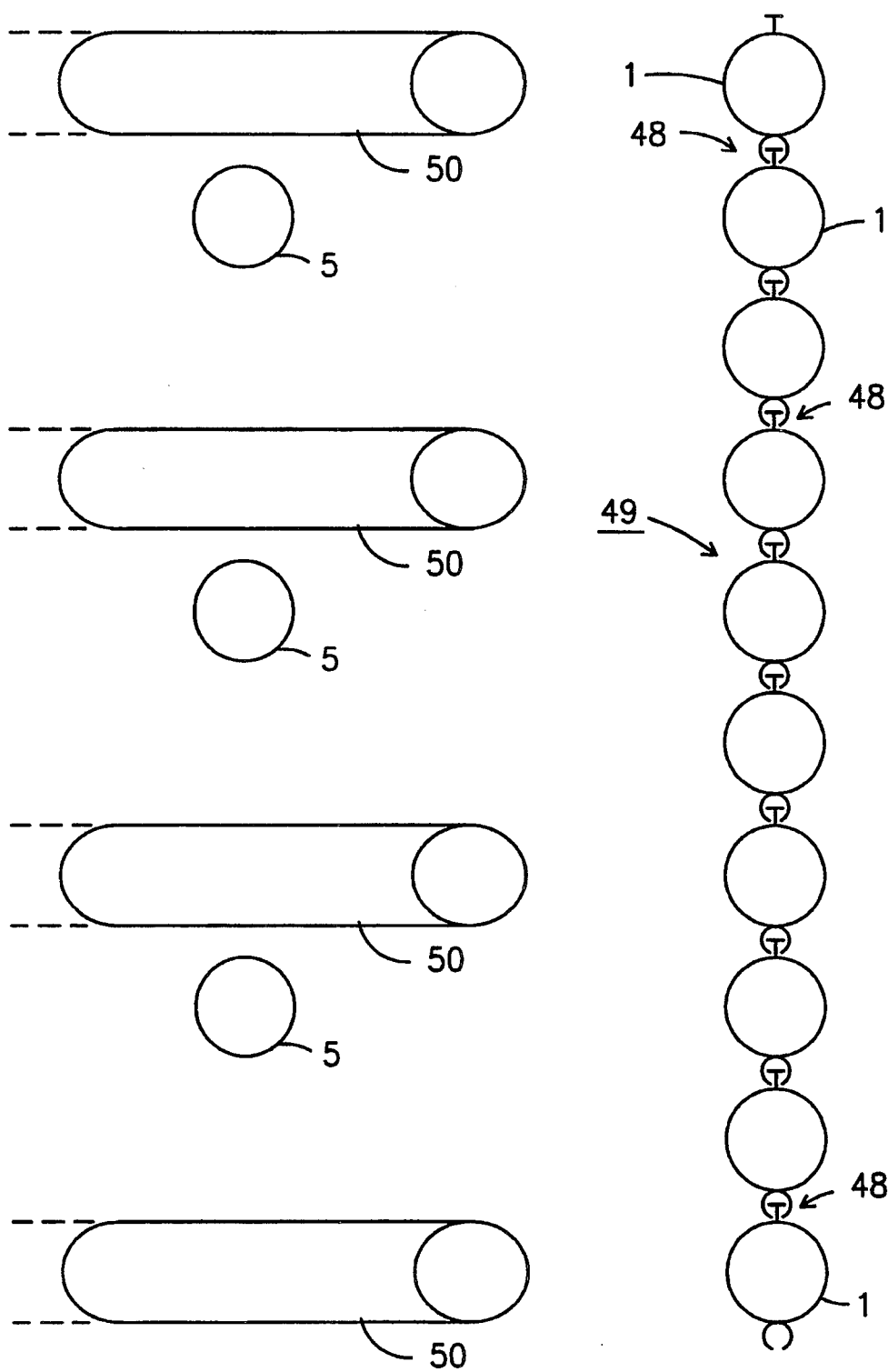
FIG. 83 is a cross-sectional plan view thereof.

As shown in FIGS. 80 and 81, the coupling member 6 comprising a top plate may be provided with a step-formed upper surface for its hydrophilic function. In order to avoid back flow of waves, a number of flowing holes 69 may be provided for the coupling member 6 to pass waves through the coupling member 6 up and down.

In order to improve a function of removing waves, removing waves blocks or rocks may be filled up to a suitable height between the sheet pile wall 40 and pile 5, or between the placing member 1 and pile 5.

Figure 33:
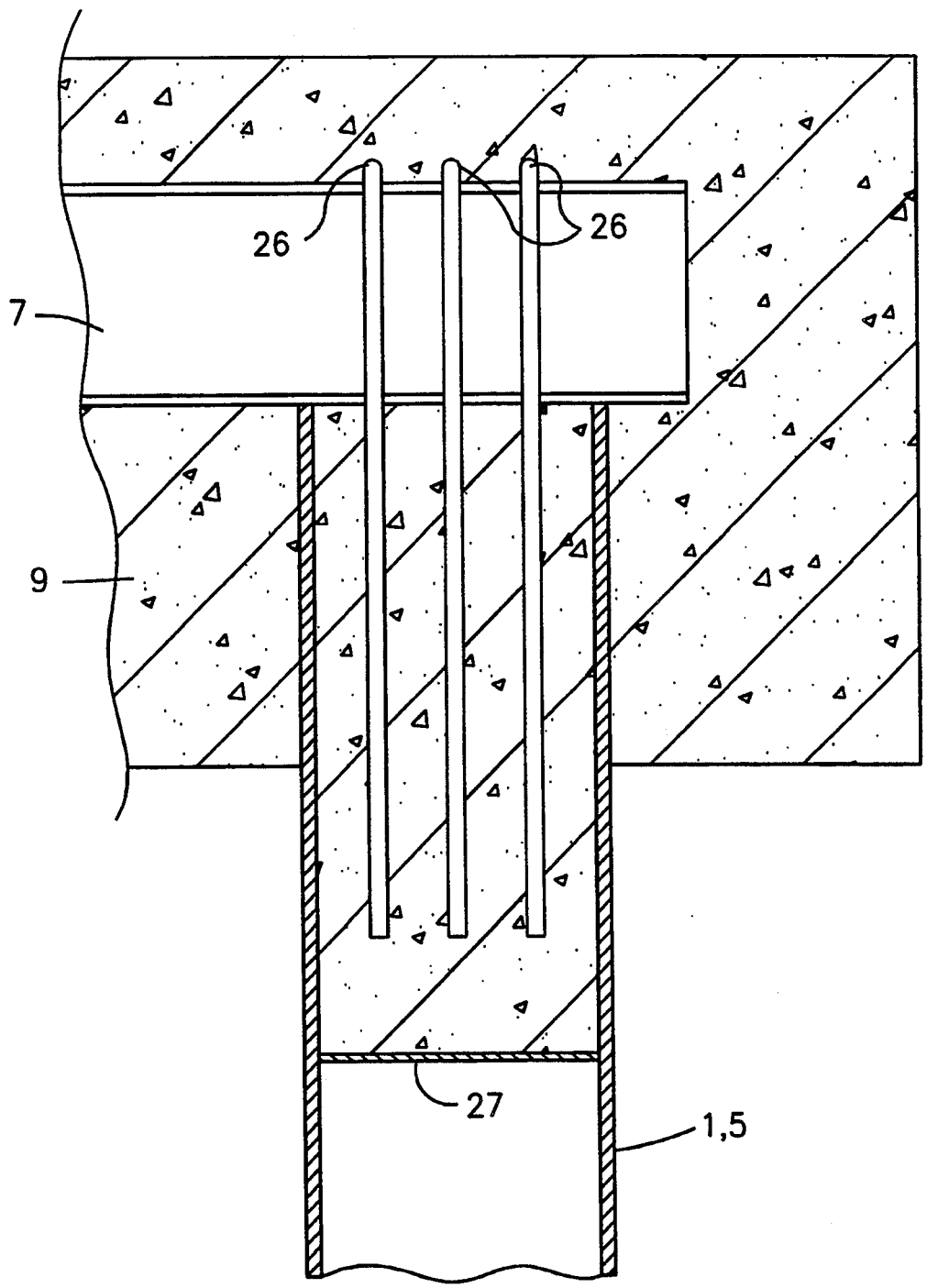
Figure 34:
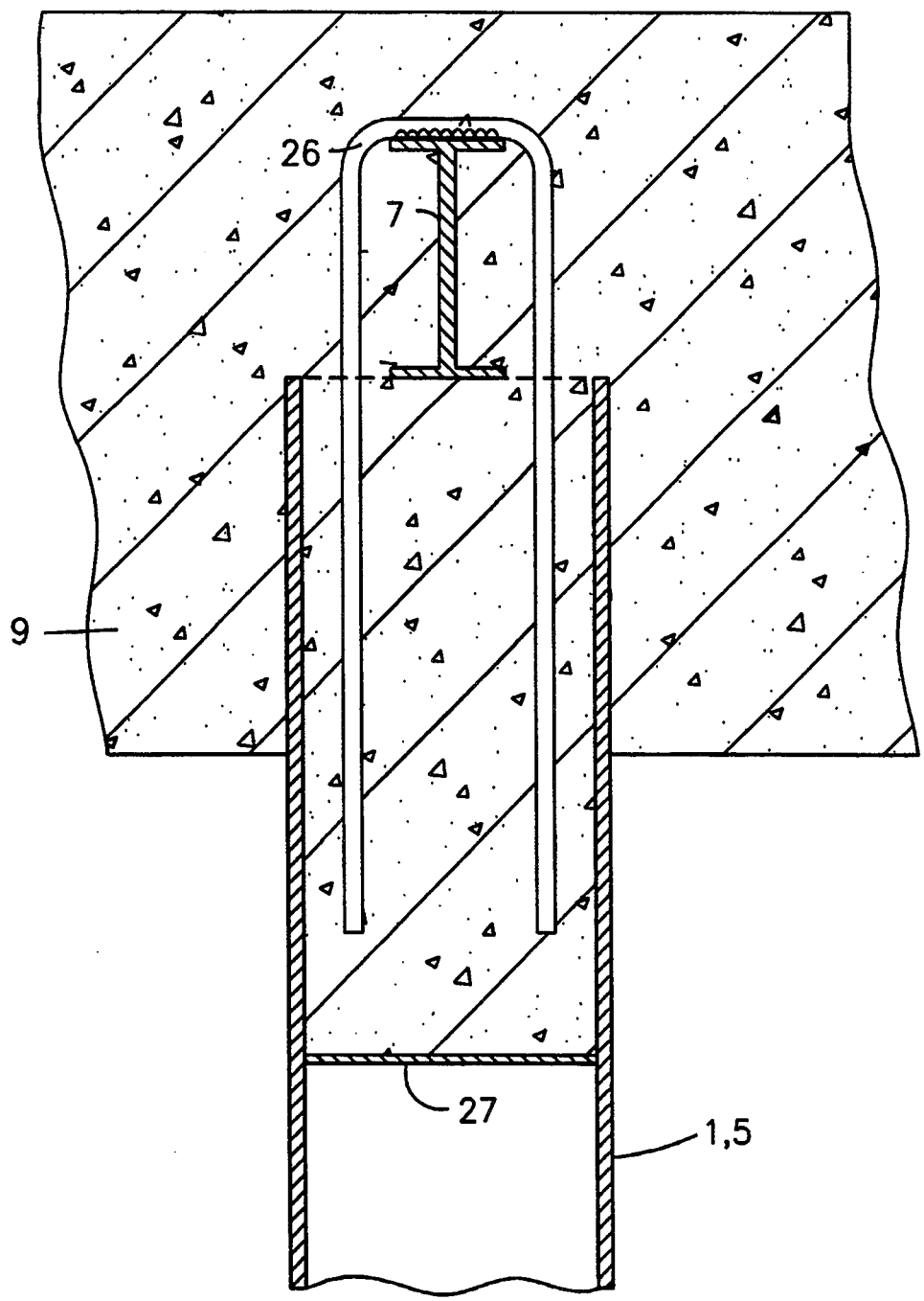

A bent anchor portion may be provided at a lower portion of the inverted U-shaped reinforcing bar 26 as shown in FIGS. 33 and 34, and at a lower portion of the anchor bolt 36 as shown in FIGS. 59 through 62.

If the sheet pile wall 49 is mounted to carry out the present invention, the water area structure would serve as a breakwater structure or a bulkhead structure.

As set forth hereinbefore, a water area structure using a placing member for underwater ground according to the present invention can be used as, e.g., a water area structure for discharge such as a shore-bridge and a jetty, a bulkhead structure, a breakwater structure, a dike structure, and the like. In particular, the structure of the present invention is suitable for economical and high efficient construction.

In the claims that follow, the forward piles 5 of this invention will be referred to as the pile members, and the placing members 1 will be referred to as the placing members.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

We claim:

1. An offshore structure having a lower part secured in a seabed and an upper part positioned above the surface of a body of water, comprising:
   a plurality of placing members disposed in spaced apart, longitudinal alignment with one another, each placing member of said plurality of placing members being disposed a first predetermined distance from contiguous placing members of said plurality of placing members;
   a plurality of pile members disposed in spaced apart, longitudinal alignment with one another, each pile member of said plurality of pile members being disposed a second predetermined distance from contiguous pile members of said plurality of pile members, said second predetermined distance being greater than said first predetermined distance and said offshore structure therefore including more placing members than pile members;
   each pile member of said plurality of pile members being disposed in transversely spaced apart alignment with a preselected placing member of said plurality of placing members;
   said plurality of placing members being disposed on a first side of the offshore structure against which external forces including earth and wave pressures are directly loaded, and said plurality of pile members being disposed on a second side of said offshore structure against which said external forces are not directly loaded;
   a plurality of cylindrical sleeve members disposed in overlying relation to said seabed, each cylindrical sleeve member having a first cylindrical part and a second part that diverges from said first cylindrical part;

each pile member of said plurality of pile members having an ensleeved part extending through said cylindrical part of said cylindrical sleeve member;

a diagonal member disposed at a predetermined slope between each pile member of said plurality of pile members and each placing member of said plurality of placing members that is transversely opposed to a pile member;

each diagonal member having a lower end received within said second part of said cylindrical sleeve member;

a spacer means connected to said first cylindrical part of each cylindrical sleeve member for spacing said ensleeved part of each pile member apart from said first cylindrical part of each cylindrical sleeve member;

a space defined between said ensleeved part of each pile member and said cylindrical part of each cylindrical sleeve member;

each space being filled with a mortar means;

means formed on each pile member of said plurality of pile members for engaging said mortar means to prevent slippage between each pile member and each cylindrical part of each cylindrical sleeve member;

a longitudinally extending coupler member disposed in bridging relation between uppermost ends of said plurality of placing members, uppermost ends of said plurality of diagonal members, and uppermost ends of said plurality of pile members, said offshore structure having a predetermined longitudinal extent and said longitudinally extending coupler member extending said predetermined longitudinal extent;

whereby each diagonal member provides a brace that enables said pluralities of pile and placing members to support said coupler member even when said structure is subjected to seismic, hydraulic, or other externally imparted forces acting thereagainst; and whereby when said structure is subjected to said externally imparted forces, each placing member of said plurality of placing members and each diagonal member of said plurality of diagonal members is subjected to compressive forces and each pile member of said plurality of pile members is subjected to tensile forces.

2. An offshore structure having a lower part secured in a seabed and an upper part positioned above the surface of a body of water, comprising:

a plurality of placing members disposed in spaced apart, longitudinal alignment with one another, each placing member of said plurality of placing members being disposed a first predetermined distance from contiguous placing members of said plurality of placing members;

a plurality of pile members disposed in spaced apart, longitudinal alignment with one another, each pile member of said plurality of pile members being disposed a second predetermined distance from contiguous pile members of said plurality of pile members, said second predetermined distance being greater than said first predetermined distance and said offshore structure therefore including more placing members than pile members;

each pile member of said plurality of pile members being disposed in transversely spaced apart alignment with a preselected placing member of said plurality of placing members;

said plurality of placing members being disposed on a first side of the offshore structure against which external forces including earth and wave pressures are directly loaded, and said plurality of pile members being disposed on a second side of said offshore structure against which said external forces are not directly loaded;

a plurality of cylindrical sleeve members disposed in overlying relation to said seabed, each cylindrical sleeve member having a first cylindrical part and a second part that diverges from said first cylindrical part at a predetermined slope;

each pile member of said plurality of pile members having an ensleeved part extending through said first cylindrical part of said cylindrical sleeve member;

a diagonal member disposed at a predetermined slope between each pile member of said plurality of pile members and each placing member of said plurality of placing members that is transversely opposed to a preselected pile member, said predetermined slope of said each diagonal member being equal to the predetermined slope of each second part of said cylindrical sleeve members;

each diagonal member having a lower end received within said second part of said cylindrical sleeve member;

a spacer means connected to said first cylindrical part of each cylindrical sleeve member for spacing said ensleeved part of each pile member apart from said first cylindrical part of each cylindrical sleeve member;

a space defined between said ensleeved part of each pile member and said first cylindrical part of each cylindrical sleeve member;

each space being filled with a mortar means;

means formed on each pile member of said plurality of pile members for engaging said mortar means to prevent slippage between each pile member and each first cylindrical part of each cylindrical sleeve member;

a longitudinally extending beam member surmounting uppermost ends of each placing member, diagonal member, and pile member, said offshore structure having a predetermined longitudinal extent and said longitudinally extending beam member extending said longitudinal extent;

whereby said diagonal member provides a brace that enables said plurality of placement and pile members to support said beam member even when said offshore structure is subjected to seismic, hydraulic, or other externally imparted forces acting thereagainst.

3. The structure of claim 2, wherein said beam member and hence the respective uppermost ends of each placing member, diagonal member, and pile member are encased within a mortar means.

4. The structure of claims 1, 2, or 3, wherein each placing member of said plurality of placing members is a steel pipe.

5. The structure of claims 1, 2, or 3, wherein each placing member is a steel pipe, further comprising a joint means connected to diametrically opposed sides of each placing member, and wherein said plurality of placing members are interconnected to one another by said joint means to form a wall against which said earth and wave pressures are directly loaded.

6. The structure of claims 1, 2, or 3, wherein each placing member is a steel sheet, further comprising a joint means connected to opposite edges of each placing member, and wherein said plurality of placing members are interconnected to one another by said joint means to form a wall against which said earth and wave pressures are directly loaded.

7. The structure of claims 1 or 3, wherein each placing member is a steel pipe having a hollow interior and further comprising a plurality of insertion members connected to said beam member along its longitudinal extent, there being as many insertion members as there are placing members, each insertion member being inserted into a hollow interior of its associated placing member and being secured therewithin by a mortar means, said insertion members enhancing the connection between said placing members and said beam member.

8. The structure of claims 1 or 3, wherein each placing member and each pile member is a steel pipe having a hollow interior and further comprising a plurality of insertion members connected to said beam member along its longitudinal extent, there being as many insertion members as there are placing members and pile members, each insertion member being inserted into a hollow interior of its associated placing member and its associated pile member and being secured therewithin by a mortar means, said insertion members enhancing the connection between said placing members and said beam member and between said pile members and said beam member.

9. The structure of claims 1, 2, or 3, further comprising a transversely disposed shearing force transfer member disposed in interconnecting relation between an upper end of each diagonal member and an upper end of each placing member.

* * * * *